US008385660B2

(12) United States Patent
Moraleda et al.

(10) Patent No.: US 8,385,660 B2
(45) Date of Patent: Feb. 26, 2013

(54) MIXED MEDIA REALITY INDEXING AND RETRIEVAL FOR REPEATED CONTENT

(75) Inventors: Jorge Moraleda, Menlo Park, CA (US);
Jonathan J. Hull, San Carlos, CA (US);
Kurt W. Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 757 days.

(21) Appl. No.: 12/491,018

(22) Filed: Jun. 24, 2009

(65) Prior Publication Data

US 2010/0329574 A1 Dec. 30, 2010

(51) Int. Cl.
*G06K 9/62* (2006.01)

(52) U.S. Cl. ............... 382/224; 382/209; 382/218

(58) Field of Classification Search .......... 382/209, 382/218, 224, 226
See application file for complete search history.

(56) References Cited

U.S. PATENT DOCUMENTS

| | | |
|---|---|---|
| 1,915,993 A | 6/1933 | Handel |
| 4,759,075 A | 7/1988 | Lipkie et al. |
| 5,027,421 A | 6/1991 | Kanno |
| 5,035,302 A | 7/1991 | Thangavelu |
| 5,077,805 A | 12/1991 | Tan |
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,493,689 A | 2/1996 | Waclawsky et al. |
| 5,546,502 A | 8/1996 | Hart et al. |
| 5,553,217 A | 9/1996 | Hart et al. |
| 5,555,556 A | 9/1996 | Ozaki |
| 5,579,471 A | 11/1996 | Barber et al. |
| 5,706,097 A | 1/1998 | Schelling et al. |
| 5,752,055 A | 5/1998 | Redpath et al. |
| 5,757,953 A | 5/1998 | Jang |

(Continued)

FOREIGN PATENT DOCUMENTS

| | | |
|---|---|---|
| CN | 1245935 | 3/2000 |
| EP | 0706283 A | 4/1996 |

(Continued)

OTHER PUBLICATIONS

U.S. Office Action, U.S. Appl. No. 11/776,520, Dec. 7, 2010, 43 pages.

(Continued)

*Primary Examiner* — John Strege
(74) *Attorney, Agent, or Firm* — Patent Law Works LLP

(57) ABSTRACT

A system and method for indexing and retrieval of document images in an MMR system having repeated content is described. The system provides one or more hierarchical shared content indices that produce faster and/or more accurate search results. The system is also advantageous because the number and configuration of the hierarchical shared content indices is automated, scalable and efficient for processing documents with partially repeated content. In particular, the MMR matching unit includes a hierarchical shared content index (HSCI) and associated methods of use for processing images where the MMR system includes repeated content. The present invention also includes a number of novel methods including a method for adding an image to a hierarchical shared content index; a method for deleting an image from the hierarchical shared content index, and a method for using the hierarchical shared content index for image recognition, as well as a method for combining multiple MMR indexes into a hierarchical MMR index.

20 Claims, 61 Drawing Sheets

U.S. PATENT DOCUMENTS

| | | |
|---|---|---|
| 5,761,344 A | 6/1998 | Al-Hussein |
| 5,764,277 A | 6/1998 | Loui et al. |
| 5,806,005 A | 9/1998 | Hull et al. |
| 5,832,474 A | 11/1998 | Lopresti et al. |
| 5,832,530 A | 11/1998 | Paknad et al. |
| 5,842,194 A | 11/1998 | Arbuckle |
| 5,867,597 A | 2/1999 | Peairs et al. |
| 5,873,077 A | 2/1999 | Kanoh et al. |
| 5,892,843 A | 4/1999 | Zhou et al. |
| 5,899,999 A | 5/1999 | De Bonet |
| 5,905,502 A | 5/1999 | Deering |
| 5,907,835 A | 5/1999 | Yokomizo et al. |
| 5,918,012 A | 6/1999 | Astiz et al. |
| 5,933,525 A | 8/1999 | Makhoul et al. |
| 5,956,468 A | 9/1999 | Ancin |
| 5,968,175 A | 10/1999 | Morishita et al. |
| 5,999,664 A | 12/1999 | Mahoney et al. |
| 5,999,915 A | 12/1999 | Nahan et al. |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb et al. |
| 6,301,386 B1 | 10/2001 | Zhu et al. |
| 6,332,039 B1 | 12/2001 | Bando et al. |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,460,036 B1 | 10/2002 | Herz |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Reisman |
| 6,686,970 B1 | 2/2004 | Windle |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,791,605 B1 | 9/2004 | Reele et al. |
| 6,799,201 B1 | 9/2004 | Lee et al. |
| 6,804,332 B1 | 10/2004 | Miner et al. |
| 6,804,659 B1 | 10/2004 | Graham et al. |
| 6,813,381 B2 | 11/2004 | Ohnishi et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,981,224 B1 | 12/2005 | Gardner et al. |
| 6,993,573 B2 | 1/2006 | Hunter |
| 7,013,309 B2 | 3/2006 | Chakraborty et al. |
| 7,031,965 B1 | 4/2006 | Moriya et al. |
| 7,035,467 B2 | 4/2006 | Nicponski |
| 7,051,086 B2 | 5/2006 | Rhoads et al. |
| 7,062,722 B1 | 6/2006 | Carlin et al. |
| 7,089,487 B2 | 8/2006 | Tsai |
| 7,092,953 B1 | 8/2006 | Haynes |
| 7,134,095 B1 | 11/2006 | Smith et al. |
| 7,136,093 B1 | 11/2006 | Itoh et al. |
| 7,150,399 B2 | 12/2006 | Barrus et al. |
| 7,167,574 B2 | 1/2007 | Kim |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,232,057 B2 | 6/2007 | Rathus et al. |
| 7,236,632 B2 | 6/2007 | Erol et al. |
| 7,239,402 B2 | 7/2007 | Soler et al. |
| 7,240,279 B1 | 7/2007 | Chartier et al. |
| 7,249,123 B2 | 7/2007 | Edler et al. |
| 7,251,689 B2 | 7/2007 | Wesley |
| 7,263,205 B2 | 8/2007 | Lev |
| 7,305,435 B2 | 12/2007 | Hamynen |
| 7,310,769 B1 | 12/2007 | Dash |
| 7,310,779 B2 | 12/2007 | Carro |
| 7,337,175 B2 | 2/2008 | Comps et al. |
| 7,359,094 B1 | 4/2008 | Sayuda |
| 7,363,580 B2 | 4/2008 | Tabata et al. |
| 7,366,979 B2 | 4/2008 | Spielberg et al. |
| 7,386,789 B2 | 6/2008 | Chao et al. |
| 7,392,287 B2 | 6/2008 | Ratcliff, III |
| 7,406,214 B2 | 7/2008 | Rhoads et al. |
| 7,421,153 B1 | 9/2008 | Ronca et al. |
| 7,421,155 B2 | 9/2008 | King et al. |
| 7,424,541 B2 | 9/2008 | Bourne |
| 7,437,023 B2 | 10/2008 | King et al. |
| 7,450,760 B2 | 11/2008 | Molnar et al. |
| 7,458,014 B1 | 11/2008 | Rubin et al. |
| 7,463,270 B2 | 12/2008 | Vale et al. |
| 7,489,415 B2 | 2/2009 | Furuta et al. |
| 7,509,386 B2 | 3/2009 | Miyashita |
| 7,546,524 B1 | 6/2009 | Bryar et al. |
| 7,567,262 B1 | 7/2009 | Clemens et al. |
| 7,585,224 B2 | 9/2009 | Dyke-Wells |
| 7,587,681 B2 | 9/2009 | Kake et al. |
| 7,593,605 B2 | 9/2009 | King et al. |
| 7,593,961 B2 | 9/2009 | Eguchi et al. |
| 7,613,686 B2 | 11/2009 | Rui |
| 7,623,259 B2 | 11/2009 | Tojo |
| 7,644,078 B2 | 1/2010 | Sastry et al. |
| 7,653,238 B2 | 1/2010 | Stentiford |
| 7,668,405 B2 | 2/2010 | Gallagher |
| 7,676,767 B2 | 3/2010 | Hofmeister et al. |
| 7,680,850 B2 | 3/2010 | Oda |
| 7,683,933 B2 | 3/2010 | Tanaka |
| 7,684,622 B2 | 3/2010 | Fisher et al. |
| 7,702,681 B2 | 4/2010 | Brewer |
| 7,707,039 B2 | 4/2010 | King et al. |
| 7,746,376 B2 | 6/2010 | Mendoza et al. |
| 7,752,534 B2 | 7/2010 | Blanchard et al. |
| 7,761,436 B2 | 7/2010 | Norton et al. |
| 7,765,231 B2 | 7/2010 | Rathus et al. |
| 7,809,192 B2 | 10/2010 | Gokturk et al. |
| 7,812,986 B2 | 10/2010 | Graham et al. |
| 7,872,669 B2 | 1/2011 | Darrell et al. |
| 7,882,113 B2 | 2/2011 | Yaeger |
| 7,882,177 B2 | 2/2011 | Wei et al. |
| 7,894,684 B2 | 2/2011 | Monobe et al. |
| 7,930,292 B2 | 4/2011 | Nakajima |
| 7,946,491 B2 | 5/2011 | Burian et al. |
| 8,276,088 B2 | 9/2012 | Ke et al. |
| 8,332,401 B2 | 12/2012 | Hull et al. |
| 8,335,789 B2 | 12/2012 | Hull et al. |
| 2001/0011276 A1 | 8/2001 | Durst, Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0063709 A1 | 5/2002 | Gilbert et al. |

| | | |
|---|---|---|
| 2002/0073236 A1 | 6/2002 | Helgeson et al. |
| 2002/0093538 A1 | 7/2002 | Carlin |
| 2002/0102966 A1 | 8/2002 | Lev et al. |
| 2002/0118379 A1 | 8/2002 | Chakraborty et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0159640 A1 | 10/2002 | Vaithilingam et al. |
| 2002/0161747 A1 | 10/2002 | Li et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2003/0025714 A1 | 2/2003 | Ebersole et al. |
| 2003/0030828 A1 | 2/2003 | Soler et al. |
| 2003/0030835 A1 | 2/2003 | Yoshida et al. |
| 2003/0098877 A1 | 5/2003 | Boegelund |
| 2003/0110130 A1 | 6/2003 | Pelletier |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0128375 A1 | 7/2003 | Ruhl et al. |
| 2003/0142106 A1 | 7/2003 | Saund et al. |
| 2003/0151674 A1 | 8/2003 | Lin |
| 2003/0152293 A1 | 8/2003 | Bresler et al. |
| 2003/0169910 A1 | 9/2003 | Reisman et al. |
| 2003/0187886 A1 | 10/2003 | Hull et al. |
| 2003/0190094 A1 | 10/2003 | Yokota |
| 2003/0193530 A1 | 10/2003 | Blackman et al. |
| 2003/0195883 A1 | 10/2003 | Mojsilovic et al. |
| 2003/0212585 A1 | 11/2003 | Kyoya et al. |
| 2003/0229857 A1 | 12/2003 | Sayuda et al. |
| 2004/0012569 A1 | 1/2004 | Hara |
| 2004/0017482 A1 | 1/2004 | Weitman |
| 2004/0027604 A1 | 2/2004 | Jeran et al. |
| 2004/0036679 A1 | 2/2004 | Emerson |
| 2004/0042667 A1 | 3/2004 | Lee et al. |
| 2004/0102898 A1 | 5/2004 | Yokota et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0012960 A1 | 1/2005 | Eden et al. |
| 2005/0080693 A1 | 4/2005 | Foss et al. |
| 2005/0086188 A1 | 4/2005 | Hillis et al. |
| 2005/0086224 A1 | 4/2005 | Franciosa et al. |
| 2005/0089246 A1 | 4/2005 | Luo |
| 2005/0100219 A1 | 5/2005 | Berkner et al. |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0169520 A1 | 8/2005 | Chen et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190273 A1 | 9/2005 | Toyama et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0240381 A1 | 10/2005 | Seiler et al. |
| 2005/0261990 A1 | 11/2005 | Gocht et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0014317 A1 | 1/2006 | Farnworth |
| 2006/0020630 A1 | 1/2006 | Stager et al. |
| 2006/0023945 A1 | 2/2006 | King et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0048059 A1 | 3/2006 | Etkin |
| 2006/0053097 A1 | 3/2006 | King et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0074828 A1 | 4/2006 | Heumann et al. |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1 | 5/2006 | King et al. |
| 2006/0112092 A1 | 5/2006 | Ziou et al. |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0123347 A1 | 6/2006 | Hewitt et al. |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0147107 A1 | 7/2006 | Zhang et al. |
| 2006/0150079 A1 | 7/2006 | Albornoz et al. |
| 2006/0190812 A1 | 8/2006 | Ellenby et al. |
| 2006/0200480 A1 | 9/2006 | Harris et al. |
| 2006/0206335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0003147 A1 | 1/2007 | Viola et al. |
| 2007/0003166 A1 | 1/2007 | Berkner |
| 2007/0019261 A1 | 1/2007 | Chu |
| 2007/0036469 A1 | 2/2007 | Kim et al. |
| 2007/0041668 A1 | 2/2007 | Todaka |
| 2007/0047819 A1 | 3/2007 | Hull et al. |
| 2007/0052997 A1 | 3/2007 | Hull et al. |
| 2007/0053513 A1 | 3/2007 | Hoffberg |
| 2007/0063050 A1 | 3/2007 | Attia et al. |
| 2007/0076922 A1 | 4/2007 | Living et al. |
| 2007/0106721 A1 | 5/2007 | Scholter |
| 2007/0115373 A1 | 5/2007 | Gallagher et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0242626 A1 | 10/2007 | Altberg |
| 2007/0271247 A1 | 11/2007 | Best et al. |
| 2007/0276845 A1 | 11/2007 | Geilich |
| 2008/0010605 A1 | 1/2008 | Frank |
| 2008/0037043 A1 | 2/2008 | Hull et al. |
| 2008/0071767 A1 | 3/2008 | Grieselhuber et al. |
| 2008/0071929 A1 | 3/2008 | Motte et al. |
| 2008/0078836 A1 | 4/2008 | Tomita |
| 2008/0106594 A1 | 5/2008 | Thurn |

| | | |
|---|---|---|
| 2008/0229192 A1 | 9/2008 | Gear et al. |
| 2008/0267504 A1 | 10/2008 | Schloter et al. |
| 2008/0275881 A1 | 11/2008 | Conn et al. |
| 2008/0288476 A1 | 11/2008 | Kim et al. |
| 2008/0296362 A1 | 12/2008 | Lubow |
| 2008/0310717 A1 | 12/2008 | Saathoff et al. |
| 2008/0317383 A1 | 12/2008 | Franz et al. |
| 2009/0067726 A1 | 3/2009 | Erol et al. |
| 2009/0152357 A1 | 6/2009 | Lei et al. |
| 2009/0235187 A1 | 9/2009 | Kim et al. |
| 2009/0248665 A1 | 10/2009 | Garg et al. |
| 2009/0254643 A1 | 10/2009 | Terheggen et al. |
| 2009/0265761 A1 | 10/2009 | Evanitsky |
| 2010/0013615 A1 | 1/2010 | Hebert et al. |
| 2010/0057556 A1 | 3/2010 | Rousso et al. |
| 2010/0063961 A1 | 3/2010 | Guiheneuf et al. |
| 2010/0174783 A1 | 7/2010 | Zarom |
| 2010/0306273 A1* | 12/2010 | Branigan et al. .............. 707/802 |
| 2011/0121069 A1 | 5/2011 | Lindahl et al. |
| 2011/0173521 A1 | 7/2011 | Horton et al. |
| 2012/0166435 A1 | 6/2012 | Graham |
| 2012/0173504 A1 | 7/2012 | Moraleda |

FOREIGN PATENT DOCUMENTS

| | | |
|---|---|---|
| EP | 1229496 A2 | 8/2002 |
| EP | 1555626 A2 | 7/2005 |
| EP | 1662064 A1 | 5/2006 |
| EP | 1783681 | 5/2007 |
| JP | 09-006961 | 1/1997 |
| JP | 9134372 | 5/1997 |
| JP | 10-228468 A | 8/1998 |
| JP | 10-0240765 | 9/1998 |
| JP | 11-234560 | 8/1999 |
| JP | 2000-165645 A | 6/2000 |
| JP | 200268179 | 9/2000 |
| JP | 2001211359 | 8/2001 |
| JP | 2001230916 | 8/2001 |
| JP | 2002513480 | 5/2002 |
| JP | 2003-178081 | 6/2003 |
| JP | 2005-011005 | 1/2005 |
| JP | 2005-242579 | 9/2005 |
| JP | 2005286395 | 10/2005 |
| JP | 2006053568 | 2/2006 |
| JP | 2006059351 | 3/2006 |
| JP | 2006215756 | 8/2006 |
| JP | 2007-072573 | 3/2007 |
| JP | 2007-140613 | 6/2007 |
| JP | 2007-174270 | 7/2007 |
| WO | WO 99/05658 A1 | 2/1999 |
| WO | WO 2004/072897 A2 | 8/2004 |
| WO | WO 2005/043270 A2 | 5/2005 |
| WO | WO2006/092957 | 9/2006 |
| WO | 2007023994 | 3/2007 |
| WO | WO 2007/073347 A1 | 6/2007 |
| WO | 2008129373 | 10/2008 |

OTHER PUBLICATIONS

U.S. Office Action, U.S. Appl. No. 12/719,437, Dec. 9, 2010, 38 pages.
U.S. Office Action, U.S. Appl. No. 11/776,510, Dec. 10, 2010, 39 pages.
U.S. Office Action, U.S. Appl. No. 111461,126, Dec. 23, 2010, 30 pages.
U.S. Office Action, U.S. Appl. No. 11/461,279, Jan. 7, 2011, 44 pages.
U.S. Office Action, U.S. Appl. No. 12/240,596, Jan. 21, 2011, 21 pages.
U.S. Office Action, U.S. Appl. No. 11/461,286, Jan. 21, 2011, 34 pages.
U.S. Office Action, U.S. Appl. No. 11/461,143, Feb. 4, 2011, 16 pages.
European Search Report, European Application No. 09170045.0, Nov. 24, 2009, 4 pages.
Roth, M.T. et al., "The Garlic Project," Proc. of the 1996 ACM SIGMOD International Conference on Management of Data, Montreal, Quebec, Canada, Jun. 4, 1996, pp. 557.
United States Office Action, U.S. Appl. No. 12/060,206, Dec. 15, 2011, 55 pages.
United States Notice of Allowance, U.S. Appl. No. 11/776,530, Dec. 21, 2011, 17 pages.
United States Office Action, U.S. Appl. No. 12/210,519, Jan. 5, 2012, 29 pages.
United States Notice of Allowance, U.S. Appl. No. 11/776,520, Jan. 5, 2012, 28 pages.
United States Office Action, U.S. Appl. No. 11/461,294, Jan. 18, 2012, 38 pages.
United States Office Action, U.S. Appl. No. 11/461,286, Jan. 20, 2012, 27 pages.
United States Notice of Allowance, U.S. Appl. No. 11/777,142, Jan. 20, 2012, 29 pages.
United States Notice of Allowance, U.S. Appl. No. 12/342,330, Jan. 23, 2012, 21 pages.
United States Office Action, U.S. Appl. No. 12/059,583, Jan. 26, 2012, 78 pages.
United States Notice of Allowance, U.S. Appl. No. 12/253,815, Jan. 26, 2012, 62 pages.
United States Office Action, U.S. Appl. No. 12/240,596, Feb. 2, 2012, 44 pages.
United States Office Action, U.S. Appl. No. 11/461,300, Feb. 23, 2012, 38 pages.
Japanese Office Action, Japanese Patent Application No. 200910138044.X, Jan. 26, 2011, 6 pages.
U.S. Notice of Allowance, U.S. Appl. No. 11/624,466, Feb. 22, 2011, 12 pages.
U.S. Notice of Allowance, U.S. Appl. No. 11/461,272, Feb. 23, 2011, 28 pages.
U.S. Office Action, U.S. Appl. No. 12/060,194, Feb. 25, 2011, 18 pages.
U.S. Office Action, U.S. Appl. No. 12/879,933, Mar. 2, 2011, 7 pages.
U.S. Office Action, U.S. Appl. No. 12/210,519, Mar. 14, 2011, 38 pages.
U.S. Notice of Allowance, U.S. Appl. No. 11/461,024, Mar. 16, 2011, 12 pages.
U.S. Office Action, U.S. Appl. No. 111461,300, Mar. 18, 2011, 25 pages.
U.S. Office Action, U.S. Appl. No. 11/777,142, Mar. 18, 2011, 21 pages.
U.S. Office Action, U.S. Appl. No. 11/461,037, Mar. 30, 2011, 29 pages.
U.S. Office Action, U.S. Appl. No. 12/210,511, Apr. 4, 2011, 49 pages.
U.S. Office Action, U.S. Appl. No. 12/247,202, Apr. 6, 2011, 37 pages.
U.S. Office Action, U.S. Appl. No. 11/461,126, Apr. 12, 2011, 27 pages.
U.S. Office Action, U.S. Appl. No. 11/461,294, Apr. 12, 2011, 23 pages.
U.S. Office Action, U.S. Appl. No. 12/210,540, Apr. 15, 2011, 45 pages.
U.S. Office Action, U.S. Appl. No. 12/340,124, Apr. 15, 2011, 48 pages.
Liu, Y. et al., "Automatic Texture Segmentation for Texture-Based Image Retrieval," IEEE, Jan. 5-7, 2004, pp. 285-288.
Liu, T. et al., "A Fast Image Segmentation Algorithm for Interactive Video Hotspot Retrieval," IEEE, 2001, pp. 3-8.
Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.
Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.
Yanagisawa Kiyoshi, "Access Control Management System using Face Recognition Technology" Nippon Signal Technical Journal, Japan, The Nippon Signal Co., Ltd., Mar. 1, 2002, vol. 26, No. 1, 9 pages (pp. 21-26).
United States Final Office Action, U.S. Appl. No. 12/719,437, Mar. 1, 2012, 518 pages.

United States Notice of Allowance, U.S. Appl. No. 11/461,126, Mar. 5, 2012, 19 pages.
United States Notice of Allowance, U.S. Appl. No. 11/461,143, Mar. 8, 2012, 9 pages.
Japan Patent Office, Office Action for Japanese Patent Application JP2007-199984, Mar. 13, 2012, 3 pages.
United States Notice of Allowance, U.S. Appl. No. 11/776,530, Mar. 26, 2012, 5 pages.
United States Non-Final Office Action, U.S. Appl. No. 12/240,590, Apr. 4, 2012, 73 pages.
United States Notice of Allowance, U.S. Appl. No. 13/168,638, Apr. 4, 2012, 30 pages.
United States Final Office Action, U.S. Appl. No. 12/265,502, Apr. 5, 2012, 49 pages.
United States Final Office Action, U.S. Appl. No. 12/060,198, Apr. 12, 2012, 74 pages.
United States Final Office Action, U.S. Appl. No. 12/060,200, Apr. 12, 2012, 65 pages.
United States Final Office Action, U.S. Appl. No. 11/461,294, Apr. 13, 2012, 23 pages.
United States Final Office Action, U.S. Appl. No. 11/461,286, Apr. 16, 2012, 47 pages.
United States Non-Final Office Action, U.S. Appl. No. 11/461,279, Apr. 19, 2012, 59 pages.
United States Notice of Allowance, U.S. Appl. No. 11/827,530, Apr. 24, 2012, 21 pages.
China Patent Office, Office Action for Chinese Patent Application CN200680039376.7, Apr. 28, 2012, 11 pages.
United States Non-Final Office Action, U.S. Appl. No. 12/121,275, May 18, 2012, 41 pages.
Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.
Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.
Rademacher, "View-Dependent Geometry", Computer Graphics Proceedings, Annual Conference Series, SIGGRAPH 99, Los Angeles, California Aug. 8-13, 1999, pp. 439-446, XP001024743.
U.S. Patent Office Action, U.S. Appl. No. 12/121,275, Apr. 20, 2011, 44 pages.
U.S. Patent Office Action, U.S. Appl. No. 11/776,520, Apr. 28, 2011, 10 pages.
Extended European Search Report, European Patent Application No. 082523770, May 2, 2011, 6 pages.
U.S. Patent Office Action, U.S. Appl. No. 11/776,510, May 12, 2011, 20 pages.
U.S. Patent Office Action, U.S. Appl. No. 12/210,519, Jun. 16, 2011, 22 pages.
U.S. Patent Office Action, U.S. Appl. No. 12/060,194, Jun. 27, 2011, 18 pages.
United States Office Action, U.S. Appl. No. 11/624,466, Jun. 8, 2010, 29 pages.
United States Office Action, U.S. Appl. No. 11/827,530, Jun. 9, 2010, 35 pages.
United States Office Action, U.S. Appl. No. 11/461,294, Jun. 11, 2010, 19 pages.
United States Office Action, U.S. Appl. No. 11/461,300, Jun. 11, 2010, 20 pages.
United States Office Action, U.S. Appl. No. 11/461,024, Jul. 14, 2010, 29 pages.
United States Office Action, U.S. Appl. No. 11/461,049, Jul. 28, 2010, 27 pages.
United States Office Action, U.S. Appl. No. 11/461,279, Aug. 5, 2010, 37 pages.
United States Office Action, U.S. Appl. No. 11/461,286, Aug. 5, 2010, 28 pages.
United States Office Action, U.S. Appl. No. 12/240,596, Aug. 6, 2010, 32 pages.
U.S. Appl. No. 10/813,901, filed Mar. 30, 2004, Erol et al.
Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.
Akenine-Moller, T. et al., "Real-Time Rendering," A.K. Peters, Natick, MA, $2^{nd}$ Edition, 2002, pp. 70-84.
Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.
Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL: http://web.archive.org/web/20060619172549/http://www.scanbuy.com/website/solutions_su . . . >.
Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.
Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.
Baird, H., "Document Image Defect Models," In Proc. of IAPR Workshop on Syntactic and Structural Pattern Recognition, Murray Hill, NJ, Jun. 1990, Structured Document Image Analysis, Springer-Verlag, pp. 546-556.
Baird, H., "The State of the Art of Document Image Degradation Modeling," In Proc. of the $4^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.
Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.
Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.
Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.
Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.
Brassil, J. et al., "Hiding Information in Document Images," Proc. Conf. Information Sciences and Systems (CISS-95), Mar. 1995, Johns Hopkins University, Baltimore, MD, pp. 482-489.
"Call for Papers: ICAT 2007," $17^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.
Canny, J., "A Computational Approach to Edge Detection," IEEE Transactions on Pattern Analysis and Machine Intelligence, Nov. 1986, pp. 679-714, vol. PAMI-8, No. 6.
Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.
Cover, T.M. et al., "Nearest Neighbor Pattern Classification," IEEE Transactions on Information Theory, Jan. 1967, pp. 21-27, vol. IT-13, No. 1.
Davis, M. et al., "Towards Context-Aware Face Recognition," Proceedings of the 13th Annual ACM International Conference on Multimedia, Nov. 6-11, 2005, pp. 483-486, vol. 13.

Di Stefano, L. et al., "A Simple and Efficient Connected Components Labeling Algorithm," International Conference on Image Analysis and Processing, 1999, pp. 322-327.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Linking Presentation Documents Using Image Analysis," IEEE, Nov. 9-12, 2003, pp. 97-101, vol. 1.

Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull}/pubs/p225_erol.pdf>.

Erol, B. et al., "Prescient Paper: Multimedia Document Creation with Document Image Matching," 17$^{th}$ International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

European Search Report, European Application No. 09156089.6, Jun. 19, 2009, 8 pages.

Ezaki, N. et al., "Text Detection from Natural Scene Images: Towards a System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7$^{th}$ International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the 4$^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J., "Document Image Matching on CCITT Group 4 Compressed Images," SPIE Conference on Document Recognition IV, Feb. 8, 1997, pp. 82-87.

Hull, J.J. et al., "Document Image Matching Techniques," Apr. 30, 1997, pp. 31-35, [Online] [Retrieved on May 2, 1997] Retrieved from the Internet<URL:http://rii.ricoh.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17$^{th}$ International Conference on Artificial Reality and Telexistence, Nov. 1, 2007, pp. 205-209.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.

Liang, J. et al., "Flattening Curved Documents in Images," In Proc. of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5th ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995,10 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sezgin, M. et al., "Survey Over Image Thresholding Techniques and Quantitative Performance Evaluation," Journal of Electronic Imaging, Jan. 2004, pp. 146-165, vol. 13, No. 1.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.=.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia, "Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zanibbi, R. et al. "A Survey of Table Recognition," International Journal on Document Analysis and Recognition, 2004, pp. 1-33.

Zhang, Z., "A Flexible New Technique for Camera Calibration," IEEE Transactions on Pattern Analysis and Machine Intelligence, Nov. 2000, pp. 1330-1334, vol. 22, No. 11.

Zhao, W. et al., Face Recognition: A Literature Survey, ACM Computing Surveys (CSUR), 2003, pp. 399-458, vol. 35, No. 4.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

United States Office Action, U.S. Appl. No. 11/461,279, Jul. 8, 2011, 46 pages.

United States Office Action, U.S. Appl. No. 11/461,286, Jul. 15, 2011, 37 pages.

United States Office Action, U.S. Appl. No. 11/461,126, Jul. 22, 2011, 35 pages.

United States Notice of Allowance, U.S. Appl. No. 12/247,202, Jul. 28, 2011, 16 pages.

United States Office Action, U.S. Appl. No. 11/461,143, Aug. 11, 2011, 20 pages.

United States Office Action, U.S. Appl. No. 11/776,530, Aug. 19, 2011, 54 pages.

United States Office Action, U.S. Appl. No. 12/253,715, Aug. 31, 2011, 58 pages.

United States Office Action, U.S. Appl. No. 12/060,198, Sep. 1, 2011, 87 pages.

United States Office Action, U.S. Appl. No. 12/060,200, Sep. 2, 2011, 65 pages.

United States Notice of Allowance, U.S. Appl. No. 11/776,510, Sep. 22, 2011, 11 pages.

United States Office Action, U.S. Appl. No. 11/777,142, Sep. 23, 2011, 22 pages.

United States Office Action, U.S. Appl. No. 12/210,511, Sep. 28, 2011, 25 pages.

United States Office Action, U.S. Appl. No. 12/247,205, Oct. 6, 2011, 56 pages.

United States Office Action, U.S. Appl. No. 12/342,330, Oct. 7, 2011, 47 pages.

Japanese Office Action, Japanese Application No. 2004-293962, Aug. 24, 2010, 3 pages.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, Sep. 3, 2010, 28 pages.

United States Notice of Allowance, U.S. Appl. No. 11/461,095, Sep. 27, 2010, 29 pages.

United States Office Action, U.S. Appl. No. 12/060,194, Oct. 1, 2010, 29 pages.

United States Office Action, U.S. Appl. No. 11/461,294, Oct. 7, 2010, 17 pages.

United States Office Action, U.S. Appl. No. 11/461,300, Oct. 6, 2010, 20 pages.

United States Office Action, U.S. Appl. No. 11/827,530, Oct. 7, 2010, 21 pages.

United States Office Action, U.S. Appl. No. 11/624,466, Oct. 14, 2010, 11 pages.

United States Notice of Allowance, U.S. Appl. No. 11/461,091, Oct. 18, 2010, 31 pages.

United States Notice of Allowance, U.S. Appl. No. 11/461,024, Nov. 15, 2010, 10 pages.

United States Notice of Allowance, U.S. Appl. No. 11/461,049, Nov. 16, 2010, 10 pages.

United States Notice of Allowability, U.S. Appl. No. 11/461,091, Nov. 17, 2010, 22 pages.

United States Office Action, U.S. Appl. No. 11/777,142, Nov. 10, 2010, 17 pages.
Adobe Acrobat Advanced Elements (for both PC and Mac Computers), 2002, pp. 1-19.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
Mae et al., "Object Recognition Using Appearance Models Accumulated into Enviornment", Proc. 15-th Intl. Conf. on Pattern Recognition, 2000, vol. 4, pp. 845-848.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/121,275, Oct. 19, 2011, 24 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Notice of Allowance, U.S. Appl. No. 12/060,194, Nov. 28, 2011, 23 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Final Office Action, U.S. Appl. No. 12/247,205, dated May 23, 2012, 50 pages.
United States Final Office Action, U.S. Appl. No. 12/210,532, dated Jun. 5, 2012, 48 pages.
United States Non-Final Office Action, U.S. Appl. No. 11/461,037, dated Jun. 13, 2012, 46 pages.
United States Final Office Action, U.S. Appl. No. 12/240,596, dated Jun. 14, 2012, 28 pages.
United States Non-Final Office Action, U.S. Appl. No. 12/340,124, dated Jun. 27, 2012, 31 pages.
United States Final Office Action, U.S. Appl. No. 12/210,519, dated Jun. 28, 2012, 33 pages.
United States Final Office Action, U.S. Appl. No. 11/461,300, dated Jul. 13, 2012, 33 pages.
United States Notice of Allowance, U.S. Appl. No. 11/461,294, dated Aug. 9, 2012, 33 pages.
United States Final Office Action, U.S. Appl. No. 11/461,279, dated Aug. 10, 2012, 50 pages.
United States Notice of Allowance, U.S. Appl. No. 11/461,286, dated Aug. 14, 2012, 42 pages.
Hirokazu Kate et al., A Registration Method for Augmented Reality based on Matching Templates Generated from Texture Image, Transaction for the Virtual Reality Society of Japan, the Virtual Reality Society of Japan, 2002, vol. 7, No. 2, pp. 119-128.
Japanese Office Action, JP2008-180790, dated May 22, 2012, 3 pages.
Japanese Office Action, JP2008-180791, dated May 22, 2012, 4 pages.
Japanese Office Action, JP2008-180792, dated May 22, 2012, 3 pages.
Japanese Office Action, JP2008-180793, dated May 29, 2012, 3 pages.
Japanese Office Action, JP2008-180794, dated May 22, 2012, 3 pages.
JP Office Action, JP Application No. 2008-180789, dated Sep. 25, 2012, 3 pages.
Tomohiro Nakai; Document Image Retrieval Based on Cross-Ration and Hashing IEICE Technical Report; The Institute of Electronics, Information and Communication Engineers; dated Mar. 11, 2005; vol. 104 No. 742; pp. 103-108.
U.S. Office Action, U.S. Appl. No. 12/059,583, dated Sep. 10, 2012, 41 pages.
U.S. Notice of Allowance, U.S. Appl. No. 12/240,590, dated Oct. 1, 2012, 19 pages.
U.S. Office Action, U.S. Appl. No. 13/192,458, dated Oct. 11, 2012, 30 pages.
U.S. Office Action, U.S. Appl. No. 13/415,756, dated Oct. 26, 2012, 40 pages.
U.S. Office Action, U.S. Appl. No. 12/253,715, dated Nov. 14, 2012, 76 pages.
U.S. Office Action, U.S. Appl. No. 11/461,300, dated Nov. 28, 2012, 37 pages.
U.S. Notice of Allowance, U.S. Appl. No. 12/121,275, dated Nov. 28, 2012, 31 pages.
U.S. Office Action, U.S. Appl. No. 13/415,228, dated Dec. 3, 2012, 38 pages.

* cited by examiner

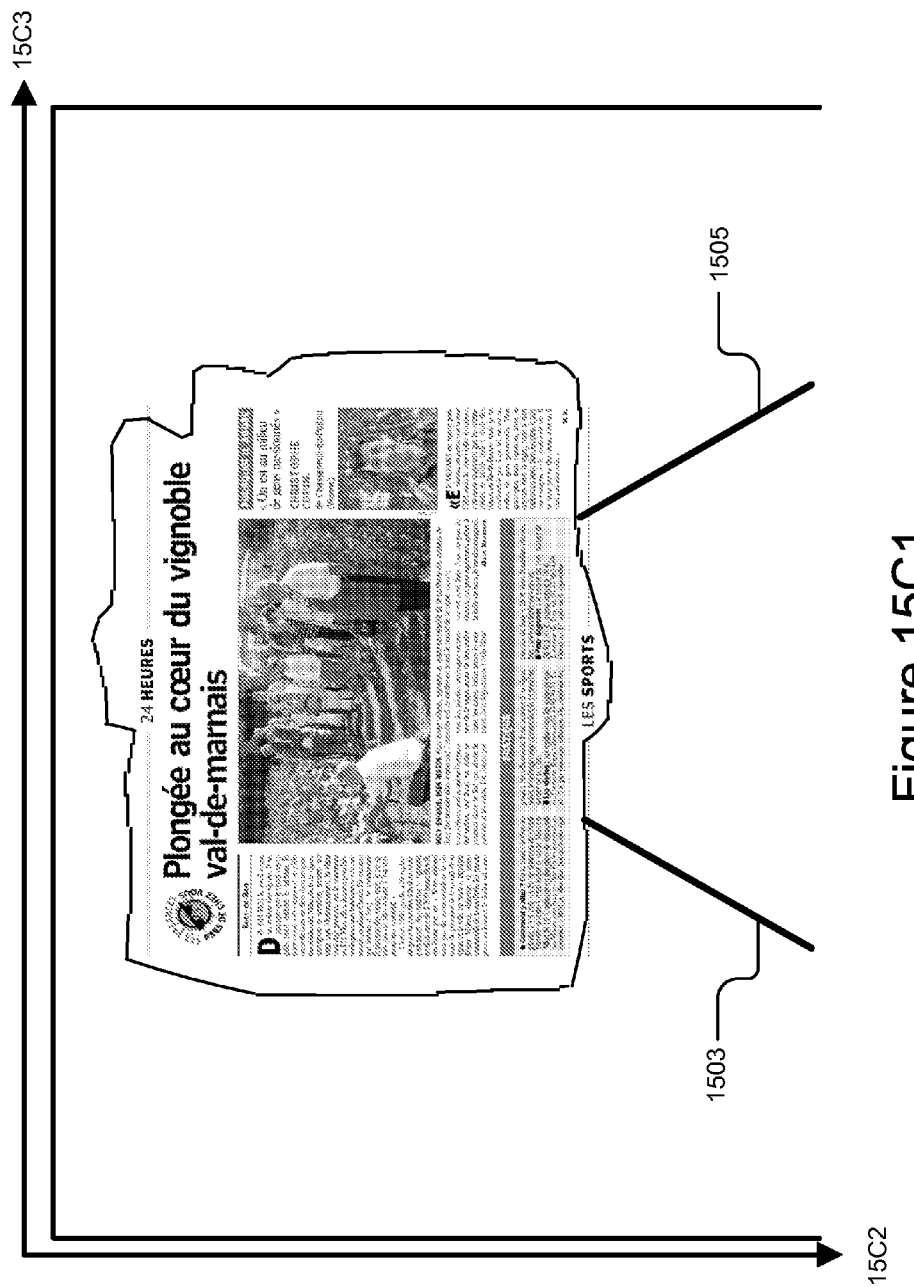
Figure 15C1

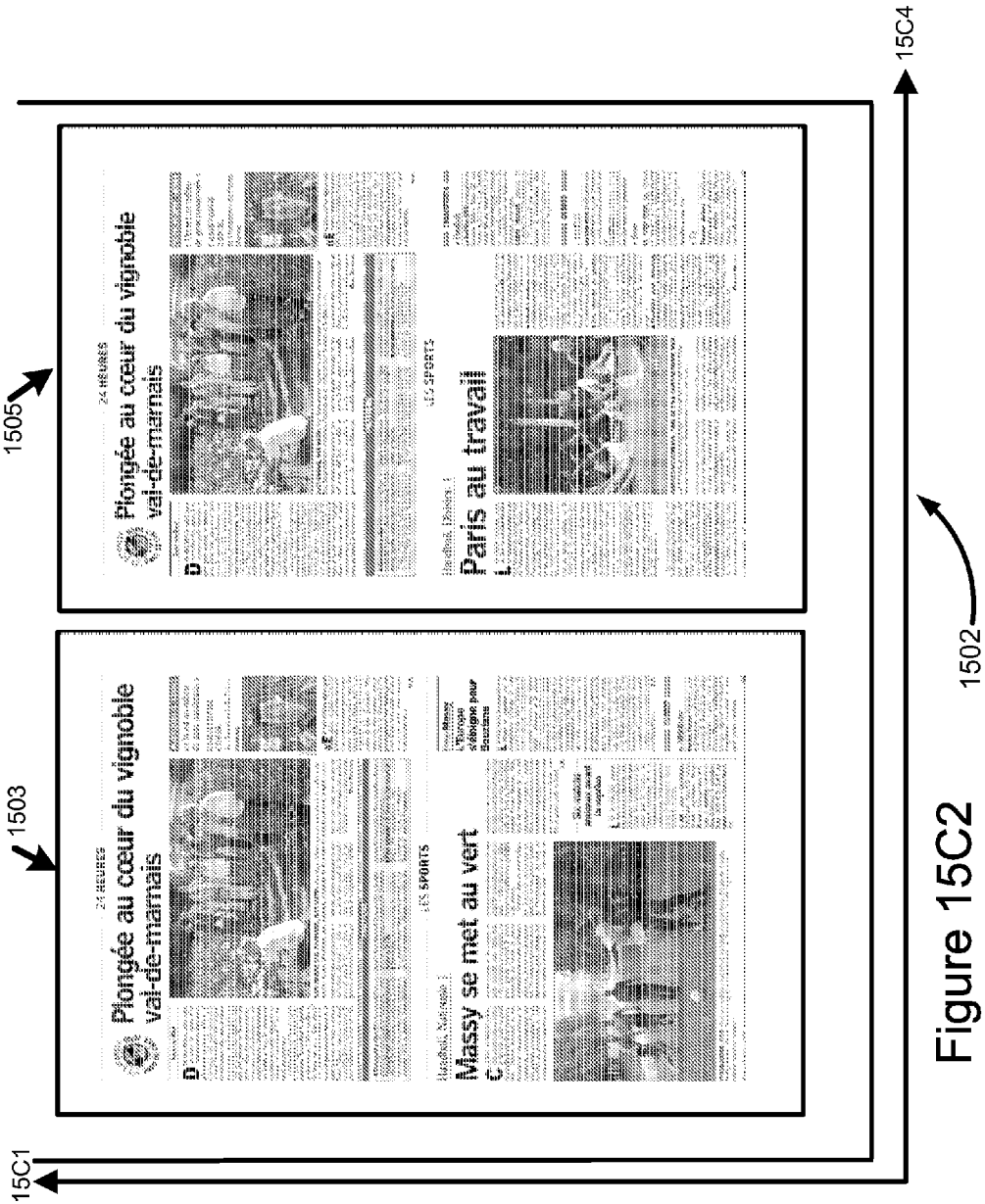
Figure 15C2

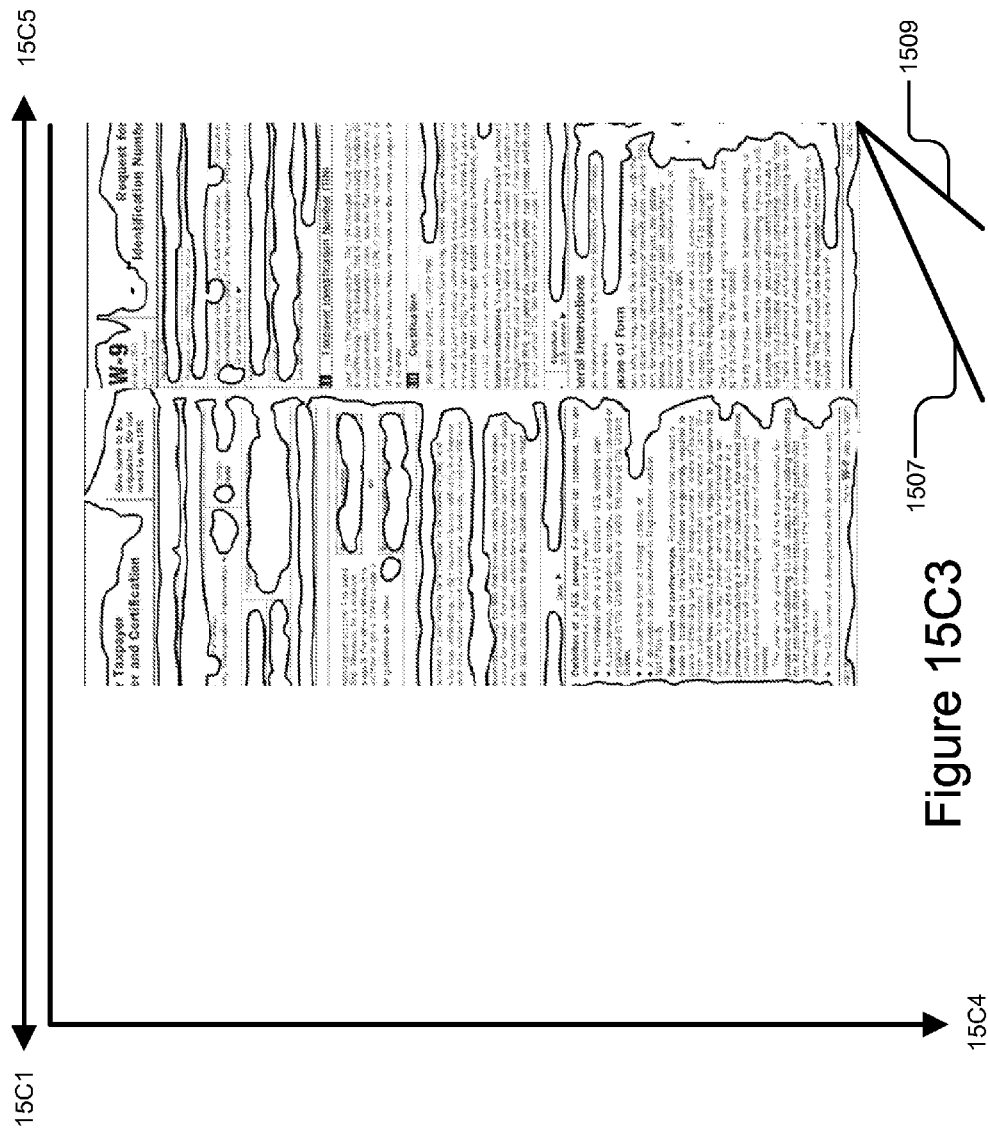
Figure 15C3

Figure 15C4

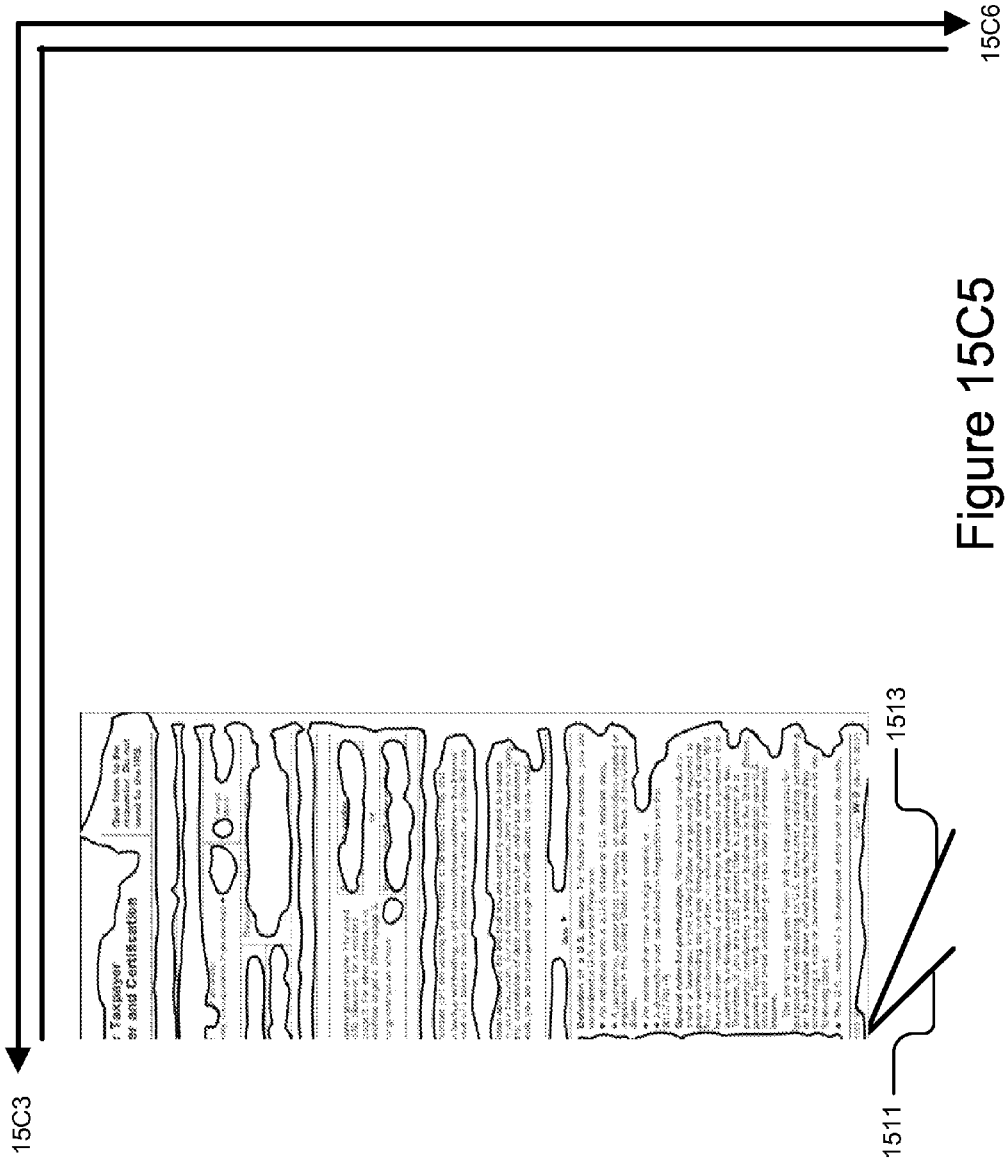

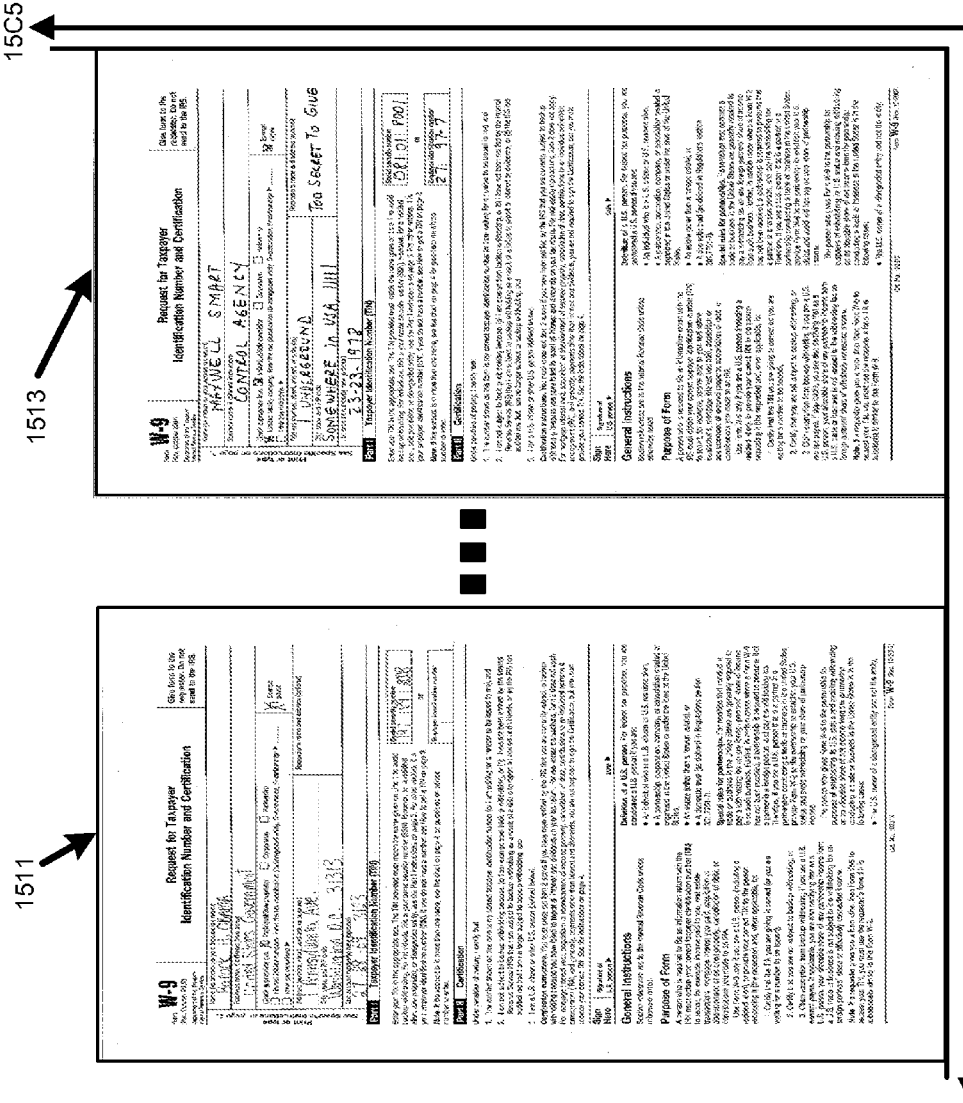
Figure 15C6

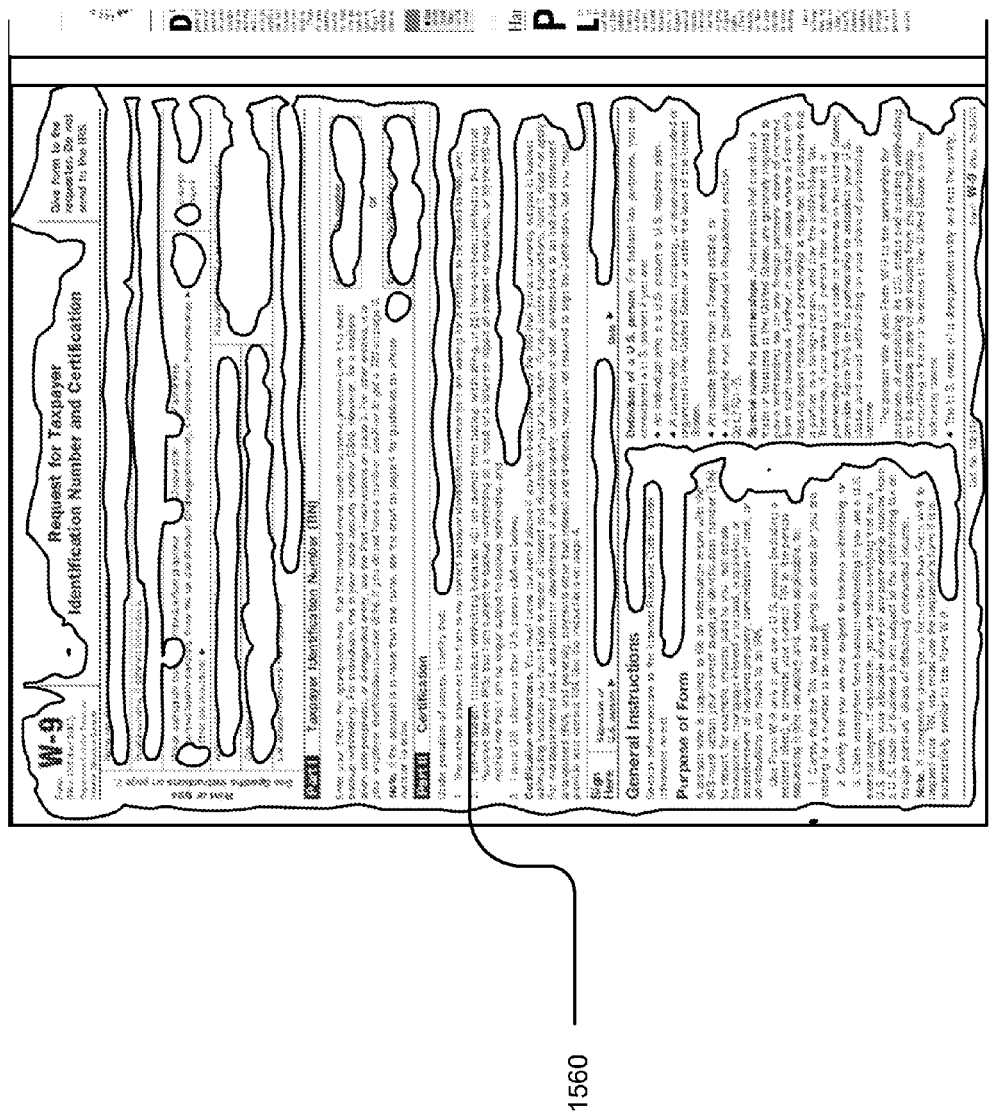
Figure 15D1

Figure 15D2

Figure 15D3

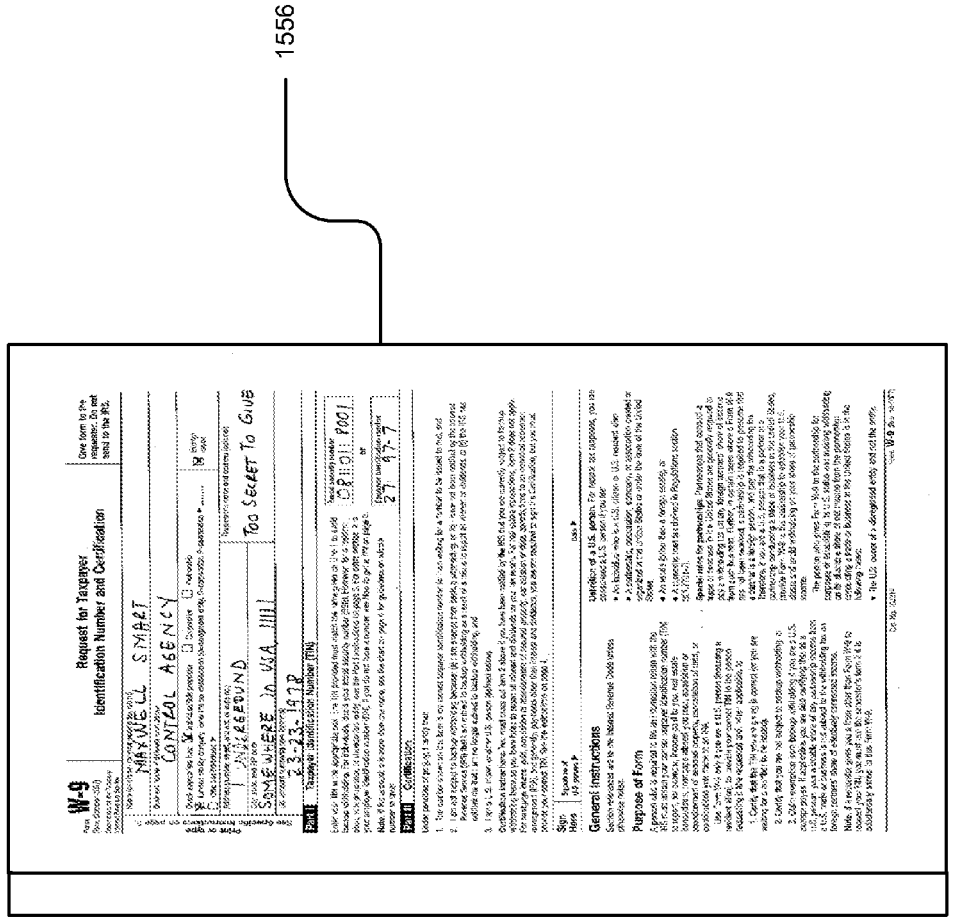
Figure 15D5

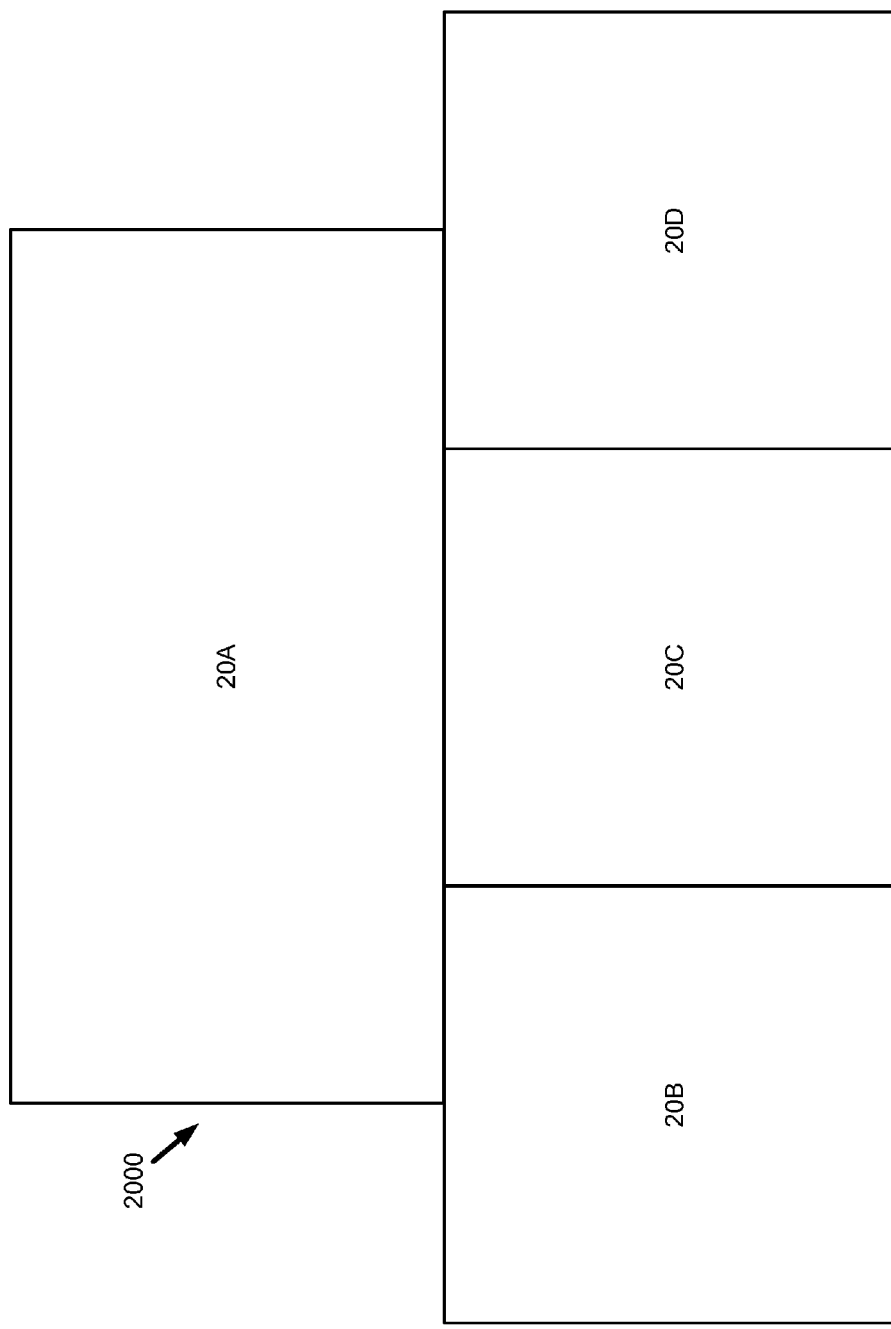

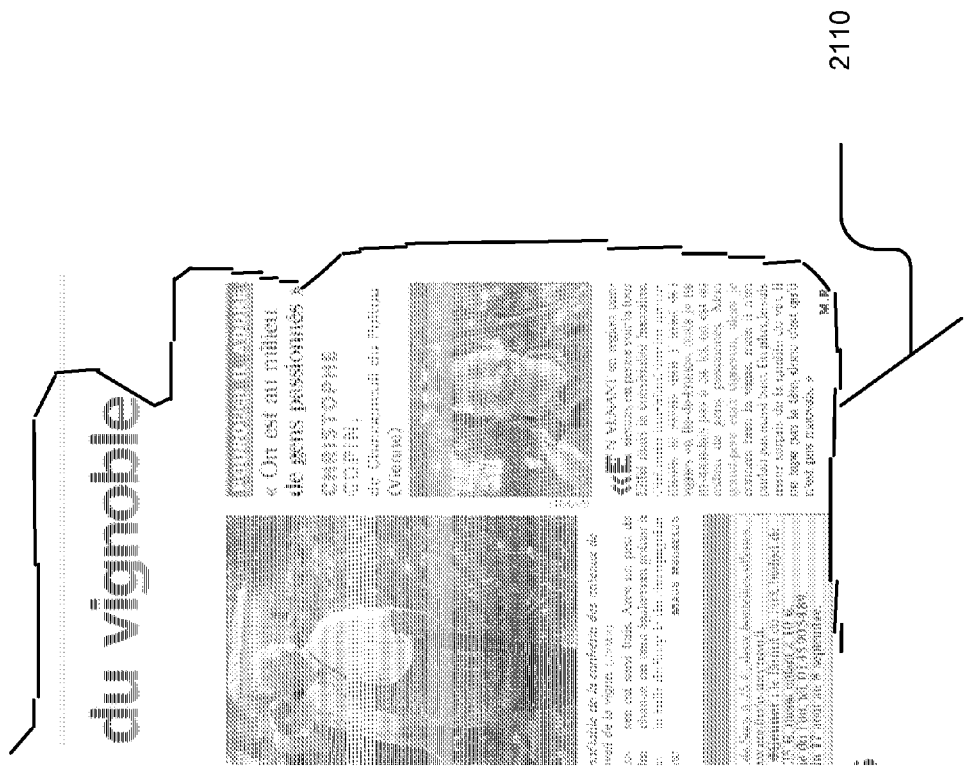

ns, filed Jul. 31, 2006, U.S. patent application Ser. No. 11/461,032, titled "Triggering Applications Based On A Captured Text In A Mixed Media Environment," filed Jul. 31, 2006, U.S. patent application Ser. No. 11/461,049, titled "Triggering Applications For Distributed Action Execution And Use Of Mixed Media Recognition As A Control Input," filed Jul. 31, 2006, U.S. patent application Ser. No. 11/461,109, titled "Searching Media Content For Objects Specified Using Identifiers," filed Jul. 31, 2006, U.S. patent application Ser. No. 11/827,530, titled "User Interface For Three-Dimensional Navigation," filed Jul. 11, 2007, U.S. patent application Ser. No. 12/060,194, titled "Document-Based Networking With Mixed Media Reality," filed Mar. 31, 2008, U.S. patent application Ser. No. 12/059,583, titled "Invisible Junction Feature Recognition

MIXED MEDIA REALITY INDEXING AND RETRIEVAL FOR REPEATED CONTENT

CROSS REFERENCE TO RELATED APPLICATIONS

This application is related to U.S. patent application Ser. No. 11/461,017, titled "System And Methods For Creation And Use Of A Mixed Media Environment," filed Jul. 31, 2006, U.S. patent application Ser. No. 11/461,279, titled "Method And System For Image Matching In A Mixed Media Environment," filed Jul. 31, 2006, U.S. patent application Ser. No. 11/461,286, titled "Method And System For Document Fingerprinting Matching In A Mixed Media Environment," filed Jul. 31, 2006, U.S. patent application Ser. No. 11/461,294, titled "Method And System For Position-Based Image Matching In A Mixed Media Environment," filed Jul. 31, 2006, U.S. patent application Ser. No. 11/461,300, titled "Method And System For Multi-Tier Image Matching In A Mixed Media Environment," filed Jul. 31, 2006, U.S. patent application Ser. No. 11/461,126, titled "Integration And Use Of Mixed Media Documents," filed Jul. 31, 2006, U.S. patent application Ser. No. 11/461,143, titled "User Interface For Mixed Media Reality," filed Jul. 31, 2006, U.S. patent application Ser. No. 11/461,268, titled "Authoring Tools Using A Mixed Media Environment," filed Jul. 31, 2006, U.S. patent application Ser. No. 11/461,272, titled "System And Methods For Creation And Use Of A Mixed Media Environment With Geographic Location Information," filed Jul. 31, 2006, U.S. patent application Ser. No. 11/461,064, titled "System And Methods For Portable Device For Mixed Media System," filed Jul. 31, 2006, U.S. patent application Ser. No. 11/461,075, titled "System And Methods For Use Of Voice Mail And Email In A Mixed Media Environment," filed Jul. 31, 2006, U.S. patent application Ser. No. 11/461,090, titled "System And Method For Using Individualized Mixed Document," filed Jul. 31, 2006, U.S. patent application Ser. No. 11/461,037, titled "Embedding Hot Spots In Electronic Documents," filed Jul. 31, 2006, U.S. patent application Ser. No. 11/461,085, titled "Embedding Hot Spots In Imaged Documents," filed Jul. 31, 2006, U.S. patent application Ser. No. 11/461,091, titled "Shared Document Annotation," filed Jul. 31, 2006, U.S. patent application Ser. No. 11/461,095, titled "Visibly-Perceptible Hot Spots In Documents," filed Jul. 31, 2006, U.S. patent application Ser. No. 11/466,414, titled "Mixed Media Reality Brokerage Network and Methods of Use," filed Jul. 31, 2006, U.S. patent application Ser. No. 11/461,147, titled "Data Organization and Access for Mixed Media Document System," filed Jul. 31, 2006, U.S. patent application Ser. No. 11/461,164, titled "Database for Mixed Media Document System," filed Jul. 31, 2006, U.S. patent application Ser. No. 11/461,024, titled "Triggering Actions With Captured Input In A Mixed Media Environment," filed Jul. 31, 2006, U.S. patent application Ser. No. 11/461,032, titled "Triggering Applications Based On A Captured Text In A Mixed Media Environment," filed Jul. 31, 2006, U.S. patent application Ser. No. 11/461,049, titled "Triggering Applications For Distributed Action Execution And Use Of Mixed Media Recognition As A Control Input," filed Jul. 31, 2006, U.S. patent application Ser. No. 11/461,109, titled "Searching Media Content For Objects Specified Using Identifiers," filed Jul. 31, 2006, U.S. patent application Ser. No. 11/827,530, titled "User Interface For Three-Dimensional Navigation," filed Jul. 11, 2007, U.S. patent application Ser. No. 12/060,194, titled "Document-Based Networking With Mixed Media Reality," filed Mar. 31, 2008, U.S. patent application Ser. No. 12/059,583, titled "Invisible Junction Feature Recognition For Document Security Or Annotation," filed Mar. 31, 2008, U.S. patent application Ser. No. 12/060,198, titled "Document Annotation Sharing," filed Mar. 31, 2008, U.S. patent application Ser. No. 12/060,200, titled "Ad Hoc Paper-Based Networking With Mixed Media Reality," filed Mar. 31, 2008, U.S. patent application Ser. No. 12/060,206, titled "Indexed Document Modification Sharing With Mixed Media Reality," filed Mar. 31, 2008, U.S. patent application Ser. No. 12/121,275, titled "Web-Based Content Detection In Images, Extraction And Recognition," filed May 15, 2008, U.S. patent application Ser. No. 11/776,510, titled "Invisible Junction Features For Patch Recognition," filed Jul. 11, 2007, U.S. patent application Ser. No. 11/776,520, titled "Information Retrieval Using Invisible Junctions and Geometric Constraints," filed Jul. 11, 2007, U.S. patent application Ser. No. 11/776,530, titled "Recognition And Tracking Using Invisible Junctions," filed Jul. 11, 2007, and U.S. patent application Ser. No. 11/777,142, titled "Retrieving Documents By Converting Them to Synthetic Text," filed Jul. 12, 2007, U.S. patent application Ser. No. 12/210,511, titled "Architecture For Mixed Media Reality Retrieval Of Locations And Registration Of Images," filed Sep. 15, 2008; U.S. patent application Ser. No. 12/210,519, titled "Automatic Adaptation Of An Image Recognition System To Image Capture Devices," filed Sep. 15, 2008; U.S. patent application Ser. No. 12/210,532, titled "Computation Of A Recognizability Score (Quality Predictor) For Image Retrieval," filed Sep. 15, 2008; U.S. patent application Ser. No. 12/210,540, titled "Combining Results Of Image Retrieval Processes" filed Sep. 15, 2008; U.S. patent application Ser. No. 12/240,590, titled "Mixed Media Reality Recognition Using Multiple Specialized Indexes," filed Sep. 29, 2008; U.S. patent application Ser. No. 12/240,596, titled "Multiple Index Mixed Media reality Recognition Using Unequal Priority Indexes," filed Sep. 29, 2008; all of which are incorporated by reference herein in their entirety.

BACKGROUND OF THE INVENTION

1. Field of the Invention

The invention relates to techniques for indexing and searching for mixed media documents formed from at least two media types, and more particularly, to recognizing images and other data using Mixed Media Reality (MMR) recognition that uses printed media in combination with electronic media to retrieve mixed media documents. More particularly, the present invention relates to the creation and use of a hierarchical index for performing MMR recognition in systems having repeated image content.

2. Description of the Related Art

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as news papers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem in the prior art is that the image capture devices that are most prevalent and common as part of mobile computing devices (e.g., cell phones) produce low-quality images. In attempting to compare the low-quality images to pristine versions of printed documents, recognition is very difficult if not impossible. Thus there is a need for a method for recognizing low-quality images.

A second problem in the prior art is that the image recognition process is computationally very expensive and can require seconds if not minutes to accurately recognize the page and location of a pristine document from an input query image. This can especially be a problem with a large data set, for example, millions of pages of documents. Thus, there is a need for mechanisms to improve the speed in which recognition can be performed.

A third problem in the prior is that comparison and recognition of multiple document pages with similar content yields too many matches. Some common examples are: boiler plate text in contracts and other legal documents, forms or templates filled by hand or electronically, multiple versions of the same document, regional editions of a newspaper, reused figures in presentations, hankos, etc. When the layout of two or more different document pages is identical in some region, and an image patch is taken of that region, it is theoretically impossible to determine from which document the patch image was taken. Moreover, another problem with repeated content occurs when two document pages are very similar, except in a very small area (this occurs for example in multiple form instances of the same form template). In this case existing systems may get confused as usual document scoring metrics will assign very high scores to all form instances matching the correct template.

The prior art recognition systems fail to compare and recognize multiple document pages with similar content for a number of reasons. Some MMR systems (such as Path Coding) do not return any matches if two or more indexed documents closely match a given patch. This occurs because the ratio of scores of the two most similar documents is used as a measure of confidence in the retrieval. Thus, in these systems, patches matching multiple documents will be rejected as not being sufficiently discriminative and no matching documents are returned. Other recognition systems return only one of the matching documents at random when multiple documents match a given patch. This occurs because identical documents may get different scores during retrieval where heuristics are used to accelerate document scoring, or depending on the order in which documents were indexed (This occurs in invisible junction, and brick wall coding). These problems are exacerbated, when the matching parts among documents are not numerically identical (as would be obtained through printing a digital file) but merely very similar (as would occur when scanning forms).

SUMMARY OF THE INVENTION

The present invention overcomes the deficiencies of the prior art with a system and method for indexing and retrieval of document images in an MMR system having repeated content. The system is particularly advantageous because it provides one or more hierarchical shared content indices that produce faster and/or more accurate search results. The system is also advantageous because the number and configuration of the hierarchical shared content indices is automated, scalable and efficient for processing documents with partially repeated content. The system is also advantageous because it provides a hierarchy of traditional flat MMR indexes that produce faster and/or more accurate search results.

In one embodiment, the MMR system comprises a plurality of mobile devices, a computer, a pre-processing server or MMR gateway, and an MMR matching unit. Some embodiments also include an MMR publisher. The mobile devices are communicatively coupled to the pre-processing server or MMR gateway to send retrieval requests including image queries and other contextual information. The pre-processing server or MMR gateway processes the retrieval request and generates an image query that is passed on to the MMR matching unit. The MMR matching unit includes a dispatcher, a plurality of recognition units, and index tables, as well as an image registration unit. The MMR matching unit receives the image query and identifies a result including a document, the page, and the location on the page corresponding to the image query. The MMR matching unit according to one embodiment includes a hierarchical shared content index (HSCI) and a hierarchical MMR index (HMI), and associated methods of use for processing images where the MMR system includes repeated content. The result is returned to the mobile device via the pre-processing server or MMR gateway. In one embodiment, the system includes an MMR matching plug-in installed on the mobile device to filter, pre-process, or search for images on the device before they are included as part of a retrieval request.

The present invention also includes a number of novel methods including a method for adding an image to a hierarchical shared content index and associated hierarchical MMR index; a method for deleting an image from the hierarchical shared content index and associated hierarchical MMR index, and a method for using the hierarchical shared content index in combination with the hierarchical MMR index for image recognition.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIGS. 15C, 15C1, 15C2, 15C3, 15C4, 15C5 and 15C6 are a block diagram of another of a hierarchical shared content index.

FIGS. 15D, 15D1, 15D2, 15D3, 15D4 and 15D5 are a block diagram of another of a hierarchical MMR index.

FIGS. 20, 20A, 20B, 20C and 20D are a graphic representation of an example hierarchical shared content index for an set of forms.

FIGS. 21, 21A, 21B, 21C and 21D are a graphic representation of an example hierarchical shared content index for shared content using in a newspaper.

DETAILED DESCRIPTION OF PREFERRED EMBODIMENTS

Figure 1A:
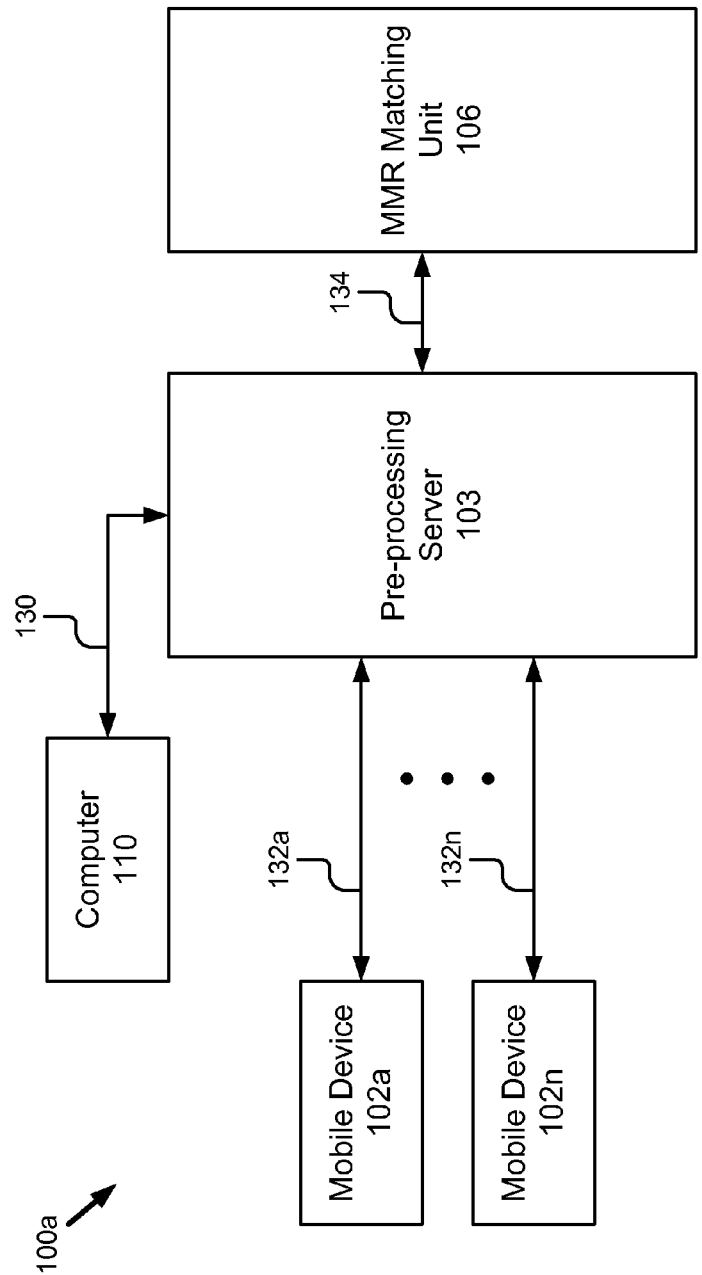
FIG. 1A is a block diagram of one embodiment of a system of mixed media reality using multiple indexes in accordance with the present invention.

An architecture for a mixed media reality (MMR) system 100 capable of receiving the query images and returning document pages and location as well as receiving images, hot spots, and other data and adding such information to the MMR system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to use with a conventional mass media publisher, in particular a newspaper publisher. However, the present invention applies to any type of computing systems and data processing in which multiple types of media including electronic media and print media are used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1A shows an embodiment of an MMR system 100a in accordance with the present invention. The MMR system 100a comprises a plurality of mobile devices 102a-102n, a pre-processing server 103, and an MMR matching unit 106. In an alternative embodiment, the pre-processing server 103 and its functionality are integrated into the MMR matching unit 106. The present invention provides an MMR system 100a for processing image queries across multiple indexes, including high priority indexes, and updating the same. The MMR system 100a is particularly advantageous because it provides smaller, more specialized indexes that provide faster and/or more accurate search results. The MMR system 100a is also advantageous because its unique architecture can be easily adapted and updated.

The mobile devices 102a-102n are communicatively coupled by signal lines 132a-132n, respectively, to the pre-processing server 103 to send a "retrieval request." A retrieval request includes one or more of "image queries," other contextual information, and metadata. In one embodiment, an image query is an image in any format, or one or more features of an image. Examples of image queries include still images, video frames and sequences of video frames. The mobile devices 102a-102n are mobile computing devices such as mobile phones, which include a camera to capture images. It should be understood that the MMR system 100a will be utilized by thousands or even millions of users. Thus, even though only two mobile devices 102a, 102n are shown, those skilled in the art will appreciate that the pre-processing server 103 may be simultaneously coupled to, receive and respond to retrieval requests from numerous mobile devices 102a-102n. Alternate embodiments for the mobile devices 102a-102n are described in more detail below with reference to FIGS. 2A and 2B.

As noted above, the pre-processing server 103 is able to couple to thousands if not millions of mobile computing devices 102a-102n and service their retrieval requests. The pre-processing server 103 also may be communicatively coupled to the computer 110 by signal line 130 for administration and maintenance of the pre-processing server 103. The computer 110 can be any conventional computing device such as a personal computer. The main function of the pre-processing server 103 is processing retrieval requests from the mobile devices 102a-102n and returning recognition results back to the mobile devices 102a-102n. In one embodiment, the recognition results include one or more of a Boolean value (true/false) and if true, a page ID, and a location on the page. In other embodiments, the recognition results also include one or more from the group of actions, a message acknowledging that the recognition was successful (or not) and consequences of that decision, such as the sending of an email message, a document, actions defined within a portable document file, addresses such as URLs, binary data such as video, information capable of being rendered on the mobile device 102, menus with additional actions, raster images, image features, etc. The pre-processing server 103 generates an image query and recognition parameters from the retrieval request according to one embodiment, and passes them on to the MMR matching unit 106 via signal line 134. Embodiments and operation of the pre-processing server 103 are described in greater detail below with reference to FIG. 3A.

The MMR matching unit 106 receives the image query from the pre-processing server 103 on signal line 134 and sends it to one or more of recognition units to identify a result including a document, the page and the location on the page corresponding to the image query, referred to generally throughout this application as the "retrieval process." The result is returned from the MMR matching unit 106 to the pre-processing server 103 on signal line 134. In addition to the result, the MMR matching unit 106 may also return other related information such as hotspot data. The MMR matching unit 106 also includes components for receiving new content and updating and reorganizing index tables used in the retrieval process. The process of adding new content to the MMR matching unit 106 is referred to generally throughout this application as the "registration process." Various embodiments of the MMR matching unit 106 and is components are described in more detail below with reference to FIG. 4A-8.

Figure 1B:
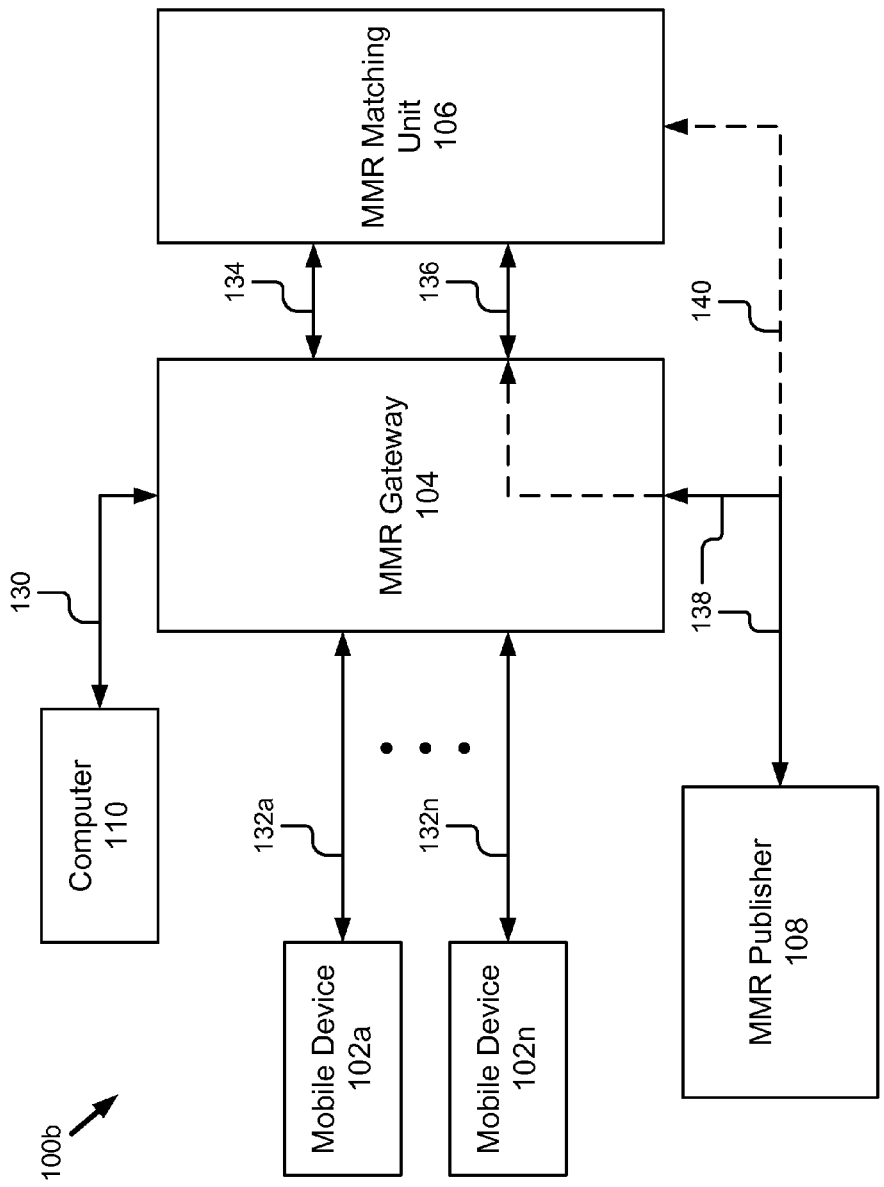
FIG. 1B is a block diagram of another embodiment of a system of mixed media reality using multiple indexes in accordance with the present invention.

FIG. 1B shows an embodiment of a MMR system 100b in accordance with the present invention. The MMR system 100b comprises a plurality of mobile devices 102a-102n, an MMR gateway 104, an MMR matching unit 106, an MMR publisher 108 and a computer 110. The present invention provides, in one aspect, an MMR system 100b for use in newspaper publishing. The MMR system 100b for newspaper publishing is particularly advantageous because provides an automatic mechanism for a newspaper publisher to register images and content with the MMR system 100b. The MMR system 100b for newspaper publishing is also advantageous because it has a unique architecture adapted to respond to image queries formed of image portions or pages of a printed newspaper. The MMR system 100b is also advantageous because it provides smaller, more specialized indexes that provide faster and/or more accurate search results, and its unique architecture can be easily adapted and updated.

The mobile devices 102a-102n are similar to those described above, except that they are communicatively coupled by signal lines 132a-132n, respectively, to the MMR gateway 104 to send a "retrieval request," rather than to the pre-processing server 103. It should be understood that the MMR system 100b will be utilized by thousands or even millions of users that receive a traditional publication such as a daily newspaper.

As noted above, the MMR gateway 104 is able to couple to hundreds if not thousands of mobile computing devices 102a-102n and service their retrieval requests. The MMR gateway 104 is also communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100b. The computer 110 in any conventional computing device such as a personal computer. The main function of the MMR gateway 104 is processing retrieval requests from the mobile devices 102a-102n and return recognition results back to the mobile devices 102a-102n. The types of recognition results produced by the MMR gateway 104 are similar as to those described above in conjunction with pre-processing server 103. The MMR gateway 104 processes received retrieval requests by performing user authentication, accounting, analytics and other communication. The MMR gateway 104 also generates an image query and recognition parameters from the retrieval request, and passes them on to the MMR matching unit 106 via signal line 134. Embodiments and operation of the MMR gateway 104 are described in greater detail below with reference to FIG. 3B.

The MMR matching unit 106 is similar to that described above in conjunction with FIG. 1A, except that the MMR matching unit 106 receives the image query from the MMR gateway 104 on signal line 134 as part of the "retrieval process." The result is returned from the MMR matching unit 106 to the MMR gateway 104 on signal line 134. In one embodiment, the MMR matching unit 106 is coupled to the output of the MMR publisher 108 via signal lines 138 and 140 to provide new content used to update index tables of the MMR matching unit 106. In an alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information stores it and passes the images page references and other information to the MMR matching unit 106 for updating of the index tables.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data, hotspot data, and a unique page identification number. In one embodiment, this is a document in portable document format by Adobe Corp. of San Jose Calif. and bounding box information.

Mobile Device 102

Figure 2A:
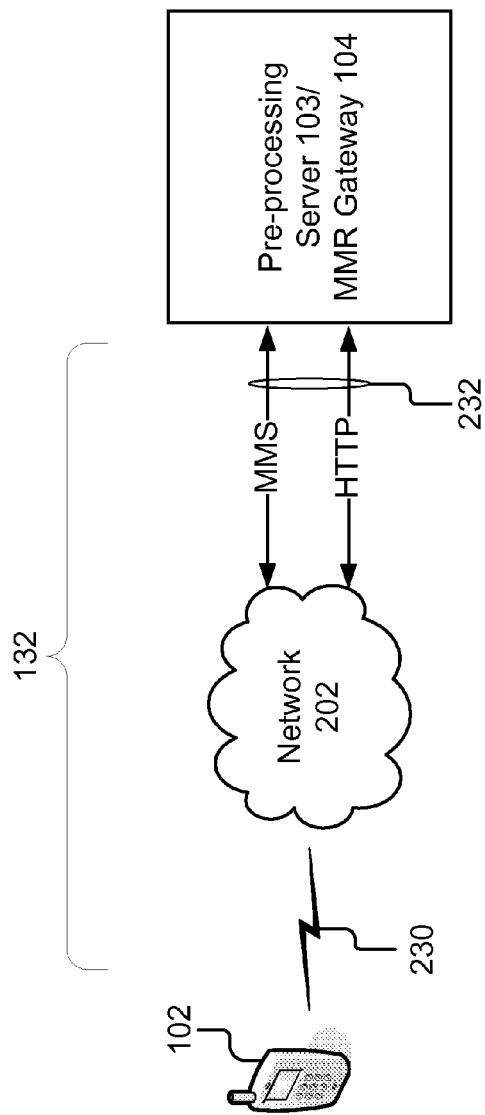
FIG. 2A is a block diagram of a first embodiment of a mobile device, network, and pre-processing server or MMR gateway configured in accordance with the present invention.
Figure 2B:
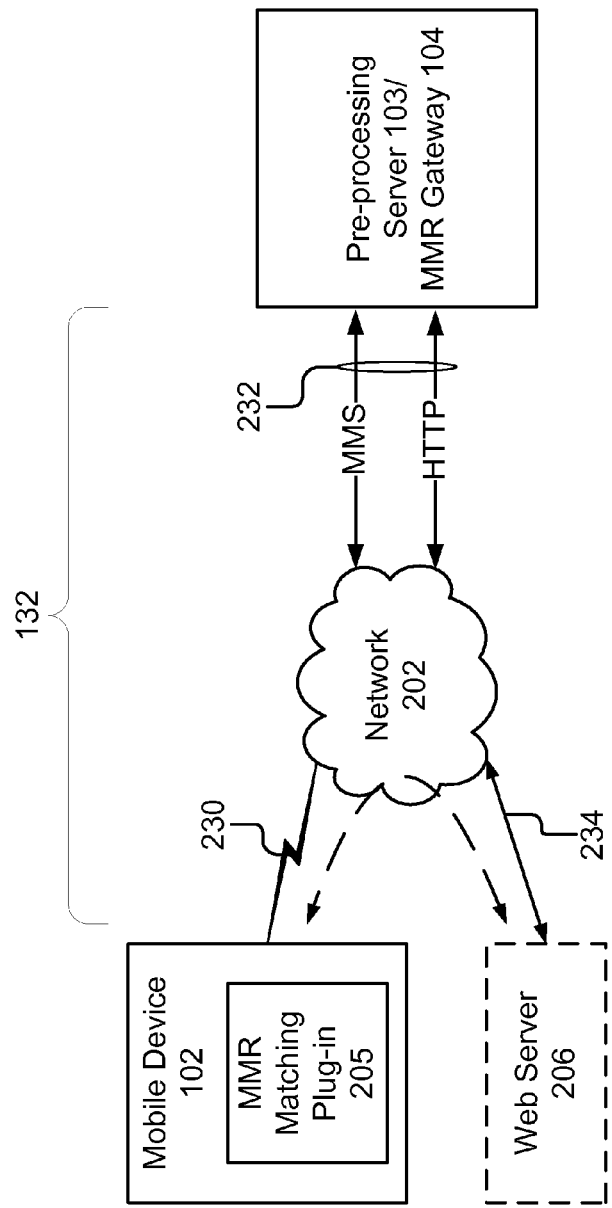
FIG. 2B is a block diagram of a second embodiment of a mobile device, network, and pre-processing server or MMR gateway configured in accordance with the present invention.

Referring now to FIGS. 2A and 2B, the first and second embodiment for the mobile device 102 will be described.

FIG. 2A shows a first embodiment of the coupling 132 between the mobile device 102 and the pre-processing server 103 or MMR gateway 104, according to the above-described embodiments of system 100a, 100b. In the embodiment of FIG. 2A, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the pre-processing server 103 or MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the pre-processing server 103 or MMR gateway 104. In an alternate embodiment for example, Bluetooth®, Wi-Fi, or any other wireless communication protocol may be used as part of communication coupling between the mobile device 102 and the pre-processing server 103 or MMR gateway 104. The mobile device 102 and the pre-processing server 103 or MMR gateway 104 could be coupled in any other ways understood by those skilled in the art so long as the mobile device 102 is able to transmit images to the pre-processing server 103 or MMR gateway 104 and the pre-processing server 103 or MMR gateway 104 is able to respond by sending document identification, page number, and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino Calif. The second embodiment has a number of components similar to those of the first embodiment, and therefore, like reference numbers are used to reference like components with the same or similar functionality. Notable differences between the first embodiment and the second embodiment include an MMR matching plug-in 205 that is installed on the mobile device 102, and a Web server 206 coupled by signal line 234 to the network 202. The MMR matching plug-in 205 analyzes the images captured by the mobile device 102, acting similar to dispatcher 402 as discussed in conjunction with FIG. 4A. The MMR matching plug-in 205 provides additional information produced by its analysis and includes that information as part of the retrieval request sent to the pre-processing server 103 or MMR gateway 104 to improve the accuracy of recognition. In an alternate embodiment, the output of the MMR matching plug-in 205 is used to select which images are transmitted from the mobile device 102 to the pre-processing server 103 or MMR gateway 104. For example, only those images that have a predicted quality above a predetermined threshold (e.g., images capable of being recognized) are transmitted from the mobile device 102 to the pre-processing server 103 or MMR gateway 104. Since transmission of images requires significant bandwidth and the communication channel 230 between the mobile device 102 and the network 202 may have limited bandwidth, using the MMR matching plug-in 205 to select which images to transmit is particularly advantageous. In addition, the MMR matching plug-in 205 may allow for recognition on the mobile device 102 it sells, e.g., using a device HPI 411' such as will be discussed in conjunction with FIG. 6F. Thus, in one embodiment, the MMR matching plug-in 205 acts as a mini-MMR matching unit 104.

The second embodiment shown in FIG. 2B also illustrates how the results returned from the pre-processing server 103 or MMR gateway 104, or other information provided by the MMR matching plug-in 205, can be used by the mobile device 102 to access hotspot or augmented information available on a web server 206. In such a case, the results from the pre-processing server 103 or MMR gateway 104 or output of the MMR matching plug-in 205 would include information that can be used to access Web server 206 such as with a conventional HTTP request and using web access capabilities of the mobile device 102.

It should be noted that regardless of whether the first embodiment or the second embodiment of the mobile device 102 is used, the mobile device 102 generates the retrieval request that may include: a query image, a user or device ID, a command, and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), quality predictor results, image features, etc.

Referring now to FIGS. 2C-2H, various embodiments are shown of a plug-in (client 250) for the mobile device 102, the pre-processing server 103 or MMR gateway 104 (referred to as just MMR gateway for FIGS. 2C-2H), and MMR matching unit 106 represented generally as including a server 252 that has various possible configurations in accordance with the present invention. More particularly, FIGS. 2C-2H illustrate how the components of the plug-in or client 250 can have varying levels of functionality and the server 252 can also have varying levels of functionality that parallel or match with the functionality of the client 250. In the various embodiments of FIGS. 2C-2H, either the client 250 or the server 252 includes: an MMR database 254; a capture module 260 for capturing an image or video; a preprocessing module 262 for processing the image before feature extraction for improved recognition such as quality prediction; a feature extraction module 264 for extracting image features; a retrieval module 266 for using features to retrieve information from the MMR database 254; a send message module 268 for sending messages from the server 252 to the client 250; an action module 270 for performing an action; a preprocessing and prediction module 272 for processing the image prior to feature extraction; a feedback module 274 for presenting information to the user and receiving input; a sending module 276 for sending information from the client 250 to the server 252; and a streaming module 278 for streaming video from the client 250 to the server 252.

Figure 2C:
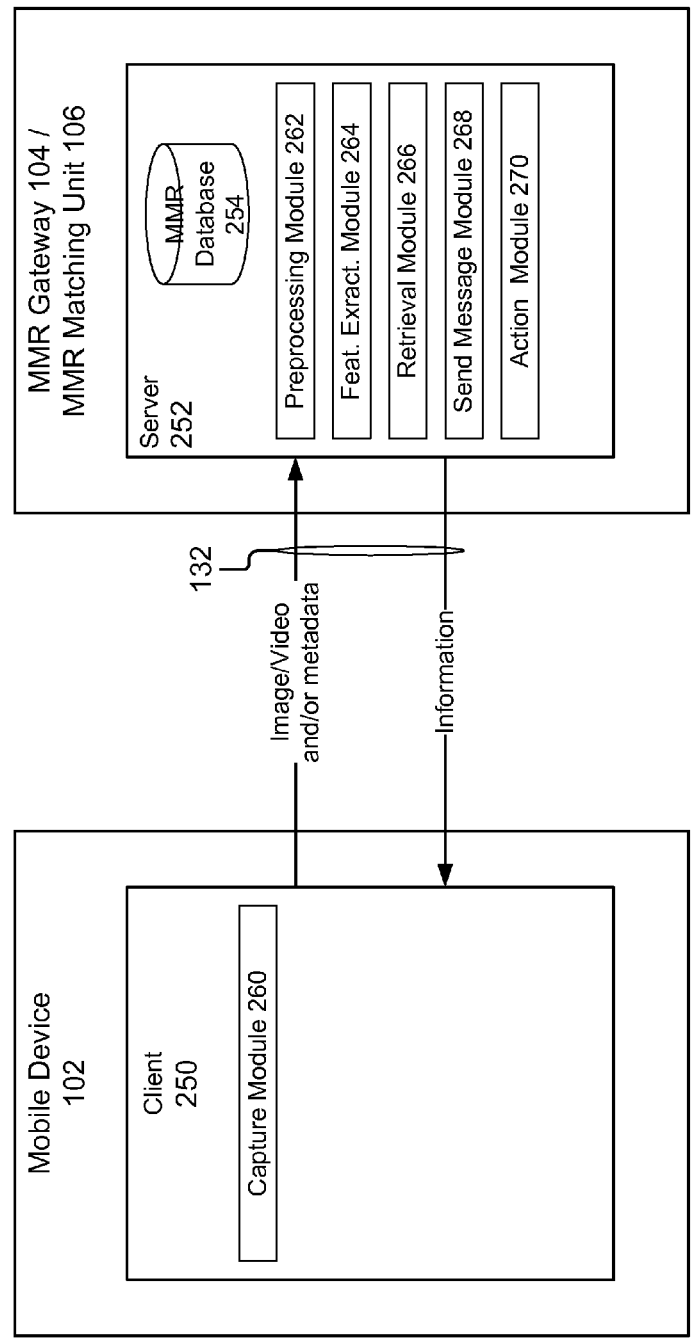
FIGS. 2C-2H are block diagrams of various embodiments of a mobile device plug-in, pre-processing server or MMR gateway, and MMR matching unit showing various possible configurations in accordance with the present invention.

FIG. 2C illustrates one embodiment for the client 250 and the server 252 in which the client 250 sends an image or video and/or metadata to the server 252 for processing. In this embodiment, the client 250 includes the capture module 260. The server 252 includes: the MMR database 254, the preprocessing module 262, the feature extraction module 264, the retrieval module 266, the send message module 268 and the action module 270.

Figure 2D:
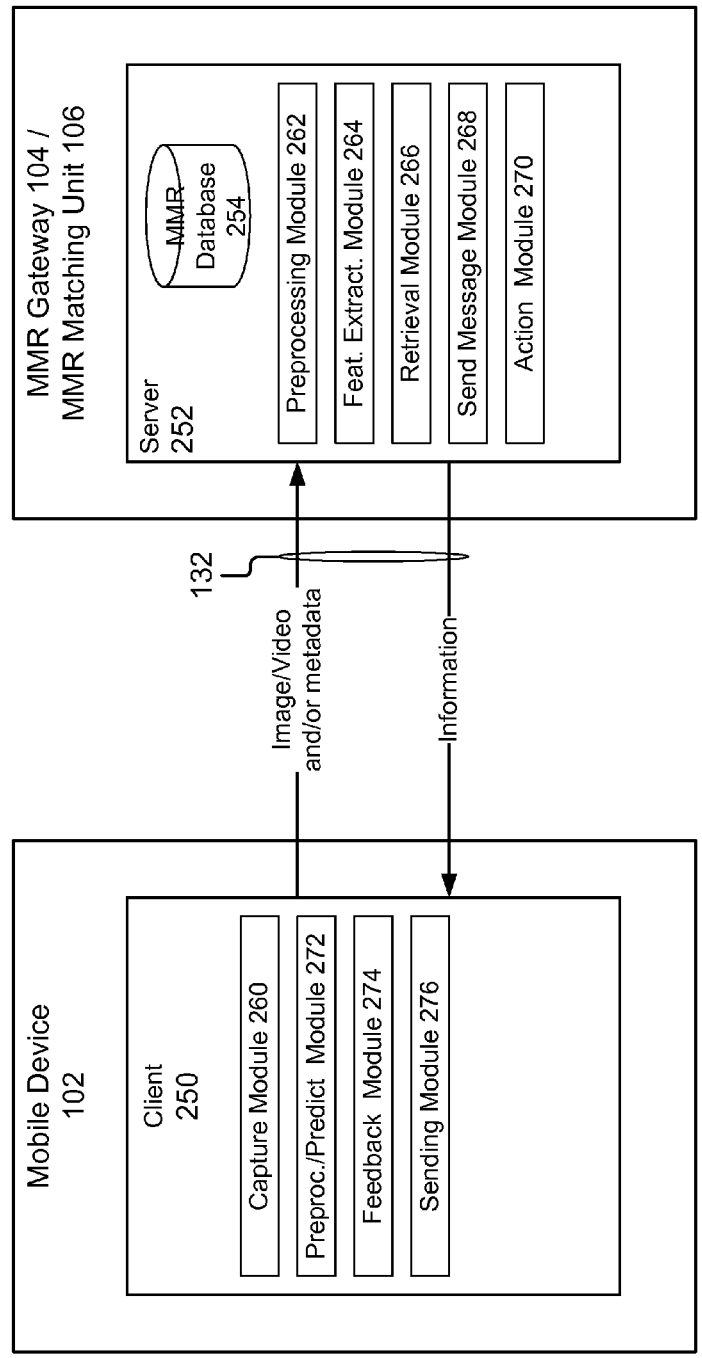

FIG. 2D illustrates another embodiment for the client 250 and the server 252 in which the client 250 captures an image or video, runs quality prediction, and sends an image or video and/or metadata to the server 252 for processing. In this embodiment, the client 250 includes: the capture module 260, the preprocessing and prediction module 272, the feedback module 274 and the sending module 276. The server 252 includes: the MMR database 254, the preprocessing module 262, the feature extraction module 264, the retrieval module 266, the send message module 268 and the action module 270. It should be noted that in this embodiment the image sent to the server 252 may be different than the captured image. For example, it may be digitally enhanced, sharpened, or may be just binary data.

Figure 2E:
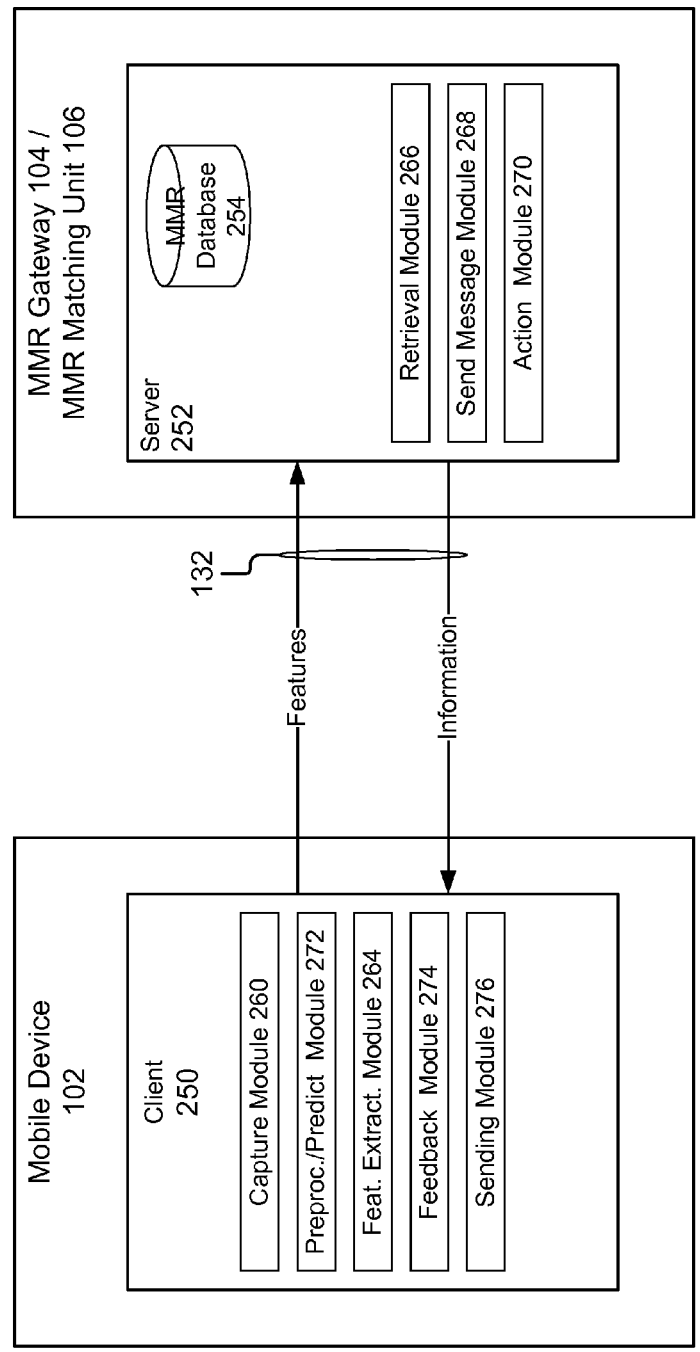

FIG. 2E illustrates another embodiment for the client 250 and the server 252 in which the client 250 captures an image or video, performs feature extraction and sends image features to the server 252 for processing. In this embodiment, the client 250 includes: the capture module 260, the feature extraction module 264, the preprocessing and prediction module 272, the feedback module 274 and the sending module 276. The server 252 includes: the MMR database 254, the retrieval module 266, the send message module 268 and the action module 270. It should be noted that in this embodiment feature extraction may include preprocessing. After features are extracted, the preprocessing and prediction module 272 may run on these features and if the quality of the features is not satisfactory, the user may be asked to capture another image.

Figure 2F:
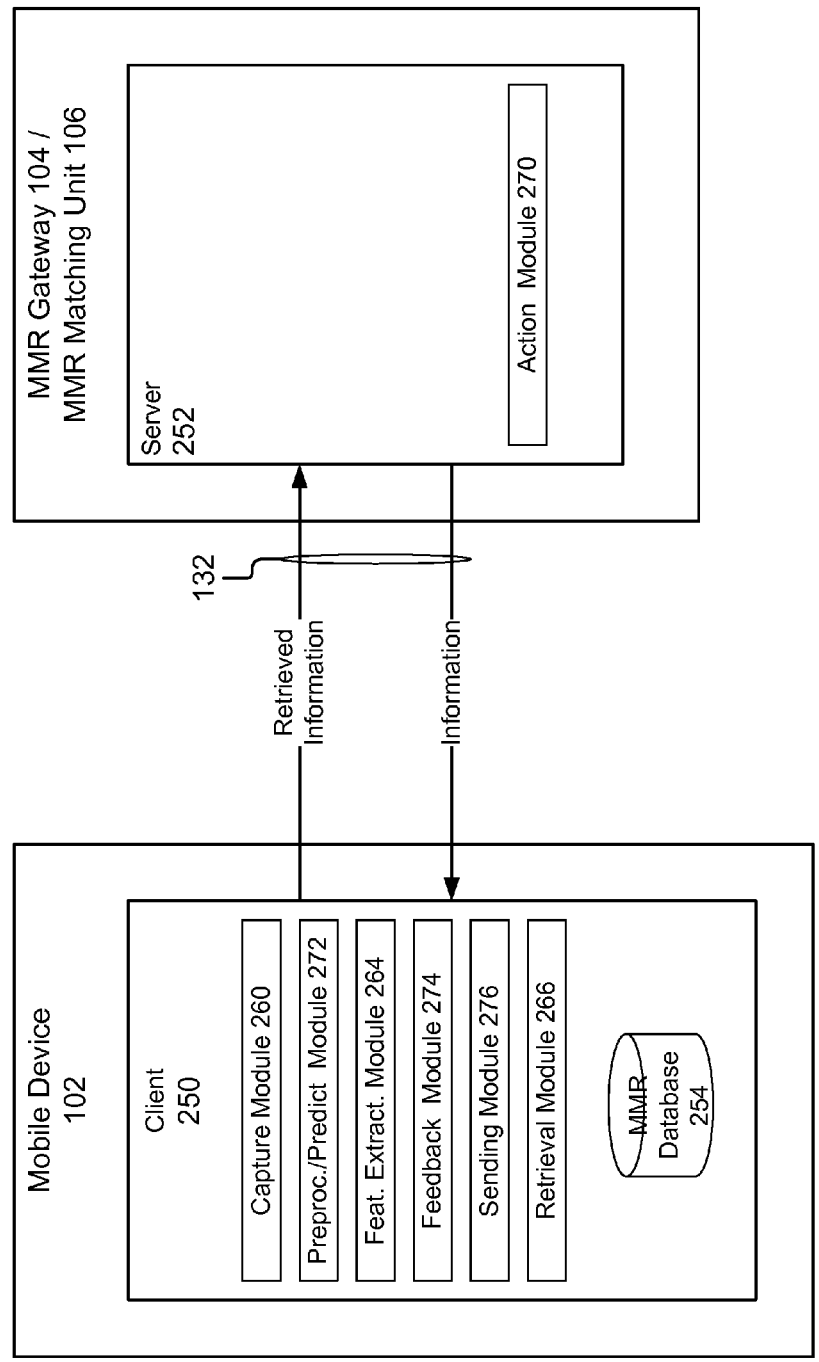

FIG. 2F illustrates another embodiment for the client 250 and the server 252 in which the entire retrieval process is performed at the client 250. In this embodiment, the client 250 includes: the capture module 260, the feature extraction module 264, the preprocessing and prediction module 272, the feedback module 274 and the sending module 276, the MMR database 254, and the retrieval module 266. The server 252 need only have the action module 270.

Figure 2G:
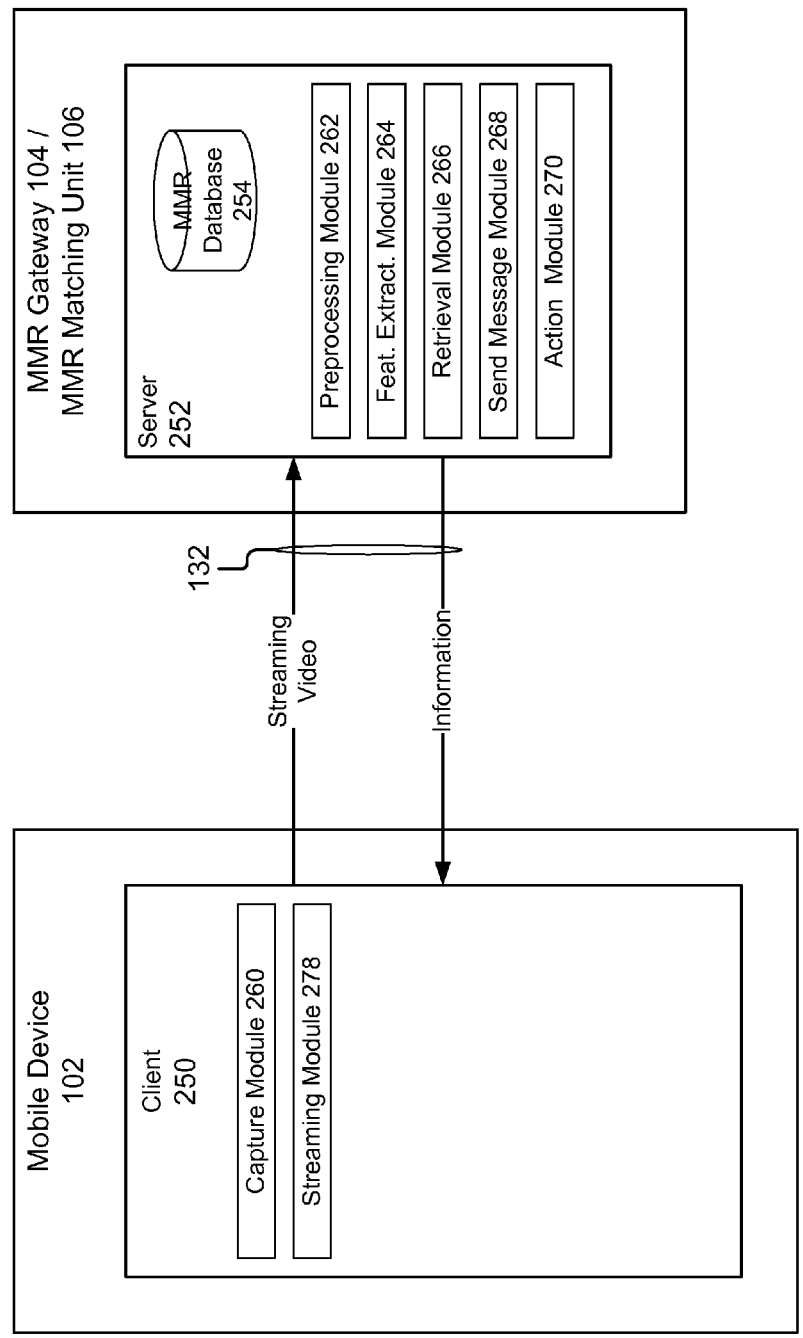

FIG. 2G illustrates another embodiment for the client 250 and the server 252 in which the client 250 streams video to the server 252. In this embodiment, the client 250 includes the capture module 260 and a streaming module 278. The server 252 includes the MMR database 254, the preprocessing module 262, the feature extraction module 264, the retrieval module 266, the send message module 268 and the action module 270. Although not shown, the client 250 can run a predictor in the captured video stream and provide user feedback on where to point the camera or how to capture better video for retrieval. In a modification of this embodiment, the server 252 streams back information related to the captured video and the client 250 can overlay that information on a video preview screen.

Figure 2H:
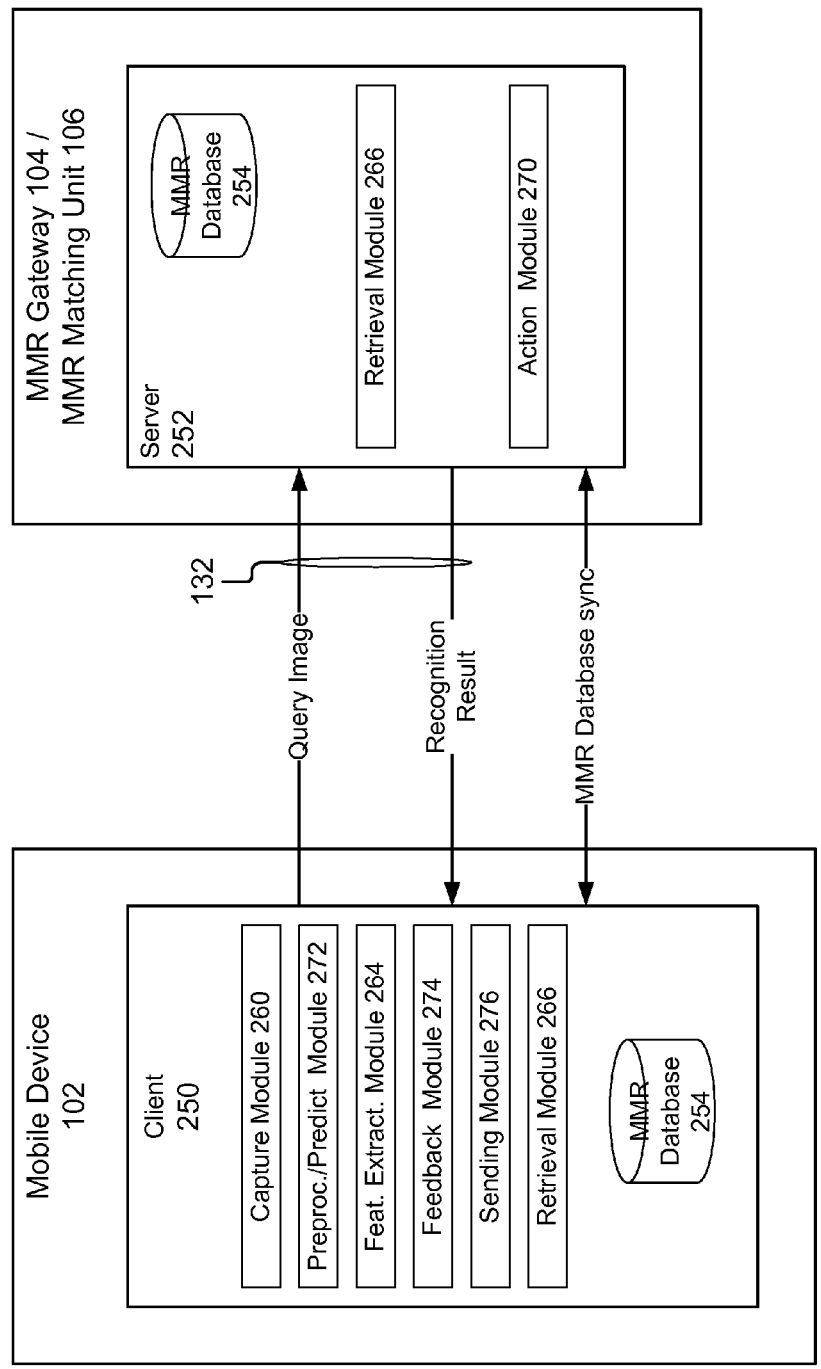

FIG. 2H illustrates another embodiment for the client 250 and the server 252 in which the client 250 runs a recognizer and the server 252 streams MMR database information to a local database operable with the client 250 based upon a first recognition result. This embodiment is similar to that described above with reference to FIG. 2F. For example, the entire retrieval process for one recognition algorithm is run at the client 250. If the recognition algorithm fails, the query is handed to the server 252 for running more complex retrieval algorithm. In this embodiment, the client 250 includes: the capture module 260, the feature extraction module 264, the preprocessing and prediction module 272, the feedback module 274, the sending module 276, the MMR database 254 (a local version), and the retrieval module 266. The server 252 includes another retrieval module 266, the action module 270 and the MMR database 254 (a complete and more complex version). In one embodiment, if the query image cannot be recognized with the local MMR database 254, the client 250 sends an image for retrieval to the server 252 and that initiates an update of the local MMR database 254. Alternatively, the client 250 may contain an updated version of a database for one recognizer, but if the query image cannot be retrieved from the local MMR database 254, then a database for another retrieval algorithm may be streamed to the local MMR database 254.

Pre-Processing Server 103

Figure 3A:
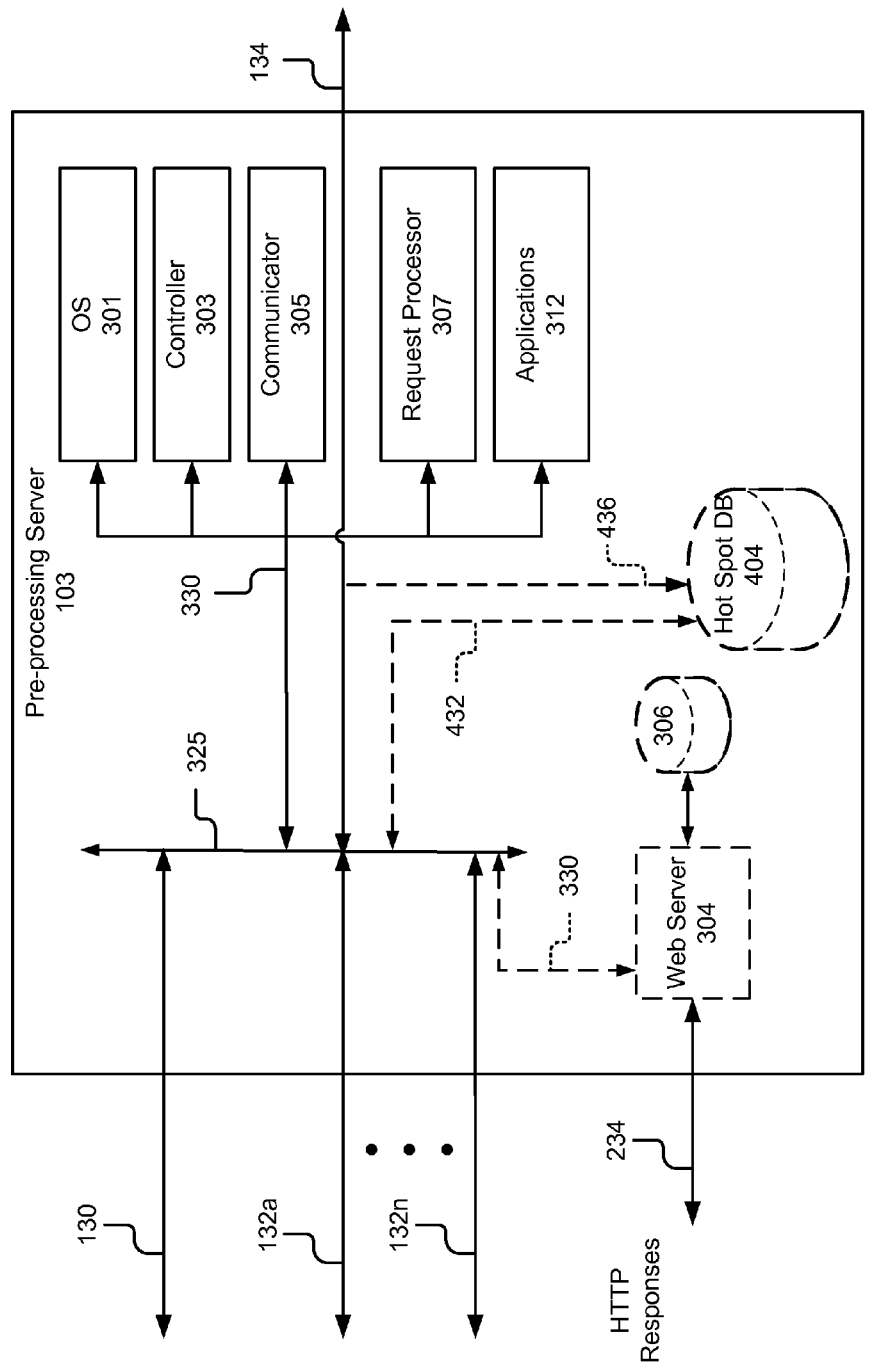
FIG. 3A is a block diagram of an embodiment of a pre-processing server in accordance with the present invention.

Referring now to FIG. 3A, one embodiment of the pre-processing server 103 is shown. This embodiment of the pre-processing server 103 comprises an operating system (OS) 301, a controller 303, a communicator 305, a request processor 307, and applications 312, connected to system bus 325. Optionally, the pre-processing server 103 also may include a web server 304, a database 306, and/or a hotspot database 404.

As noted above, one of the primary functions of the pre-processing server 103 is to communicate with many mobile devices 102 to receive retrieval requests and send responses including a status indicator (true=recognized/false=not recognized), a page identification number, a location on the page and other information, such as hotspot data. A single pre-processing server 103 can respond to thousands or millions of retrieval requests. For convenience and ease of understanding only a single pre-processing server 103 is shown in FIGS. 1A and 3A, however, those skilled in the art will recognize that in other embodiments any number of pre-processing servers 103 may be utilized to service the needs of a multitude of mobile devices 102. More particularly, the pre-processing server 103 system bus 325 is coupled to signal lines 132a-132n for communication with various mobile devices 102. The pre-processing server 103 receives retrieval requests from the mobile devices 102 via signal lines 132a-132n and sends responses back to the mobile devices 102 using the same signal lines 132a-132n. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt and jitter.

The pre-processing server 103 also is coupled to signal line 130 for communication with the computer 110. Again, for convenience and ease of understanding only a single computer 110 and signal line 130 are shown in FIGS. 1A and 3A, but any number of computing devices may be adapted for communication with the pre-processing server 103. The pre-processing server 103 facilitates communication between the computer 110 and the operating system (OS) 301, a controller 303, a communicator 305, a request processor 307, and applications 312. The OS 301, controller 303, communicator 305, request processor 307, and applications 312 are coupled to system bus 325 by signal line 330.

The pre-processing server 103 processes the retrieval request and generates an image query and recognition parameters that are sent via signal line 134, which also is coupled to system bus 325, to the MMR matching unit 106 for recognition. The pre-processing server 103 also receives recognition responses from the MMR matching unit 106 via signal line 134. More specifically, the request processor 307 processes the retrieval request and sends information via signal line 330 to the other components of the pre-processing server 103 as will be described below.

The operating system 301 is preferably a custom operating system that is accessible to computer 110, and otherwise configured for use of the pre-processing server 103 in conjunction with the MMR matching unit 106. In an alternate embodiment, the operating system 301 is one of a conventional type such as, WINDOWS®, Mac OS X®, SOLARIS®, or LINUX® based operating systems. The operating system 301 is connected to system bus 325 via signal line 330.

The controller 303 is used to control the other modules 305, 307, 312, per the description of each below. While the controller 303 is shown as a separate module, those skilled in the art will recognize that the controller 303 in another embodiment may be distributed as routines in other modules. The controller 303 is connected to system bus 325 via signal line 330.

The communicator 305 is software and routines for sending data and commands among the pre-processing server 103, mobile devices 102, and MMR matching unit 106. The communicator 305 is coupled to signal line 330 to send and receive communications via system bus 325. The communicator 305 communicates with the request processor 307 to issue image queries and receive results.

The request processor 307 processes the retrieval request received via signal line 330, performing preprocessing and issuing image queries for sending to MMR matching unit 106 via signal line 134. In some embodiments, the preprocessing may include feature extraction and recognition parameter definition, in other embodiments these parameters are obtained from the mobile device 102 and are passed on to the MMR matching unit 106. The request processor 307 also sends information via signal line 330 to the other components of the pre-processing server 103. The request processor 307 is connected to system bus 325 via signal line 330.

The one or more applications 312 are software and routines for providing functionality related to the processing of MMR documents. The applications 312 can be any of a variety of types, including without limitation, drawing applications, word processing applications, electronic mail applications, search application, financial applications, and business applications adapted to utilize information related to the processing of retrieval quests and delivery of recognition responses such as but not limited to accounting, groupware, customer relationship management, human resources, outsourcing, loan origination, customer care, service relationships, etc. In addition, applications 312 may be used to allow for annotation, linking additional information, audio or video clips, building e-communities or social networks around the documents, and associating educational multimedia with recognized documents.

System bus 325 represents a shared bus for communicating information and data throughout pre-processing server 103. System bus 325 may represent one or more buses including an industry standard architecture (ISA) bus, a peripheral component interconnect (PCI) bus, a universal serial bus (USB), or some other bus known in the art to provide similar functionality. Additional components may be coupled to pre-processing server 103 through system bus 325 according to various embodiments.

The pre-processing server 103 optionally also includes a web server 304, a database 306, and/or a hotspot database 404 according to one embodiment.

The web server 304 is a conventional type and is responsible for accepting requests from clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device, e.g., mobile devices 102, across a network such as the Internet. The Web server 304 also is coupled to signal line 330 as described above to receive Web content associated with hotspots for storage in the data store 306 and then for later retrieval and transmission in response to HTTP requests. Those skilled in the art will understand that inclusion of the Web server 304 and data store 306 as part of the pre-processing server 103 is merely one embodiment and that the Web server 304 and the data store 306 may be operational in any number of alternate locations or configuration so long as the Web server 304 is accessible to mobile devices 102 and computers 110 via the Internet.

In one embodiment, the pre-processing server 103 also includes a hotspot database 404. The hotspot database 404 is shown in FIG. 3A with dashed lines to reflect inclusion in the pre-processing server 103 is an alternate embodiment. The hotspot database 404 is coupled by signal line 436 to receive the recognition responses via line 134. The hotspot database 404 uses these recognition responses to query the database and output via line 432 and system bus 325 the hotspot content corresponding to the recognition responses. This hotspot content is included with the recognition responses sent to the requesting mobile device 102.

MMR Gateway 104

Figure 3B:
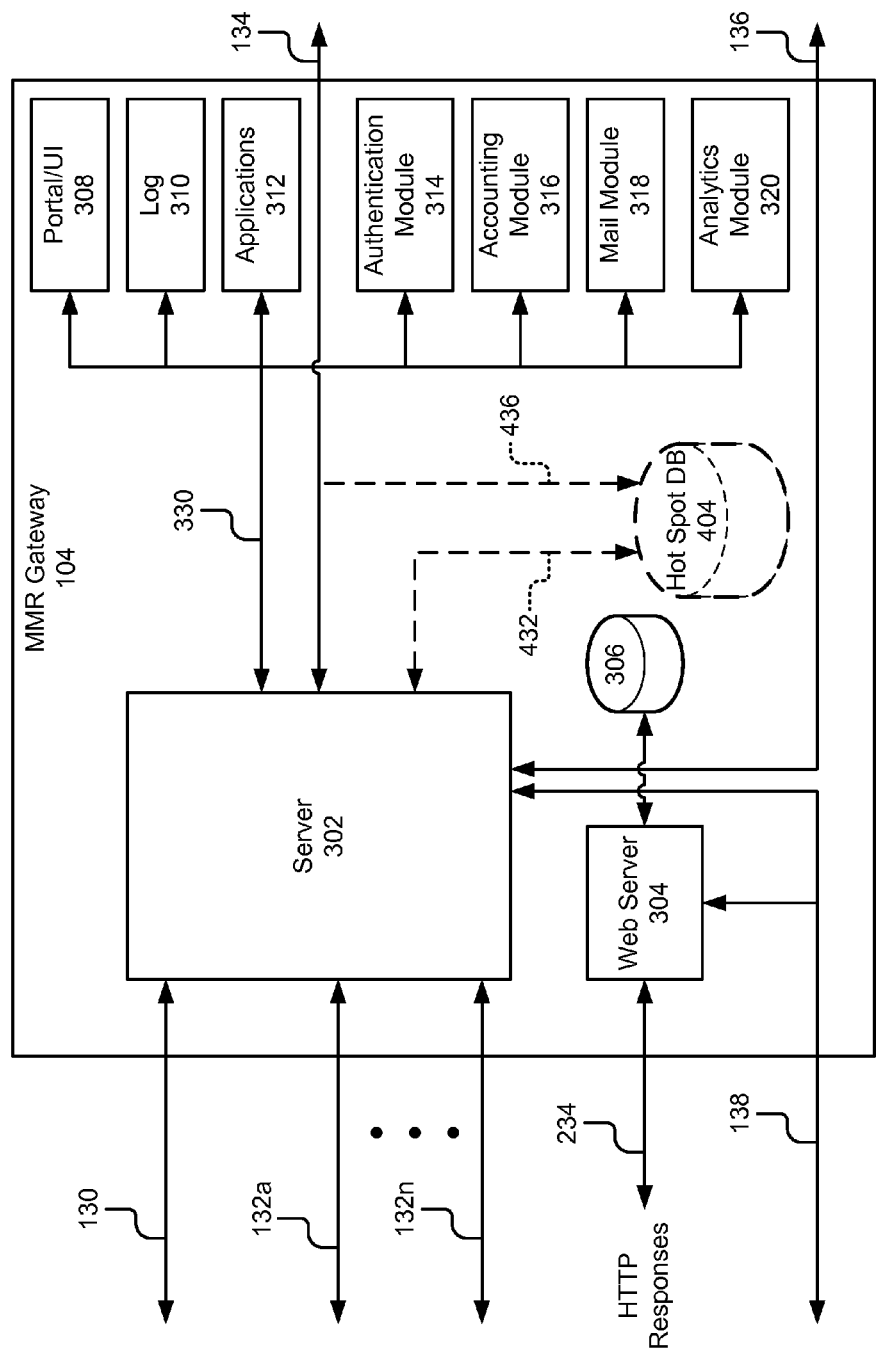
FIG. 3B is a block diagram of an embodiment of an MMR gateway in accordance with the present invention.

Referring now to FIG. 3B, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318, and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to thousands or millions of retrieval requests. For convenience and ease of understanding only a single MMR gateway 104 is shown in FIGS. 1B and 3B, however, those skilled in the art will recognize that in other embodiments any number of MMR gateways 104 may be utilized to service the needs of a multitude of mobile devices 102. More particularly, the server 302 of the MMR gateway 104 is coupled to signal lines 132*a*-132*n* for communication with various mobile devices 102. The server 302 receives retrieval requests from the mobile devices 102 via signal lines 132*a*-132*n* and sends responses back to the mobile devices 102 using the same signal lines 132*a*-132*n*. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt, and jitter.

The server 302 is also coupled to signal line 130 for communication with the computer 110. Again, for convenience and ease of understanding only a single computer 110 and signal line 130 are shown in FIGS. 1B and 3B, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the module cooperate with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via 5 signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302 receives information from the MMR publisher 108 and sends that information via signal line 136 for registration with the MMR matching unit 106.

The web server 304 is a conventional type and is responsible for accepting requests from clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal is an area where users can access business applications and the log 310 of usage.

The log 310 is a memory or storage area for storing a list of the retrieval request received by the server 302 from mobile devices 102 and all corresponding responses sent by the server 302 to the mobile device. In another embodiment, the log 310 also stores a list of the image queries generated and sent to the MMR matching unit 106 and the recognition responses received from the MMR matching unit 106. The log 310 is communicatively coupled to the server 302 by signal line 330.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval quests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 110. In one embodiment, the authentication module 314 maintains a list of user IDs and passwords corresponding to individuals who have created an account in the system 100, and therefore, are authorized to use MMR gateway 104 and the MMR matching unit 106 to process retrieval requests. The authentication module 314 is communicatively coupled by signal line 330 to the server 302. But as the server 302 receives retrieval requests they can be processed and compared against information in the authentication module 314 before generating and sending the corresponding image query on signal line 134. In one embodiment, the authentication module 314 also generates messages for the server 302 to return to the mobile device 102 instances when the mobile device is not authorized, the mobile device has not established an account, or the account for the mobile device 102 is locked such as due to abuse or lack of payment.

The accounting module 316 is software and routines for performing accounting related to user accounts and use of the MMR system 100. In one embodiment, the retrieval services are provided under a variety of different economic models such as but not limited to use of the MMR system 100 under a subscription model, a charge per retrieval request model or various other pricing models. In one embodiment, the MMR system 100 provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval request that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100. The analytics module 320 is also software and routines for measuring the effectiveness and accuracy of feature extractors and recognition performed by the MMR matching unit 106. The analytics module 320 measures use of the MMR system 100 including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 320 measures metrics of the MMR system 100 and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameter, images features, quality recognition scores and any other information generated or use by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3B with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content corresponding to the recognition responses. This hotspot content is sent to the server 302 so that it can be included with the recognition responses and sent to the requesting mobile device 102.

MMR Matching Unit 106

Figure 4A:
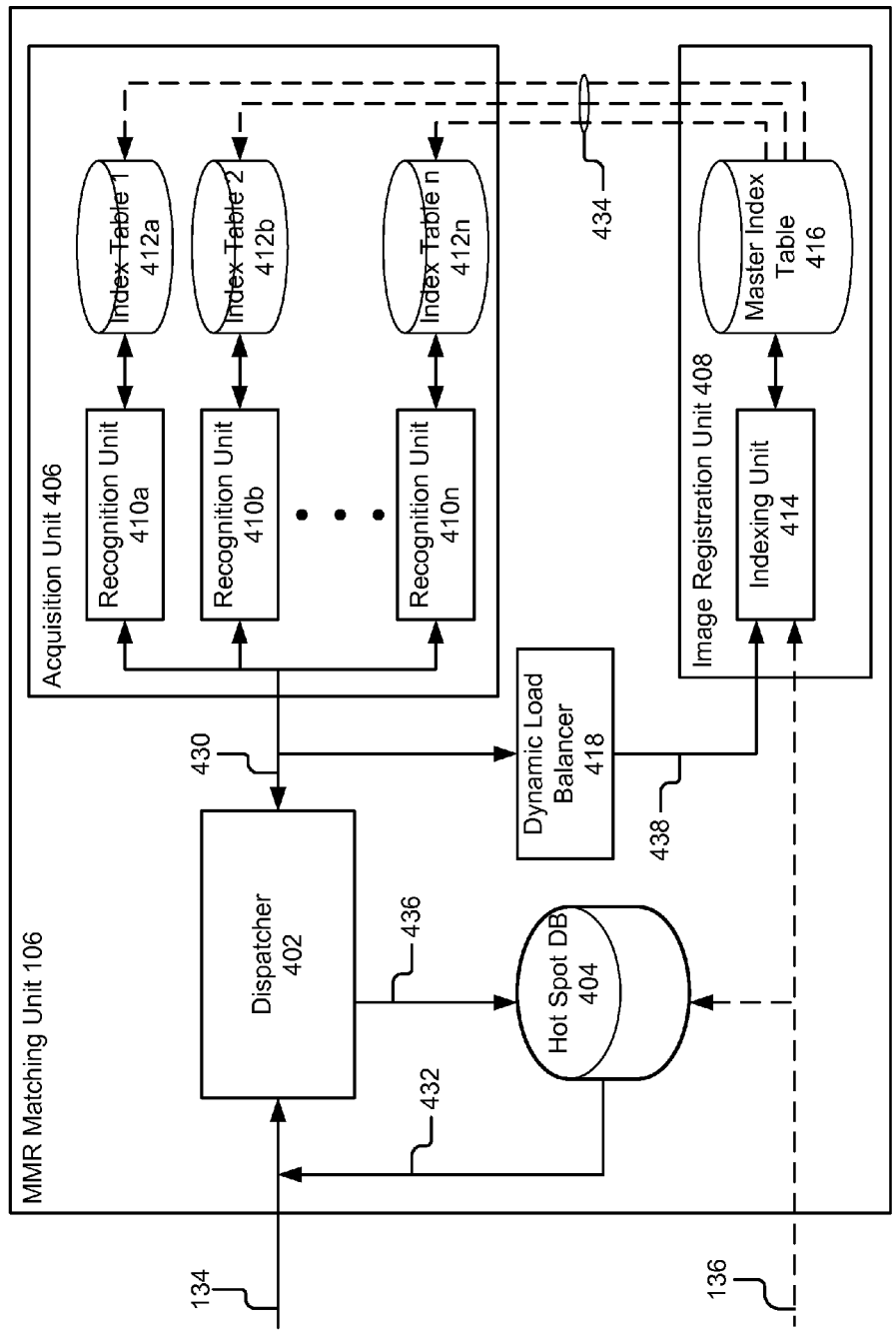
FIG. 4A is a block diagram of a first embodiment of a MMR matching unit in accordance with the present invention.
Figure 4B:
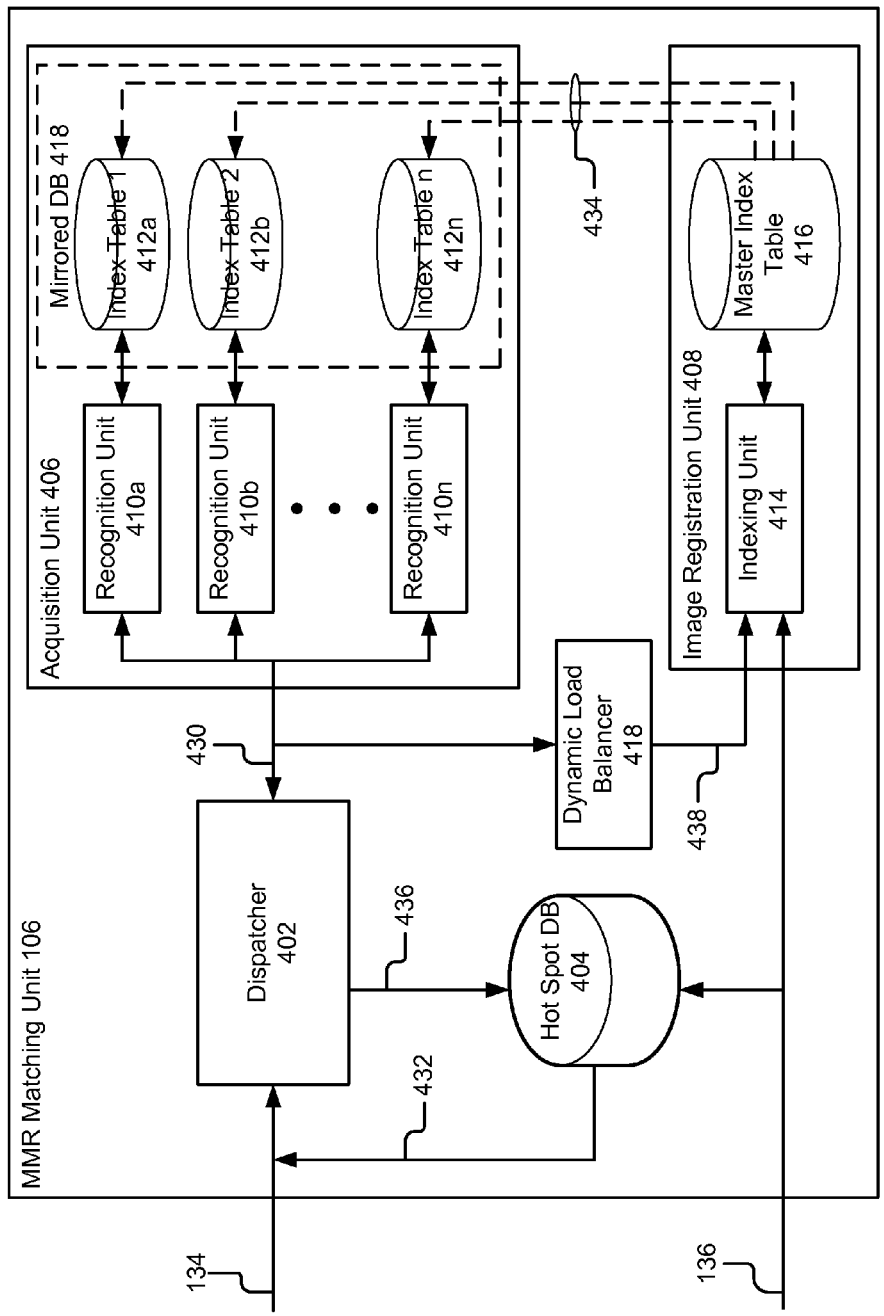
FIG. 4B is a block diagram of a second embodiment of the MMR matching unit in accordance with the present invention.
Figure 4C:
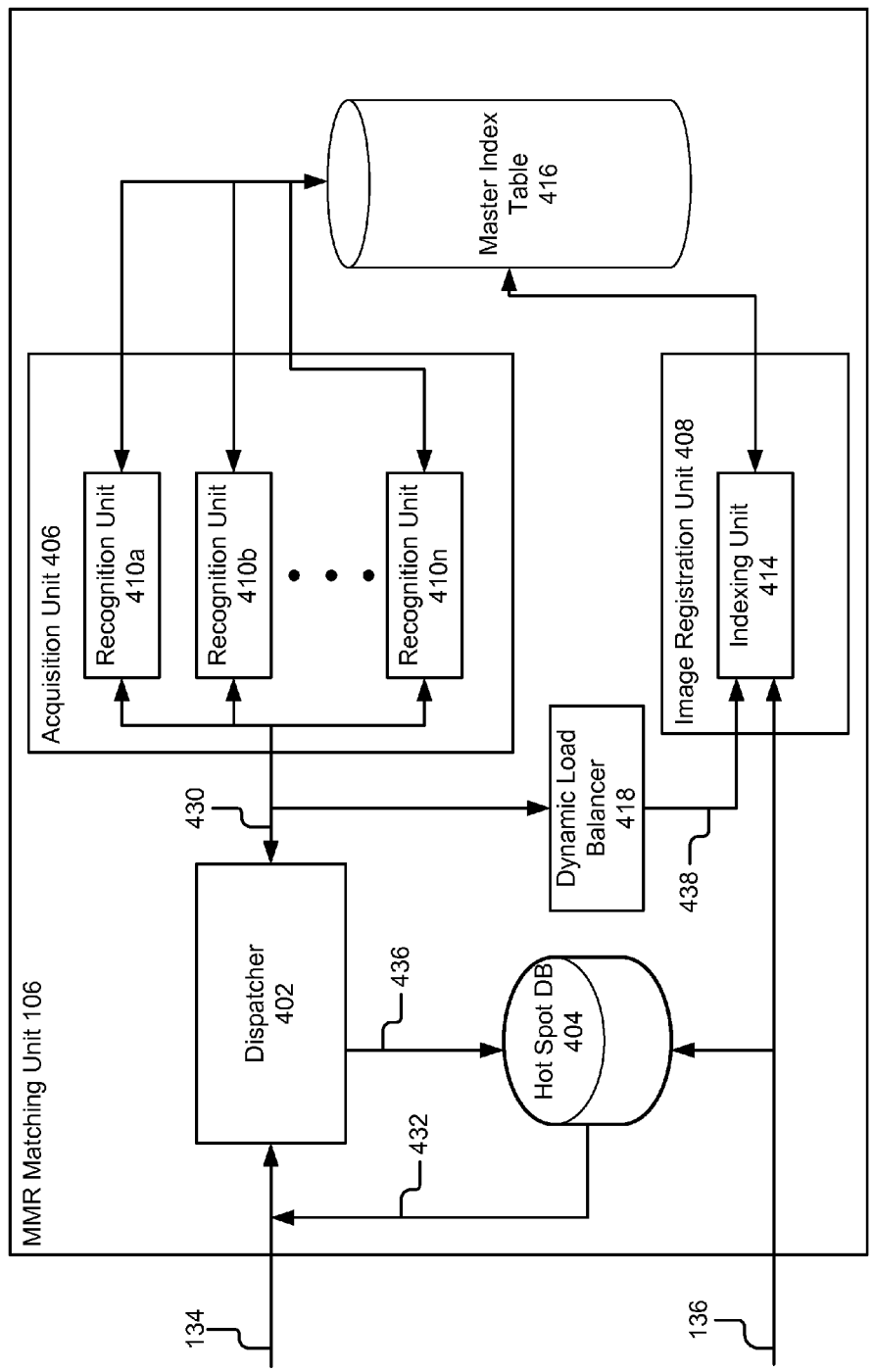
FIG. 4C is a block diagram of a third embodiment of the MMR matching unit in accordance with the present invention.

Referring now to FIGS. 4A-4C, three embodiments for the MMR matching unit 106 will be described. The basic function of the MMR matching unit 106 is to receive an image query, send the image query for recognition, perform recognition on the images in the image query, retrieve hotspot information, combine the recognition result with hotspot information, and send it back to the pre-processing server 103 or MMR gateway 104.

FIG. 4A illustrates a first embodiment of the MMR matching unit 106. The first embodiment of the MMR matching unit 106 comprises a dispatcher 402, a hotspot database 404, an acquisition unit 406, an image registration unit 408, and a dynamic load balancer 418. The acquisition unit 406 further comprises a plurality of the recognition units 410*a*-410*n* and a plurality of index tables 412*a*-412*n*. The image registration unit 408 further comprises an indexing unit 414 and a master index table 416.

The dispatcher 402 is coupled to signal line 134 for receiving an image query from and sending recognition results to the pre-processing server 103 or MMR gateway 104. The dispatcher 402 is responsible for assigning and sending an image query to respective recognition units 410*a*-410*n*. In one embodiment, the dispatcher 402 receives an image query, generates a recognition unit identification number and sends the recognition unit identification number and the image query to the acquisition unit 406 for further processing. The dispatcher 402 is coupled to signal line 430 to send the recognition unit identification number and the image query to the recognition units 410*a*-410*n*. The dispatcher 402 also receives the recognition results from the acquisition unit 406 via signal line 430. One embodiment for the dispatcher 402 will be described in more detail below with reference to FIG. 5.

An alternate embodiment for the hotspot database 404 has been described above with reference to FIGS. 3A-3B wherein the hotspot database is part of the pre-processing server 103 or MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information. Once an image query has been recognized and recognition results are produced, these recognition results are used as part of a query of the hotspot database 404 to retrieve hotspot information associated with the recognition results. The retrieved hotspot information is then output on signal line 134 to the pre-processing server 103 or MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the pre-processing server 103 or MMR gateway 104 for delivery of query results. The hotspot database 404 is also coupled to signal line 136 to receive new hotspot information for storage from the MMR publisher 108, according to one embodiment.

The acquisition unit 406 comprises the plurality of the recognition units 410a-410n and a plurality of index tables 412a-412n. Each of the recognition units 410a-410n has and is coupled to a corresponding index table 412a-412n. In one embodiment, each recognition unit 410/index table 412 pair is on the same server. The dispatcher 402 sends the image query to one or more recognition units 410a-410n. In one embodiment that includes redundancy, the image query is sent from the dispatcher 402 to a plurality of recognition units 410 for recognition and retrieval and the index tables 412a-n index the same data. In the serial embodiment, the image query is sent from the dispatcher 402 to a first recognition unit 410a. If recognition is not successful on the first recognition unit 410a, the image query is passed on to a second recognition unit 410b, and so on. In yet another embodiment, the dispatcher 402 performs some preliminary analysis of the image query and then selects a recognition unit 410a-410n best adapted and most likely to be successful at recognizing the image query. Those skilled in the art will understand that there are a variety of configurations for the plurality of recognition units 410a-410n and the plurality of index tables 412a-412n. Example embodiments for the acquisition unit 406 will be described in more detail below with reference to FIGS. 6A-6F. It should be understood that the index tables 412a-412n can be updated at various times as depicted by the dashed lines 434 from the master index table 416.

The image registration unit 408 comprises the indexing unit 414 and the master index table 416. The image registration unit 408 has an input coupled to signal on 136 to receive updated information from the MMR publisher 108, according to one embodiment, and an input coupled to signal line 438 to receive updated information from the dynamic load balancer 418. The image registration unit 408 is responsible for maintaining the master index table 416 and migrating all or portions of the master index table 416 to the index tables 412a-412n (slave tables) of the acquisition unit 406. In one embodiment, the indexing unit 414 receives images, unique page IDs, and other information; and converts it into index table information that is stored in the master index table 416. In one embodiment, the master index table 416 also stores the record of what is migrated to the index table 412. The indexing unit 414 also cooperates with the MMR publisher 108 according to one embodiment to maintain a unique page identification numbering system that is consistent across image pages generated by the MMR publisher 108, the image pages stored in the master index table 416, and the page numbers used in referencing data in the hotspot database 404.

One embodiment for the image registration unit 408 is shown and described in more detail below with reference to FIG. 7.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412a-412n of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412a-412n. For example, the dynamic load balancer 418 may measure the image queries for a day. Based on the measured usage for that day, the index tables may be modified and configured in the acquisition unit 406 to match the usage measured by the dynamic load balancer 418.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different than that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412a-n. Moreover, conventional functionality of SQL database replication is used to generate the mirror images of the master index table 416 stored in the index tables 412a-n for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology.

FIG. 4C illustrates a third embodiment of the MMR matching unit 106. In the third embodiment, many of the components of the MMR matching unit 106 have the same or a similar function to corresponding elements of the first and second embodiments. Thus, like reference numbers have been used to refer to like components with the same or similar functionality. The third embodiment of the MMR matching unit 106 includes the dispatcher 402, the hotspot database 404, and the dynamic load balancer 418 similar to the first and second embodiments of the MMR matching unit 106. However, the acquisition unit 406 and the image registration unit 408 are different than that described above with reference to FIGS. 4A and 4B. In particular, the acquisition unit 406 and the image registration unit 408 utilize a single shared SQL database (master index table 416). The image registration unit 408 is configured so that when new images are added to the master index table 416 they are immediately available to all the recognition units 410. The recognition units 410a-410n and the index unit 414 are communicatively coupled to the master index table 416. This embodiment is particularly advantageous because it uses a simplified version of the recognition servers, as each of them need not maintain a separate index table that needs updating. In addition, consistency among multiple databases is not a concern.

Dispatcher 402

Figure 5:
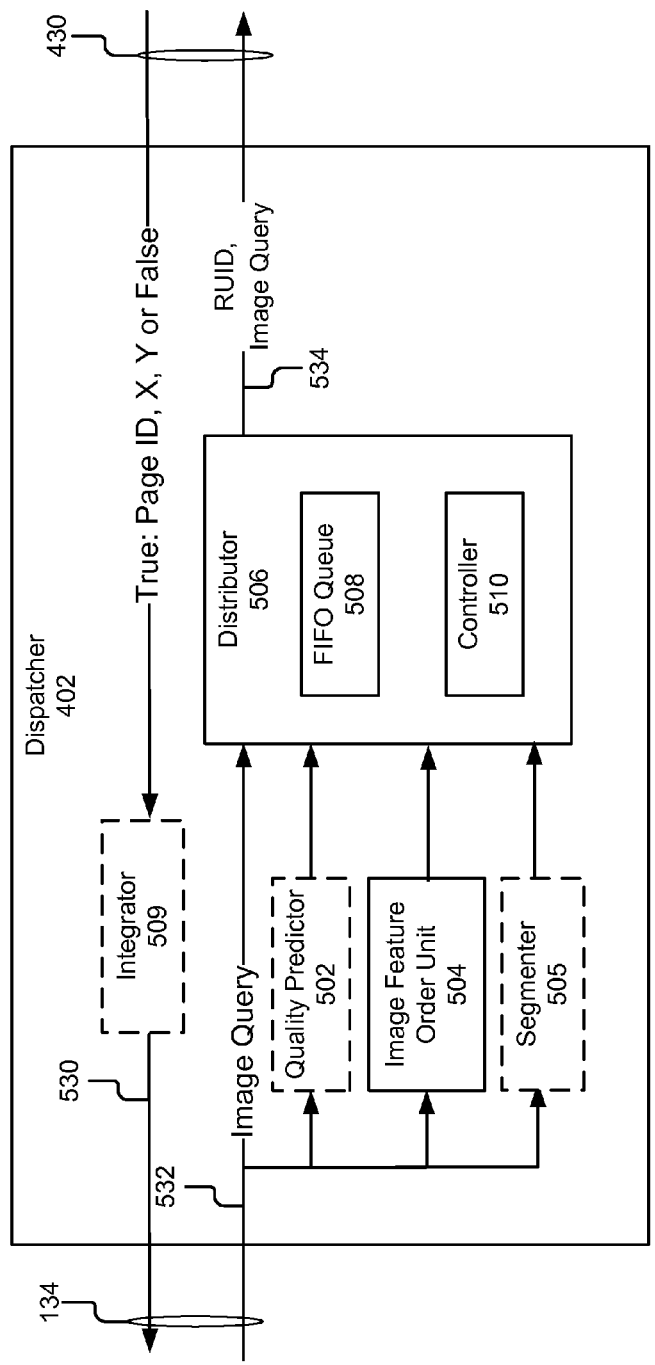
FIG. 5 is a block diagram of an embodiment of a dispatcher in accordance with the present invention.

Referring now to FIG. 5, an embodiment of the dispatcher 402 shown. The dispatcher 402 comprises a quality predictor 502, an image feature order unit 504, a distributor 506, a segmenter 505, and an integrator 509. The quality predictor 502, the image feature order unit 504, the segmenter 505, and the distributor 506 are coupled to signal line 532 to receive image queries from the pre-processing server 103 or MMR gateway 104. The distributor 506 is also coupled to receive the output of the quality predictor 502, image feature order unit 504, and segmenter 505. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. In some embodiments, the segmenter 505 determines image content type and segments the image query into content-type specific image queries. Using this information from the quality predictor 502, the image feature order unit 504, and the segmenter 505, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentivize users to carefully select the images they submit. Other queue management strategies are possible.

The dispatcher 402 also receives the recognition results from the recognition units 410 on signal line 530. The recognition results include a Boolean value (true/false) and if true, a page ID, and a location on the page. In one embodiment, the dispatcher 402 merely receives and retransmits the data to the pre-processing server 103 or MMR gateway 104. In another embodiment, the dispatcher 402 includes an integrator 509 for integrating the received recognition results into an integrated result, similar to the functionality described for result combiner 610, as discussed in conjunction with FIG. 6B.

The quality predictor 502 receives image queries and generates a recognizability score used by the dispatcher 402 to route the image query to one of the plurality of recognition units 410. In one embodiment, the quality predictor 502 also receives as inputs context information and device parameters. In one embodiment, the recognizability score includes information specifying the type of recognition algorithm most likely to produce a valid recognition result.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy, as further described in conjunction with FIG. 12. In the simplest of embodiments, simple images with few features are assigned to lightly loaded recognition units 410 so that they will be recognized quickly and the user will see the answer immediately. In one embodiment, the features used by the image order feature unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded. The operation of the image feature order unit 504 is described in more detail below and can be better understood with reference to FIG. 12.

Acquisition Unit 406

Referring now to FIGS. 6A-6F, embodiments of the acquisition unit 406 will be described.

Figure 6A:
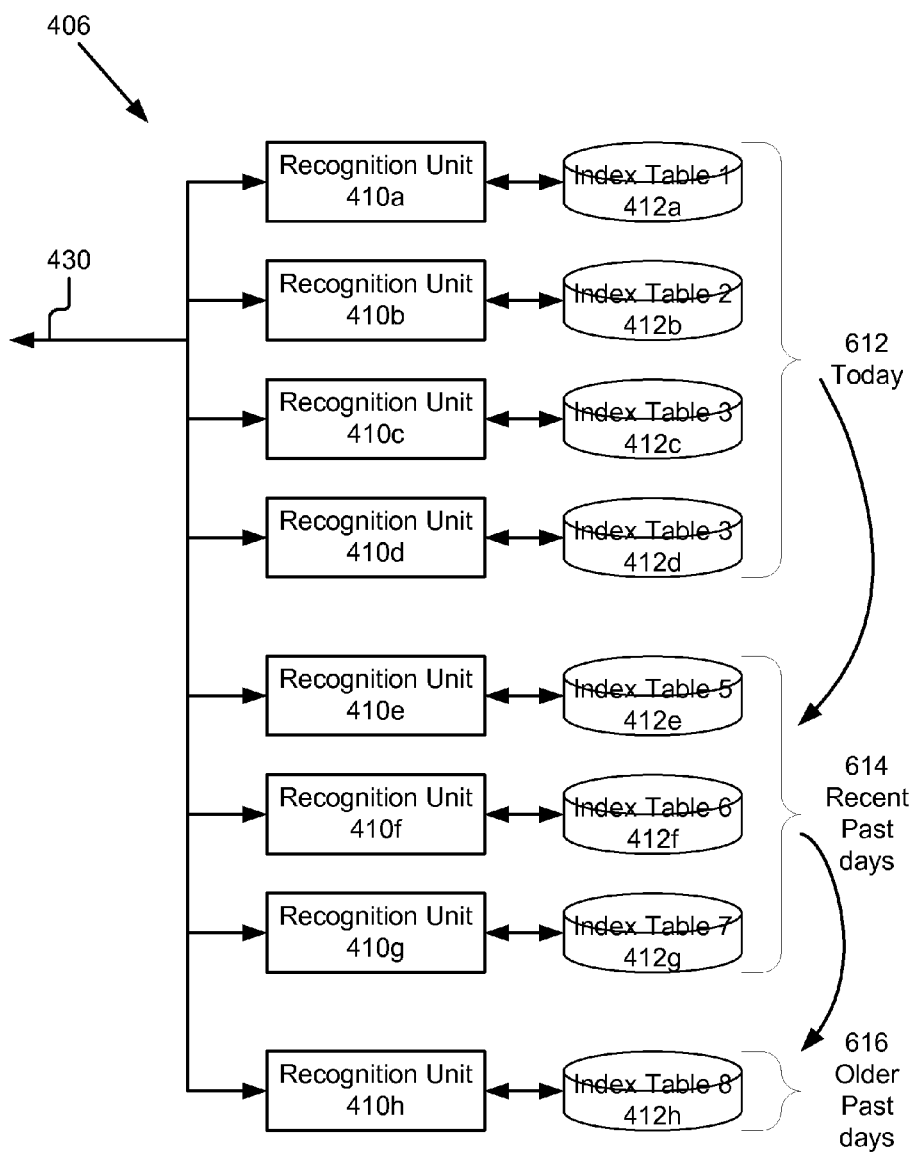
FIGS. 6A-6F are block diagrams showing several configurations of an image retrieval unit in accordance with various embodiment of the present invention.

FIG. 6A illustrates one embodiment for the acquisition unit 406 where the recognition unit 410 and index table 412 pairs are partitioned based on the content or images that they index. This configuration is particularly advantageous for mass media publishers that provide content on a periodic basis. The organization of the content in the index tables 412 can be partitioned such that the content most likely to be accessed will be available on the greatest number of recognition unit 410 and index table 412 pairs. Those skilled in the art will recognize that the partition described below is merely one example and that various other partitions based on actual usage statistics measured over time can be employed. As shown in FIG. 6A, the acquisition unit 406 comprises a plurality of recognition units 410a-h and a plurality of index tables 412a-h. The plurality of recognition units 410a-h is coupled to signal line 430 to receive image queries from the dispatcher 402. Each of the plurality of recognition units 410a-h is coupled to a corresponding index table 412a-h. The recognition units 410 extract features from the image query and compare those image features to the features stored in the index table to identify a matching page and location on that page. Example recognition and retrieval systems and methods are disclosed in U.S. patent application Ser. No. 11/461,017, titled "System And Methods For Creation And Use Of A Mixed Media Environment," filed Jul. 31, 2006, U.S. patent application Ser. No. 11/461,279, titled "Method And System For Image Matching In A Mixed Media Environment," filed Jul. 31, 2006, U.S. patent application Ser. No. 11/461,286, titled "Method And System For Document Fingerprinting Matching In A Mixed Media Environment," filed Jul. 31, 2006, U.S. patent application Ser. No. 11/461,294, titled "Method And System For Position-Based Image Matching In A Mixed Media Environment," filed Jul. 31, 2006, U.S. patent application Ser. No. 11/461,300, titled "Method And System For Multi-Tier Image Matching In A Mixed Media Environment," filed Jul. 31, 2006, U.S. patent application Ser. No. 11/461,147, titled "Data Organization and Access for Mixed Media Document System," filed Jul. 31, 2006, U.S. patent application Ser. No. 11/461,164, titled "Database for Mixed Media Document System," filed Jul. 31, 2006, U.S. patent application Ser. No. 11/461,109, titled "Searching Media Content For Objects Specified Using Identifiers," filed Jul. 31, 2006, U.S. patent application Ser. No. 12/059,583, titled "Invisible Junction Feature Recognition For Document Security Or Annotation," filed Mar. 31, 2008, U.S. patent application Ser. No. 12/121,275, titled "Web-Based Content Detection In Images, Extraction And Recognition," filed May 15, 2008, U.S. patent application Ser. No. 11/776,510, titled "Invisible Junction Features For Patch Recognition," filed Jul. 11, 2007, U.S. patent application Ser. No. 11/776,520, titled "Information Retrieval Using Invisible Junctions and Geometric Constraints," filed Jul. 11, 2007, U.S. patent application Ser. No. 11/776,530, titled "Recognition And Tracking Using Invisible Junctions," filed Jul. 11, 2007, and U.S. patent application Ser. No. 11/777,142, titled "Retrieving Documents By Converting Them to Synthetic Text," filed Jul. 12, 2007, and U.S. patent application Ser. No. 11/624,466, titled "Synthetic Image and Video Generation From Ground Truth Data," filed Jan. 18, 2007, which are incorporated by reference in their entirety.

As shown in FIG. 6A, the recognition unit 410/index table 412 pairs are grouped according to the content that in the index tables 412. In particular, the first group 612 of recognition units 410a-d and index tables 412a-d is used to index the pages of a publication such as a newspaper for a current day according to one embodiment. For example, four of the eight recognition units 410 are used to index content from the current day's newspaper because most of the retrieval requests are likely to be related to the newspaper that was published in the last 24 hours. A second group 614 of recognition units 410e-g and corresponding index tables 412e-g are used to store pages of the newspaper from recent past days, for example the past week. A third group 616 of recognition unit 410h and index table 412h is used to store pages of the newspaper from older past days, for example for the past year. This allows the organizational structure of the acquisition unit 406 to be optimized to match the profile of retrieval requests received. Moreover, the operation of the acquisition unit 406 can be modified such that a given image query is first sent to the first group 612 for recognition, and if the first group 612 is unable to recognize the image query, it is sent to the second group 614 for recognition and so on.

It should be noted that the use of four recognition units 410 and index tables 412 as the first group 612 is merely be by way example and used to demonstrate a relative proportion as compared with the number of recognition units 410 and index tables 412 in the second group 614 and the third group 616. The number of recognition units 410 and index tables 412 in any particular group 612, 614 and 616 may be modified based on the total number of recognition units 410 and index tables 412. Furthermore, the number of recognition units 410 and index tables 412 in any particular group 612, 614 and 616 may adapted so that it matches the profile of all users sending retrieval request to the acquisition unit 406 for a given publication.

Figure 14:
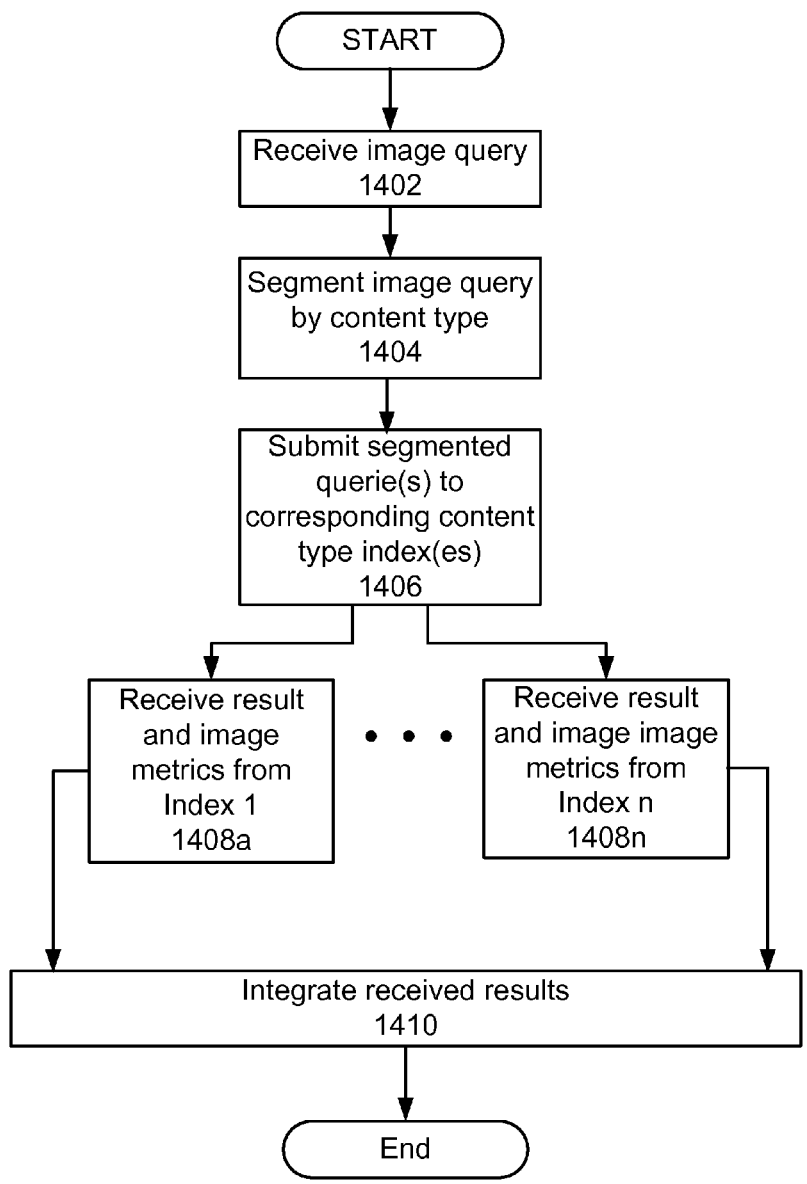
FIG. 14 is a flowchart of a method for segmenting and processing image queries in accordance with an embodiment of the present invention.

Alternatively, the recognition unit 410 and index tables 412 pairs may be partitioned such that there is overlap in the documents they index, e.g., such as segments of a single image according to content type, such as discussed in conjunction with FIG. 14. In this example, image queries are sent to index tables 412 in parallel rather than serially.

Figure 6B:
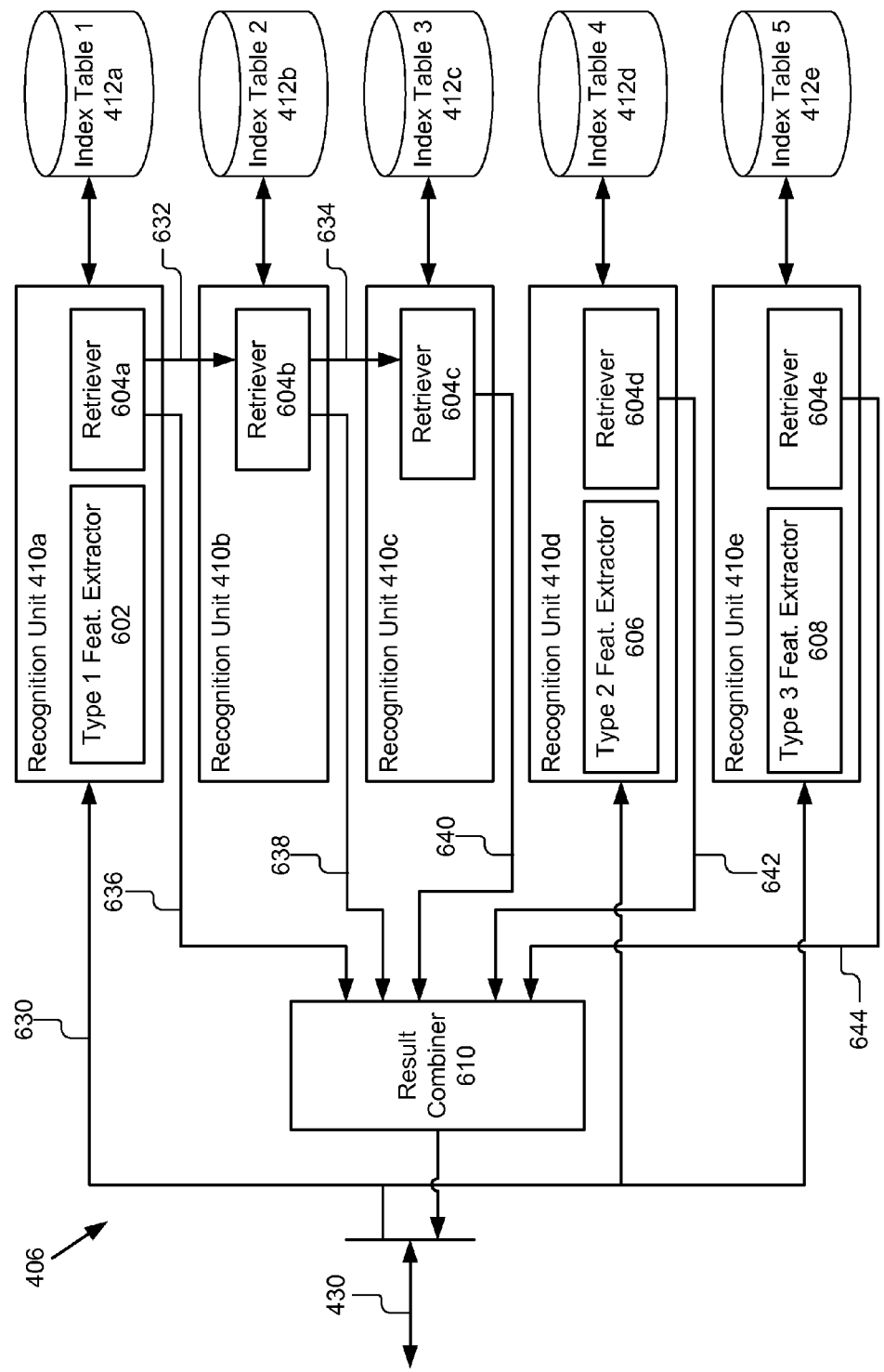

FIG. 6B illustrates a second embodiment for the acquisition unit 406 where the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur, etc.).

The second embodiment of the acquisition unit 406 includes a plurality of recognition units 410a-410e, a plurality of the index tables 412a-412e and a result combiner 610. In this embodiment, the recognition units 410a-410e each utilizes a different type of recognition algorithm. For example, recognition units 410a, 410b and 410c use a first recognition algorithm; recognition unit 410d uses a second recognition algorithm; and recognition unit 410e uses a third recognition algorithm for recognition and retrieval of page numbers and locations. Recognition units 410a, 410d, and 410e each have an input coupled signal line 430 by signal line 630 for receiving the image query. The recognition results from each of the plurality of recognition units 410a-410e are sent via signal lines 636, 638, 640, 642 and 644 to the result combiner 610. The output of the result combiner 610 is coupled to signal line 430.

In one embodiment, the recognition units 410a, 410b, and 410c cooperate together with index tables 1, 2, and 3 412a-412c each storing image features corresponding to the same pages but with various modifications, e.g., due to different device and environmental factors. For example, index table 1 412a may store images features for pristine images of pages such as from a PDF document, while index table 2 412b stores images of the same pages but with a first level of modification and index table 3 412c stores images of the same pages but with the second level of modification. In one embodiment, the index tables 1, 2, and 3 412a-412c are quantization trees. The first recognition unit 410a receives the image query via signal line 630. The first recognition unit 410a comprises a first type of feature extractor 602 and a retriever 604a. The first type of feature extractor 602 receives the image query, extracts the Type 1 features, and provides them to the retriever 604a. The retriever 604a uses the extracted Type 1 features and compares them to the index table 1 412a. If the retriever 604a identifies a match, the retriever 604a sends the recognition results via signal line 636 to the result combiner 610. If however, the retriever 604a was unable to identify a match or identifies a match with low confidence, the retriever 604a sends the extracted Type 1 features to the retriever 604b of the second recognition unit 410b via signal line 632. It should be noted that since the Type 1 features already have been extracted, the second recognition unit 410b does not require a feature extractor 602. The second recognition unit 410b performs retrieval functions similar to the first recognition unit 410a, but cooperates with index table 2 412b that has Type 1 features for modified images. If the retriever 604b identifies a match, the retriever 604b sends the recognition results via signal line 638 to the result combiner 610. If the retriever 604b of the second recognition unit 410b is unable to identify a match or identifies a match with low confidence, the retriever 604b sends the extracted features to the retriever 604c of the third recognition unit 410c via signal line 634. The retriever 604c then performs a similar retrieval function but on index table 3 412c. Those skilled in the art will understand that while one pristine set of images and two levels of modification are provided, this is only by way of example and that any number of additional levels of modification from 0 to n may be used.

The recognition units 410d and 410e operate in parallel with the other recognition units 410a-c. The fourth recognition unit 410d comprises a second type of feature extractor 606 and a retriever 604d. The Type 2 feature extractor 606 received the image query, possibly with other image information, parses the image, and generates Type 2 features. These Type 2 features are provided to the retriever 604d and the retriever 604d compares them to the features stored in index table 4 412d. In one embodiment, index table 4 412d is a hash table. The retriever 604d identifies any matching pages and returns the recognition results to the result combiner 610 via signal line 642. The fifth recognition unit 410e operates in a similar manner but for a third type of feature extraction. The fifth recognition unit 410e comprises a Type 3 feature extractor 608 and a retriever 604e. The Type 3 feature extractor 608 receives the image query, parses the image and generates Type 3 features and the features are provided to the retriever 604e and the retriever 604e compares them to features stored in the index table 5 412e. In one embodiment, the index table 5 412e is a SQL database of character strings. The retriever 604e identifies any matching strings and returns the recognition results to the result combiner 610 via signal line 644.

In one exemplary embodiment the three types of feature extraction include and invisible junction recognition algorithm, brick wall coding, and path coding.

The result combiner 610 receives recognition results from the plurality of recognition units 410a-e and produces one or a small list of matching results. In one embodiment, each of the recognition results includes an associated confidence factor. In another embodiment, context information such as date, time, location, personal profile, or retrieval history is provided to the result combiner 610. These confidence factors along with other information are used by the result combiner 610 to select the recognition results most likely to match the input image query.

FIGS. 6C-6F are block diagrams of additional embodiments including a high priority index 411 and one or more lower priority indexes (e.g., general index 413).

Figure 6C:
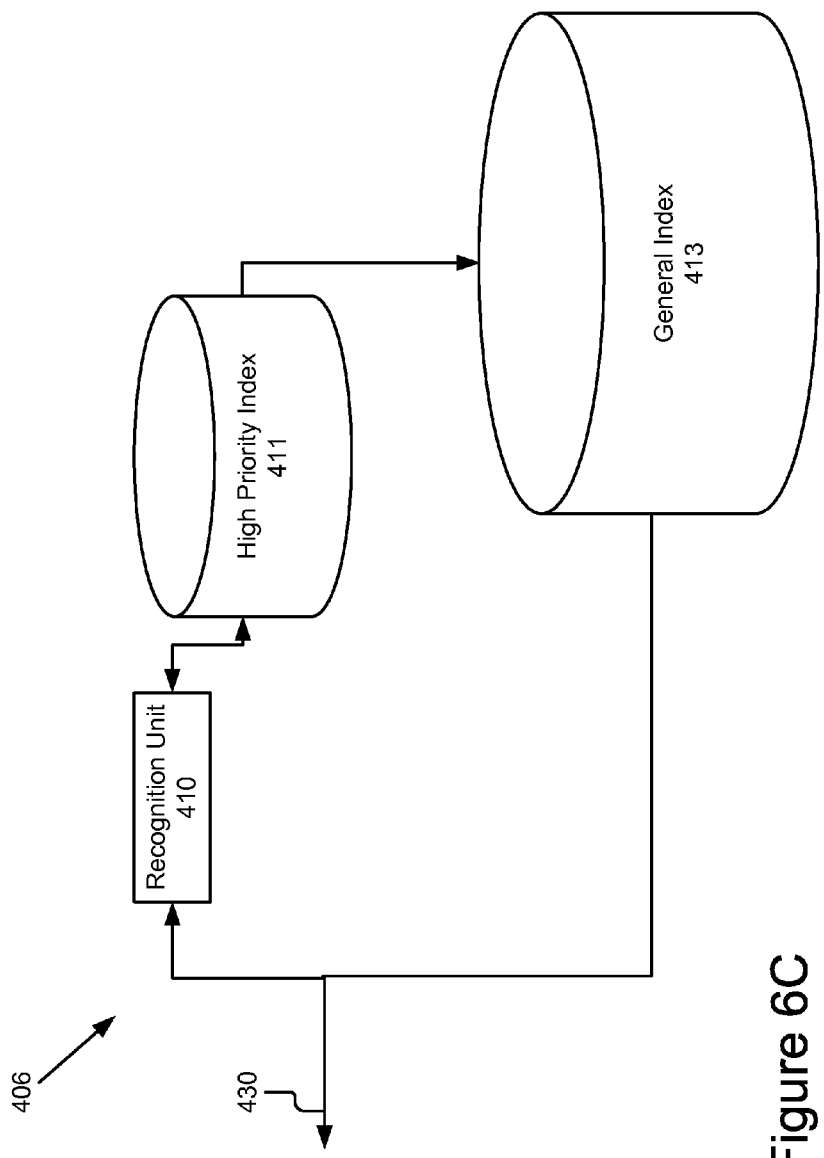

Referring now to FIG. 6C, another embodiment of the acquisition unit 406 is described. FIG. 6C illustrates one embodiment of the acquisition unit 406 where the recognition unit 410 and index table pairs are partitioned using a high priority index (HPI) 411 and a general index 413. The recognition unit 410 is as described above. Similar to index tables 412, the HPI 411 and general index 413 may be storage devices storing data and instructions, e.g., a hard disk drive, a floppy disk drive, a CD-ROM device, a DVD-ROM device, a DVD-RAM device, a DVD-RW device, a flash memory device, or some other mass storage device known in the art, or may be conventional-type databases that store indices, electronic documents, and other electronic content, feature descriptions, and other information used in the content type comparison and retrieval process.

The HPI 411 stores, in addition to document pages to be searched according to received image queries, for each image, a timestamp corresponding to the most recently received image query associated with that document page, a count of the total image queries matching that document page, and a weight corresponding to that document page, if any. Weights are used, e.g., as a means of maintaining an image in the HPI 411, even if it would be selected for removal based on its timestamp and count. Creation and updating of timestamp, counts, and weights, in conjunction with building of the HPI 411, are discussed in greater detail in conjunction with FIGS. 10A, 10B, and 11.

The general index 413 stores all document pages to be searched according to the received image queries, and may be a duplicate of the master index table 416, or any of index tables 412 according to various embodiments. Similar to the HPI 411, timestamps, counts, and weights are stored in the general index 413. The timestamps, counts, and weights in the general index 413 are counts of the document pages matching all image queries received, whereas the corresponding timestamps, counts, and weights in the HPI 411 correspond only to document pages stored by the HPI 411.

The partitioning of the recognition unit 410 and index table pairs using an HPI 411 provides faster and/or more accurate results for frequent and/or probable queries due to the relatively small size of the HPI 411. When new image queries arrive they are searched first against the HPI 411. The HPI 411 can be built according to various factors depending upon the search priority. For example, in one embodiment, the HPI 411 could be time-based, such as prioritizing a current time interval periodical, such as today's newspaper, by putting it in the HPI 411, while newspapers for past days are placed in the general index 413. In another embodiment, the HPI 411 is built based on the popularity of received image queries, either based on popularity of the image query by the individual user, across all users, or across some set (or subset) of users (e.g., users within a geographical area). In yet another embodiment, the HPI 411 is built based on self-reported user preferences, such as age, gender, magazine one subscribes to, and preference in music. Those skilled in the art will recognize that these partitioning options are merely examples and that various other partitions based on actual user statistics measured over time, or based on other factors, can be employed. The process used to build the HPI 411 is described in greater detail in conjunction with FIGS. 10A, 10B, and 11.

As shown in FIG. 6C, the acquisition unit 406 comprises recognition unit 410, HPI index 411, and general index 413. The recognition unit 410 is coupled to signal line 430 to receive image queries from the dispatcher 402. The recognition unit 410 is coupled to corresponding HPI 411, and via HPI 411 to general index 413. The example recognition and retrieval systems and methods referenced in conjunction with FIGS. 6A and 6B also apply to FIG. 6C.

As shown in FIG. 6C, the HPI 411 is smaller than the general index 413, and contains a subset of the data within general index 413. The operation of acquisition unit 406 shown in FIG. 6C is such that a given image query is first sent to the HPI 411 for recognition, and if the HPI 411 is unable to recognize the image query, it is sent to the general index 413 for recognition.

The general index 413 according to various embodiments may be a complete index, e.g., identical to master index table 416 as shown in FIG. 4A, or may include any subset of the data from master index table 416, as distinguished from the subset within the HPI 411.

It should be noted that the use of a single HPI 411 and a single general index 413 is merely by way of example and is used to demonstrate the priority of the HPI(s) 411 over the general index 413. The number of HPIs 411 and general indexes 413 in any particular configuration may vary. For example, in some embodiments multiple HPIs 411 may be used in sequence. In this example, each HPI 411 would provide a greater level of generalization over the previous HPI 411. For example, there could be an HPI 411 for the most common image queries of the last 24 hours that would be searched first, and if no match is found, a second HPI 411 of the most common image queries of all time that would be searched next, and if no match is found, then the general index 413 would be searched. This example advantageously allows for greater degrees of granularity between the HPIs 411.

Figure 6D:
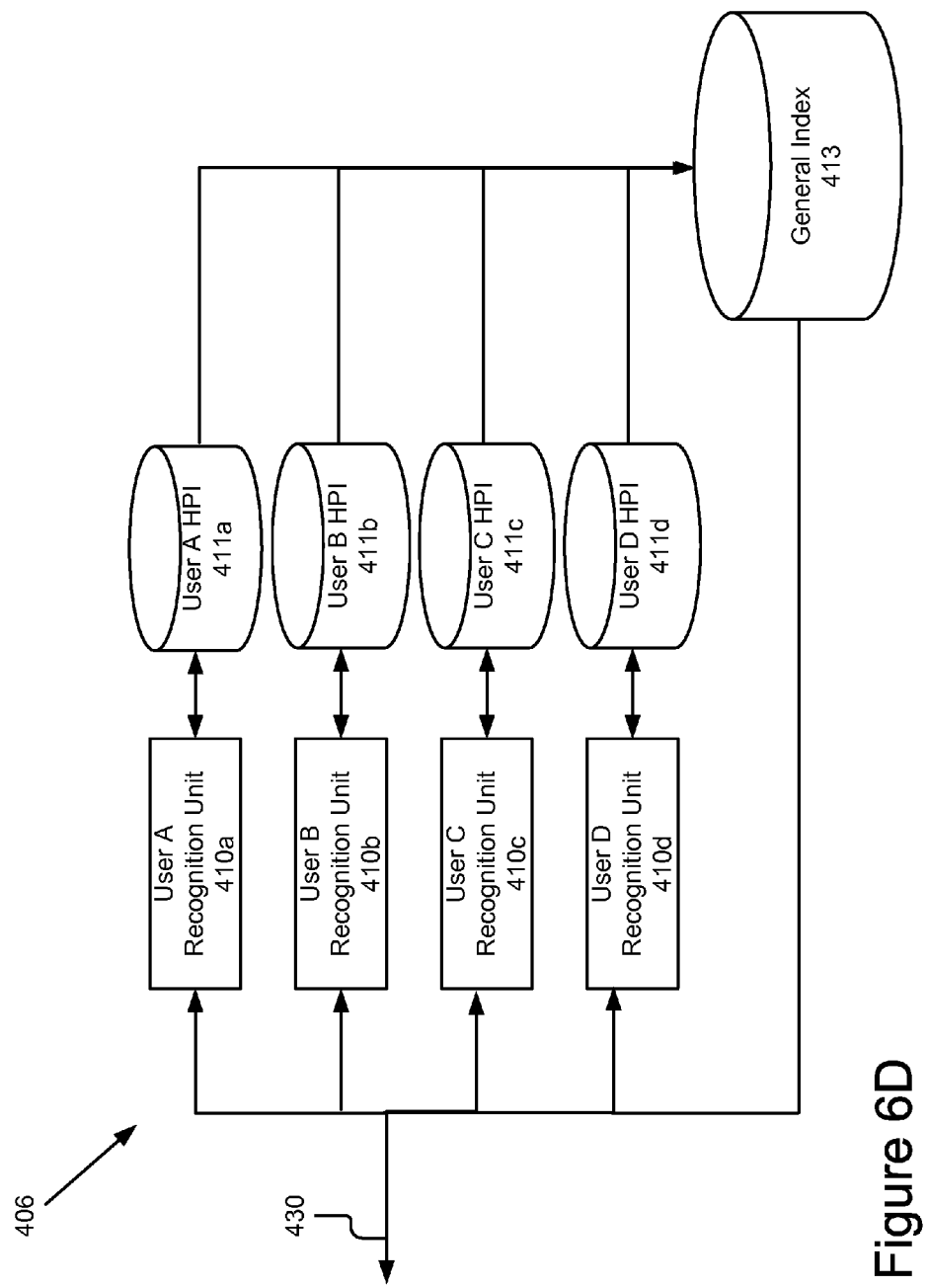

Referring now to FIG. 6D, another embodiment of the acquisition unit 406 is described. FIG. 6D illustrates one embodiment of the acquisition unit 406 in which the recognition unit 410 and index table pairs are partitioned into multiple HPIs 411 by mobile device 102 user. This configuration is particularly advantageous for personalizing each HPI 411 according to an individual user or user group. A user group may include users with shared preferences, with the same imaging device, with shared demographics, etc.

The organization of the contents in the user recognition units 410 and HPIs 411 can be partitioned such that the content most likely to be accessed by each user or user group will be available using a recognition unit 410 and an HPI 411 specific to the user or user group. Those skilled in the art will recognize that the partition described below is merely one example and that various other partition configurations may be employed.

As shown in FIG. 6D, the acquisition unit 406 comprises a plurality of recognition units 410a-d, a plurality of HPIs 411a-d, and a general index 413. As in the above described embodiments, the recognition units 410a-d are coupled to signal line 430 to received image queries from the dispatcher 402, are coupled to a corresponding HPI 411a-d, and function as described above. The operation of acquisition unit 406 is such that for a given User A, an image query first is sent to HPI 411a, and if no match is found, then is sent to general index 413. By establishing an HPI 411 on the individual level, a smaller index specific to the user or user group, and populated with data more likely to be contained in the image query from that user or user group, can be searched first, at savings of time and computation.

Figure 6E:
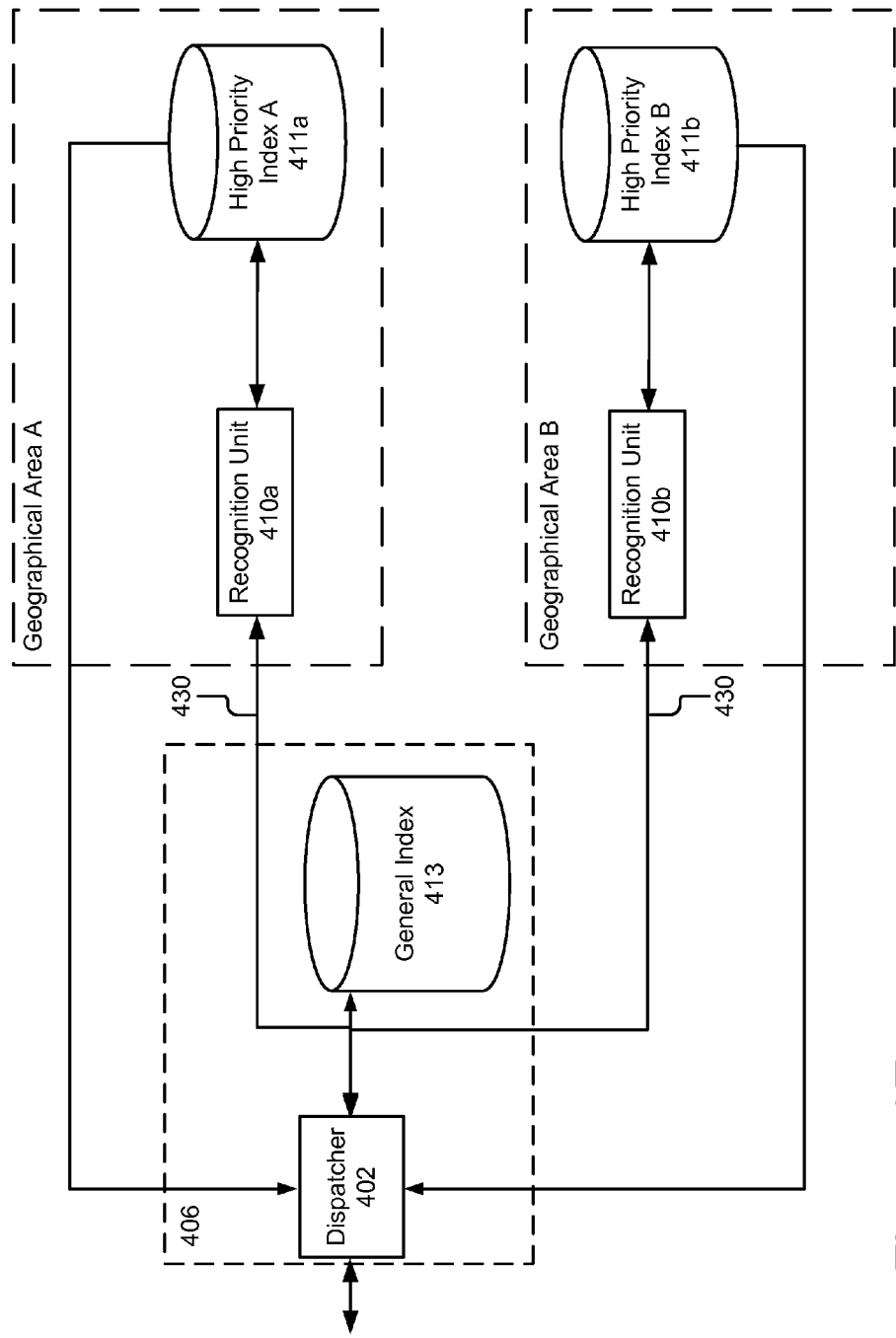

Referring now to FIG. 6E, another embodiment of the acquisition unit 406 is described. FIG. 6E illustrates one embodiment of the acquisition unit 406 in which the recognition unit 410 and index pairs are partitioned by geographical location. This configuration is particularly advantageous for image queries with a geographical aspect involved. For example, using information about the location of the user of the mobile device 102, e.g., received as part of the retrieval request using GPS, image queries received from that user can first be submitted to an HPI 411 specific to the location of the user at the time that the image query is received. The recognition unit 410 and HPI 411 may be physically located within the geographical location of the user according to embodiment. This is advantageous with respect to bandwidth and distance considerations when using mobile device communication. For example, a geographical area may be the campus of a university. In this example, the HPI 411 for that location may be located at the university, and may contain images most accessed by other users within the geographical area contained by the university.

The organization of the contents in the user recognition units 410 and HPIs 411 can be partitioned such that the content most likely to be accessed by a user according to his or her location is available using a recognition unit 410 and an HPI 411 pair specific to that location. Those skilled in the art will recognize that the partition described below is merely one example and that various other partition configurations may be employed.

As shown in FIG. 6E, the acquisition unit 406 comprises a plurality of recognition units 410a-b, a plurality of HPIs 411a-b, and a general index 413. As in the above described embodiments, the recognition units 410a-b are coupled to signal line 430 to receive image queries from the dispatcher 402, are coupled to a corresponding HPI 411a-b, and function as described above. For the embodiment shown in FIG. 6E, the location of the recognition unit 410 and HPI 411 may not be proximate to the primary acquisition unit 406 in this example, additional signal lines such as signal line 132 connecting mobile device 102 and pre-processing server 103/ MMR gateway 104, signal line 134 connecting pre-processing server 103/MMR gateway 104, and MMR matching unit 106, or other additional communication means between dispatcher 402 and recognition units 410, also may be used. The operation of acquisition unit 406 is modified such that an image query received from a user within Geographical Area A first is submitted to HPI A 411a, and if no match is found then is submitted to the general index 413.

Figure 6F:
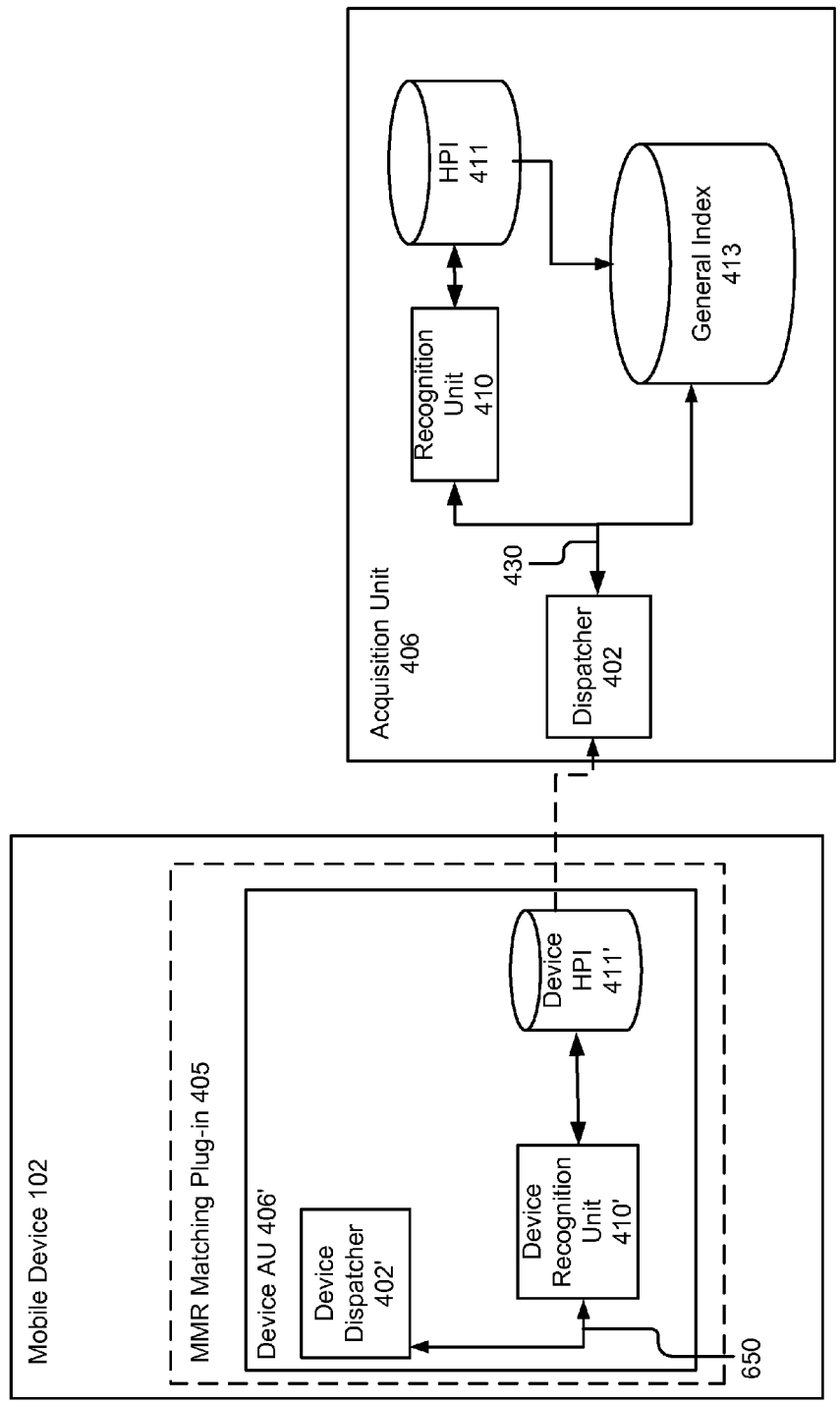

Referring now to FIG. 6F, and alternative embodiment of the acquisition unit 406 is described. FIG. 6F illustrates an embodiment for the acquisition unit 406 where the acquisition unit is split into two parts: the acquisition unit 406 within MMR matching unit 106 and a device acquisition unit 406' on mobile device 102, which is coupled via signal line 650 to device recognition unit for his 410' and device HPI 411'. In this example, device acquisition unit 406' may be integrated within MMR matching plug-in 405 as discussed in conjunction with FIG. 2B. This configuration is particularly advantageous because it provides a fast response for the user of mobile device 102, because no communication to the pre-processing server 103 or MMR gateway 104 is required if the match is found in device HPI 411'. The device HPI 411', and successive HPIs 411 and general indexes 413 may be adjusted in size to account for storage capacity and expected communication delay of mobile device 102. In addition, this embodiment allows for customization specific to the mobile device 102 characteristics, the location of the mobile device 102, and known imaging variations, e.g., blur, typical distance to paper, jitter, specific to the mobile device 102 or device user. In addition, advantages inherent in distributed computing also would be realized with this embodiment.

Acquisition unit 406 includes dispatcher 402 connected via signal line 430 to recognition unit 410, one or more HPIs 411, and one or more general indexes 413. Device acquisition unit 406' includes device dispatcher 402', device recognition unit 410', and device HPI 411'. In one embodiment, device acquisition unit 406' and its functionality correspond with MMR matching plug-in 205. Like numerals have been used for acquisition unit 406', dispatcher 402', recognition unit 410', and HPI 411' to denote like functionality. In this example, device dispatcher 402' is connected to device recognition unit 410' via signal line 650. Device HPI 411' may be connected to dispatcher 402 within acquisition unit 406 via the typical path between mobile device 102 and acquisition unit 406, i.e., signal lines 132, 134, and 430 (represented by a dashed line). Those skilled in the art will recognize that the partitioning described in this embodiment is merely one example and the various other partitioning schemes may be employed.

In operation, device acquisition unit 406' operates directly on images captured by mobile device 102. Similar to dispatcher 402, device dispatcher 402', operating in conjunction with other portions of MMR matching plug-in 205, sends image queries to device recognition unit 410'. Received image queries first are submit to device HPI 411', then to the indexes on acquisition unit 406, e.g., 411, 413. For example a received image query from device dispatcher 402', first would be submit to device HPI 411', then to HPI 411, then to general index 413.

The above described embodiments in FIG. 6A-6F are not meant to be exclusive or limiting, and may be combined according to other embodiments. For example, an HPI 411 may be based on multiple factors such as age and popularity, and as discussed above in conjunction with FIG. 6C, multiple HPIs 411 may be utilized within a single system 100. In addition, the HPI 411 may be combined with indexes segmented by other aspects such as quality (e.g., blur), content type, or other document imaging-based parameters, such as described in conjunction with FIG. 14.

Image Registration Unit 408

Figure 7:
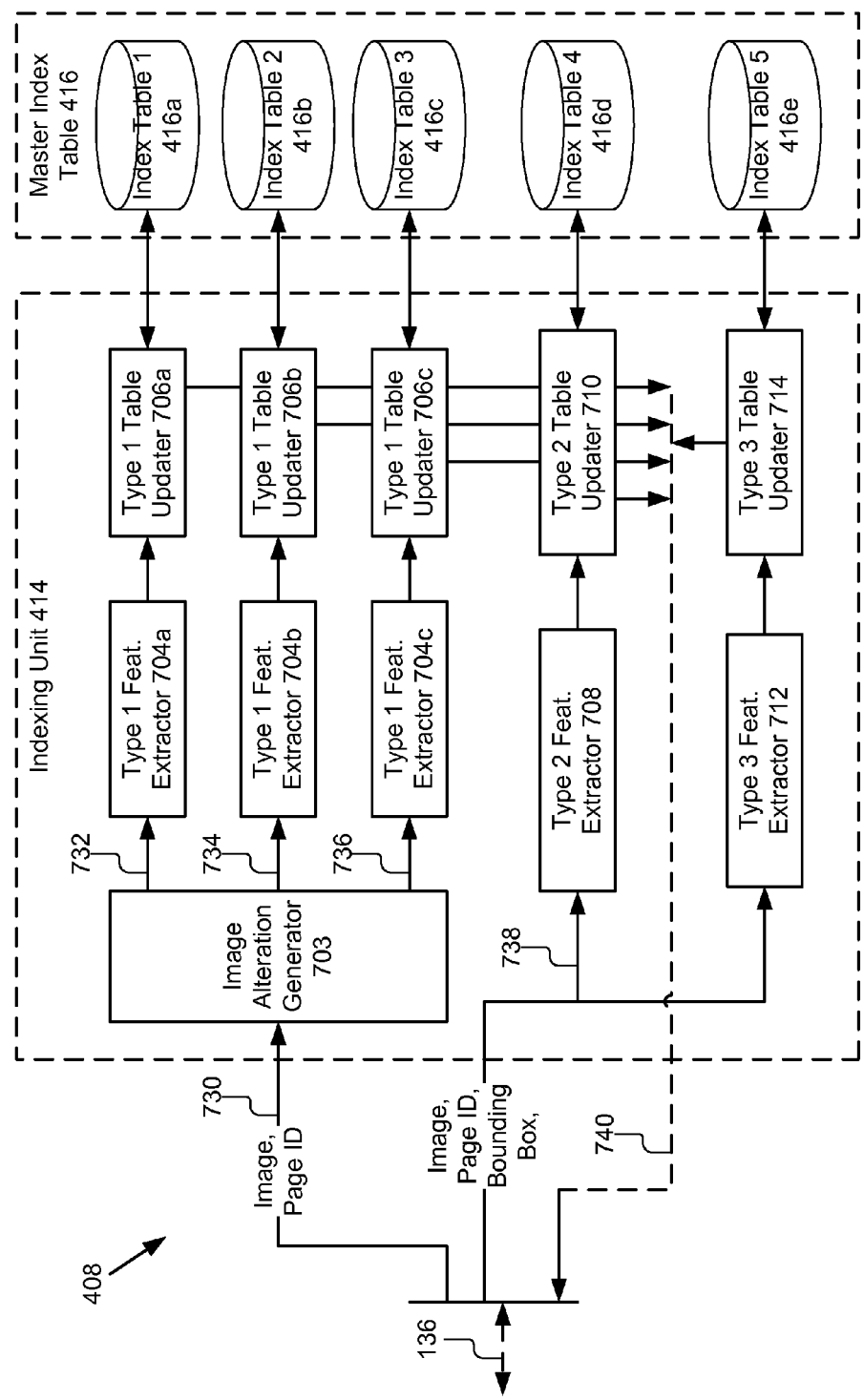
FIG. 7 is a block diagram of an embodiment of a registration unit in accordance with the present invention.

FIG. 7 shows an embodiment of the image registration unit 408. The image registration unit 408 comprises an image alteration generator 703, a plurality of Type 1 feature extractors 704a-c, a plurality of Type 1 index table updaters 706a-c, a Type 2 feature extractor 708, a Type 2 index table updater 710, a Type 3 feature extractor 712, a Type 3 index table updater 714 and a plurality of master index tables 416a-e. The image registration unit 408 also includes other control logic (not shown) that controls the updating of the working index tables 411-413 from the master index table 416. The image registration unit 408 can update the index tables 411-413 of the acquisition unit 406 in a variety of different ways based on various criteria such performing updates on a periodic basis, performing updates when new content is added, performing updates based on usage, performing updates for storage efficiency, etc.

The image alteration generator 703 has an input coupled in signal line 730 to receive an image and a page identification number. The image alteration generator 703 has a plurality of outputs and each output is coupled by signal lines 732, 734, and 736 to Type 1 extractors 704a-c, respectively. The image alteration generator 703 passes a pristine image and the page identification number to the output and signal line 732. The image alteration generator 703 then generates a first altered image and outputs it and the page identification number on signal line 734 to Type 1 feature extractor 704b, and a second altered image, alter differently than the first altered image, and outputs it and page identification number on signal line 736 to Type 1 feature extractor 704c.

The Type 1 feature extractors 704 receive the image and page ID, extract the Type 1 features from the image and send them along with the page ID to a respective Type 1 index table updater 706. The outputs of the plurality of Type 1 feature extractors 704a-c are coupled to input of the plurality of Type 1 index table updaters 706a-c. For example, the output of Type 1 feature extractor 704a is coupled to an input of Type 1 index table updater 706a. The remaining Type 1 feature extractors 704b-c similarly are coupled to respective Type 1 index table updaters 706b-c. The Type 1 index table updaters 706 are responsible for formatting the extracted features and storing them in a corresponding master index table 416. While the master index table 416 is shown as five separate master index tables 416a-e, those skilled in the art will recognize that all the master index tables could be combined into a single master index table or into a few master index tables. In the embodiment including the MMR publisher 108, once the Type 1 index table updaters 706 have stored the extracted features in the index table 416, they issue a confirmation signal that is sent via signal lines 740 and 136 back to the MMR publisher 108.

The Type 2 feature extractor 708 and the Type 3 feature extractor 712 operate in a similar fashion and are coupled to signal line 738 to receive the image, a page identification number, and possibly other image information. The Type 2 feature extractor 708 extracts information from the input needed to update its associated index table 416d. The Type 2 index table updater 710 receives the extracted information from the Type 2 feature extractor 708 and stores it in the index table 416d. The Type 3 feature extractor 712 and the Type 3 index table updater 714 operate in a like manner but for Type 3's feature extraction algorithm. The Type 3 feature extractor 712 also receives the image, a page number, and possibly other image information via signal line 738. The Type 3 feature extractor 712 extracts Type 3 information and passes it to the Type 3 index table updater 714. The Type 3 index table updater 714 stores the information in index table 5 416e. The architecture of the registration unit 408 is particularly advantageous because it provides an environment in which the index tables can be automatically updated, simply by providing images and page numbers to the image registration unit 408. According to one embodiment, Type 1 feature extraction is invisible junction recognition, Type 2 feature extraction is brick wall coding, and Type 3 feature extraction is path coding.

Quality Predictor 502

Figure 8:
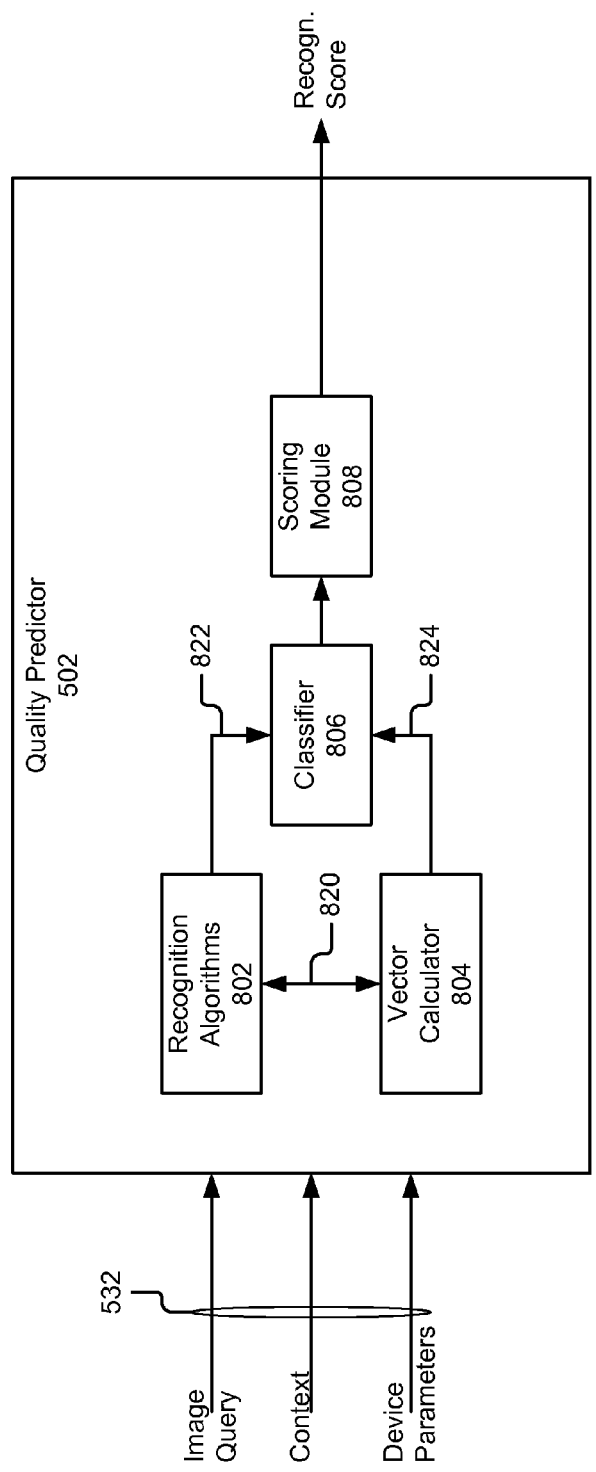
FIG. 8 is a block diagram of an embodiment of a quality predictor in accordance with the present invention.

Referring now to FIG. 8, an embodiment of the quality predictor 502 and its operation will be described in more detail. The quality predictor 502 produces a recognizability score (aka Quality Predictor) that can be used for predicting whether or not an image is a good candidate for a particular available image recognition algorithm. An image may not be recognizable based on many reasons, such as motion blur, focus blur, poor lighting, and/or lack of sufficient content. The goal of computing a recognizability score is to be able to label the non-recognizable images as "poor quality," and label the recognizable images as "good quality." Besides this binary classification, the present invention also outputs a "recognizability score," in which images are assigned a score based on the probability of their recognition.

The quality predictor 502 will now be described with reference to an embodiment in which the quality predictor 502 is part of the dispatcher 402 as has been described above and as depicted in FIG. 5. In this embodiment, the quality predictor 502 provides a recognizability score as input to the distributor 506 that decides which recognition unit 410 (and thus which recognition algorithm) to run. However, those skilled in the art will realize that there are numerous system configurations in which the quality predictor 502 and the recognizability score are useful and advantageous. In a second embodiment, the quality predictor 502 is run on a capture device (mobile device 102 phone, digital camera, computer 110) to determine if the quality of the captured image is sufficient to be recognized by one of the recognition units 410 of the MMR matching unit 106, or device recognition unit 410' on the mobile device, e.g., as part of the functionality of device acquisition unit 406'. If the quality of the captured image is sufficient, it is sent to the MMR matching unit 106, or processed within device acquisition unit 406', if not, the user is simply asked to capture another image. Alternatively, the captured image and the quality predictor score are shown to the user and he/she decides whether it should be submitted to the MMR matching unit 106. In a third embodiment, the quality predictor 502 is part of the result combiner 610, in which there are multiple recognition units 410 and the recognizability score determines how the recognition results are evaluated. In a fourth embodiment, the quality predictor 502 is part of the indexing unit 414 and computation of a recognizability score precedes the indexing process, and the score is used in deciding which indexer/indexers need to be used for indexing the input document page. For example, if the recognizability score is low for the image to be indexed using the brick wall coding (BWC) algorithm, then the image may be indexed using only the invisible junction (IJ) algorithm. Further, the same quality predictor can be used for both indexing and recognition. In a fifth embodiment, the quality predictor 502 is used before the "image capture" process on a mobile device 102. The recognizability score is computed prior to capturing the image, and the mobile device 102 captures an image only if the recognizability score is higher than a threshold. The quality predictor 502 can be embedded in a camera chip according to one embodiment, and can be used to control the mobile device 102 camera's hardware or software. For example, camera aperture, exposure time, flash, macro mode, stabilization, etc. can be turned on based on the requirements of recognition unit 410 and based on the captured image. For example, BWC can recognize blurry text images and capturing blurry images can be achieved by vibrating the mobile device 102.

As shown in FIG. 8, one embodiment of the quality predictor 502 comprises recognition algorithm parameters 802, a vector calculator 804, a score generator 806, and a scoring module 808. The quality predictor 502 has as inputs coupled to signal line 532 to receive an image query, context and metadata, and device parameters. The image query may be video frames, a single frame, or image features. The context and metadata includes time, date, location, environmental conditions, etc. The device parameters include brand, type, macro block on/off, gyro or accelerometer reading, aperture, time, exposure, flash, etc. Additionally, the quality predictor 502 uses certain recognition algorithm parameters 802. These recognition algorithm parameters 802 can be provided to the quality predictor 502 from the acquisition unit 406 or the image registration unit 408. For example, the recognition algorithms 802 may recognize different content types associated with the received image query. The vector calculator 804 computes quality feature vectors from the image to measure its content and distortion, such as its blurriness, existence and amount of recognizable features, luminosity etc. The vector calculator 804 computes any number of quality feature vectors from one to n. In some cases, the vector calculator 804 requires knowledge of the recognition algorithm(s) to be used, and the vector calculator 804 is coupled by signal line 820 the recognition algorithm parameters 802. For example, if an Invisible Junctions algorithm is employed, the vector calculator 804 computes how many junction points are present in the image as a measure of its recognizability. Continuing the above example of recognition of content types within the received image query, in addition the vector calculator 804 may perform a segmenting function on the image query, segmenting it by content type. All or some of these computed features are then input to score generator 806 via signal line 824. The score generator 806 is also coupled by signal line 822 to receive recognition parameters for the recognition algorithm parameters 802. The output of the score generator 806 is provided to the scoring module 808. The scoring module 808 generates a score using the recognition scores provided by the score generator 806 and by applies weights to those scores. In one embodiment, the result is a single recognizability score. In another embodiment, the result is a plurality of recognizability scores ranked from highest to lowest. In some embodiments, the recognizability scores are associated with particular index tables 412.

Methods

Figure 9:
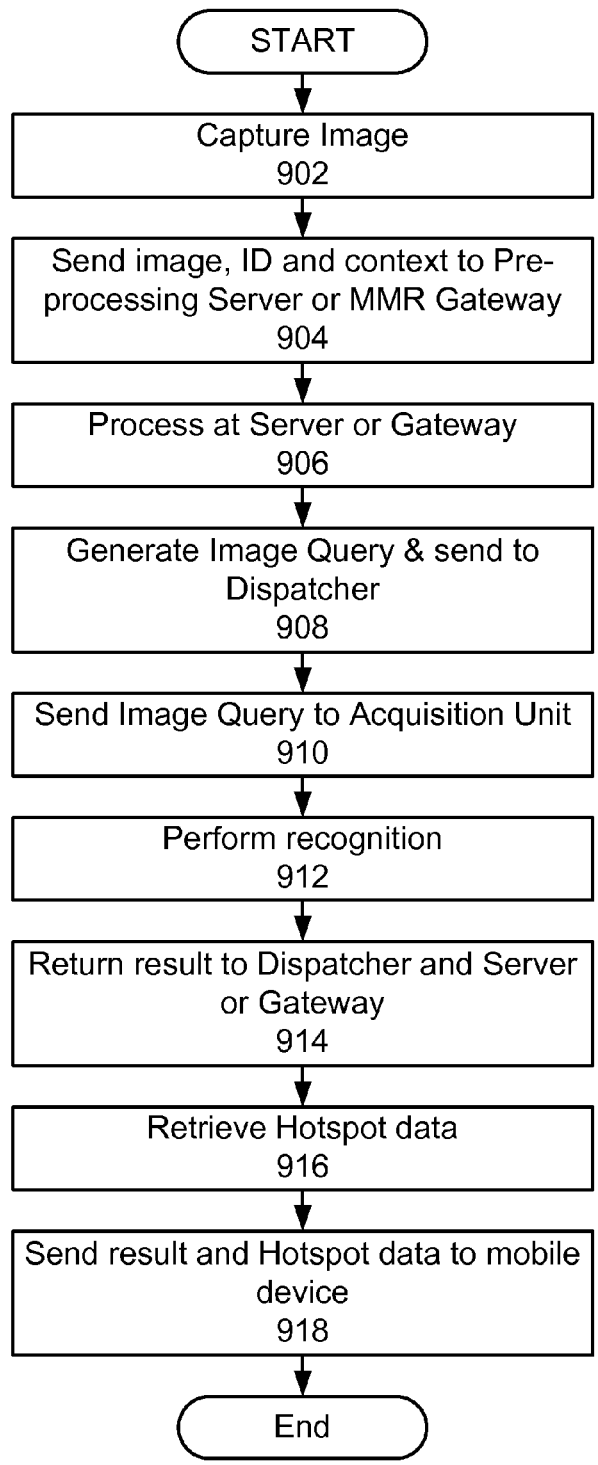
FIG. 9 is a flowchart of an embodiment of a method for retrieving a document and location from an input image in accordance with the present invention.

FIG. 9 is a flowchart of a general method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the pre-processing server 103 or MMR gateway 104. The pre-processing server 103 or MMR gateway 104 processes 906 the retrieval request by extracting the user identifier from the retrieval request and verifying that it is associated with a valid user. The MMR gateway 104 also performs other processing such as recording the retrieval request in the log 310, performing any necessary accounting associated with the retrieval request and analyzing any MMR analytics metrics. Next, the pre-processing server 103 or MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the pre-processing server 103 or MMR gateway 104. The recognition results are also used to retrieve 916 hotspot data corresponding to the page and location identified in the recognition results. Finally, the hotspot data and the recognition results are sent 918 from the pre-processing server 103 or MMR gateway 104 to the mobile device 102.

Figure 10A:
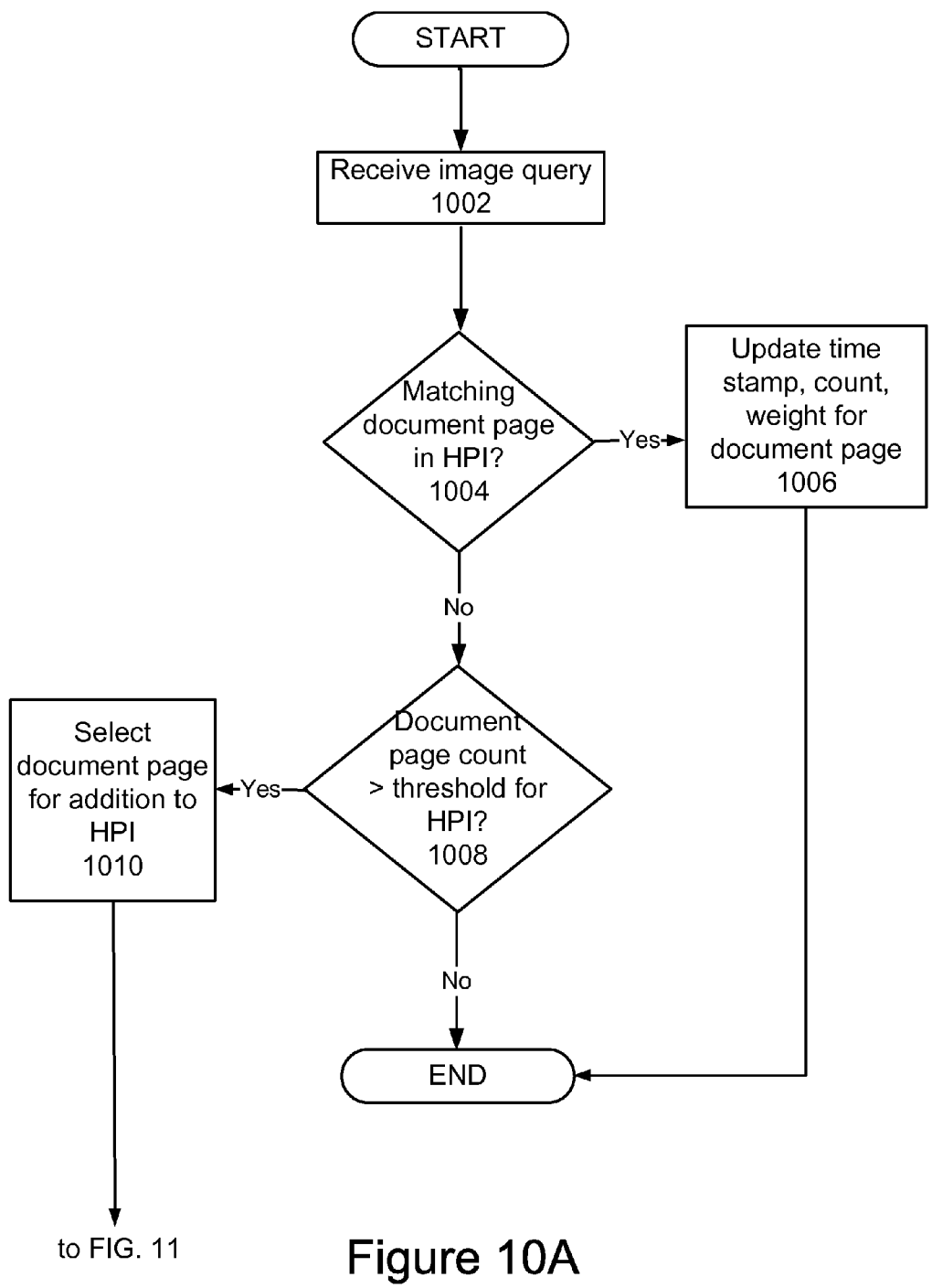
FIG. 10A is a flowchart of a method of updating a high priority index using actual image queries received in accordance with one embodiment of the present invention.

FIG. 10A is a flowchart showing a method of updating an HPI 411 using the actual image queries received by an MMR matching unit 106 according to one embodiment of the present invention. The method begins with the MMR matching unit 106 receiving 1002 an image query. In addition to the responsive retrieval process described herein, the image registration unit 408 queries 1004 whether the received image matches a document page in the current HPI 411. For purposes of this method the HPI 411 can be any of the HPIs 411 described herein, individually or in combination. The method may update one HPI 411 at a time or several serially or in unison. If the image matches a document page in the current HPI 411, the image registration unit 408 updates 1006 the timestamp, count, and weight associated with the matching document page. The process then ends for the yes branch. If the matching document page does not exist in the current HPI 411, the image registration unit 408 queries 1008 whether the document page count for the received image exceeds a threshold for addition to the HPI 411. The threshold for inclusion in the HPI 411 varies according to different embodiments. According to some embodiments, the threshold may be as low receiving two image queries that match the same document page. For the initial build of the HPI 411, e.g., every document page receiving at least one query image may be added to the HPI 411, and a higher threshold may apply after the HPI 411 has been established for a longer period of time. If the count does not exceed the threshold the process ends. If the count does exceed the threshold, the image registration unit 408 selects 1010 the image for addition to the HPI 411. The remainder of the method proceeds according to FIG. 11.

The method of FIG. 10A thus is based on actual image queries received. Building the HPI 411 according to the method of FIG. 10A may be done on an individual user basis, or may be based on the overall "popularity" of image queries received to be updated to a popularity-based HPI 411. In addition, the process of FIG. 10A may proceed on a real-time or batch update basis. For example, the steps of the method may occur as each image query is received, such that the HPI 411 is updated on a rolling, real-time basis. Alternatively, the steps of the method may occur at the end of the time interval according to all image queries received during that time, such that the HPI 411 is updated on a batch basis, e.g., once a day. While real-time updates will provide the most accurate HPI 411, continuously updating the HPI is computation intensive. Batch updates are less computationally intensive, but are delayed according to the selected time interval for the updates. In some embodiments, a combination of real-time and batch updates may be used. For example, real-time updates may be used for individual HPIs 411, while batch updates may be used for popularity-based HPIs 411.

Figure 10B:
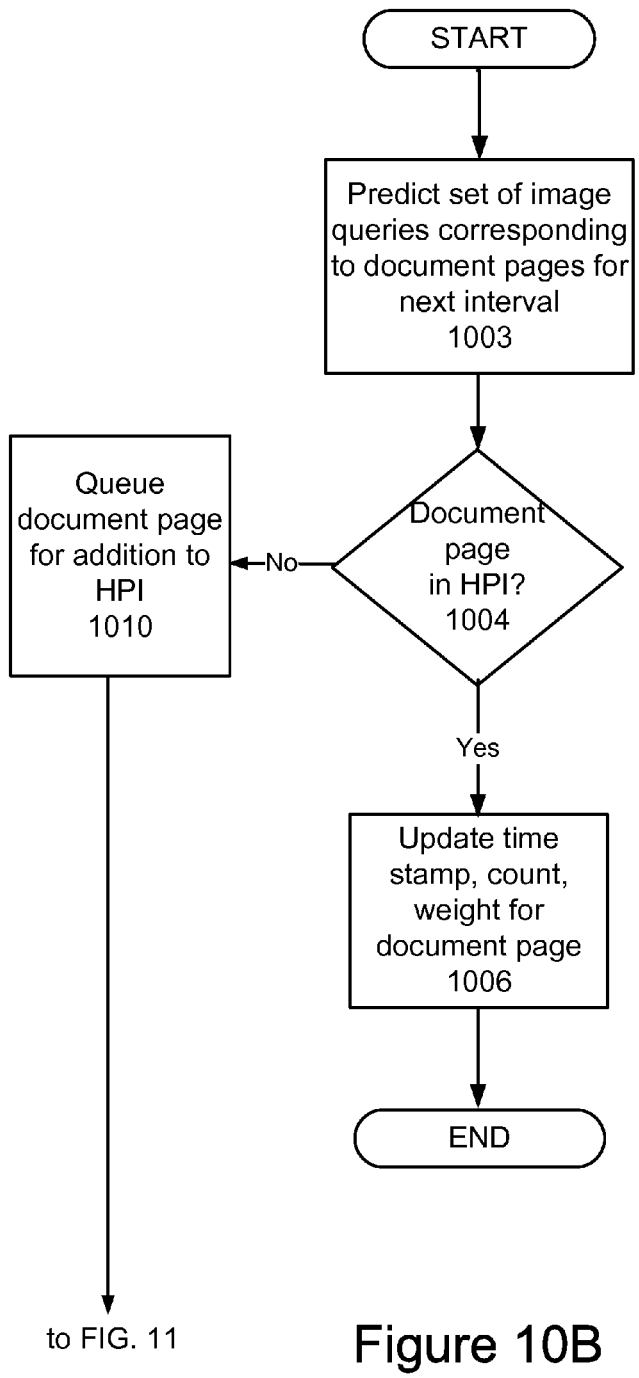
FIG. 10B is a flowchart of a method of updating a high priority index using image query projections in accordance with one embodiment of the present invention.

FIG. 10B is a flowchart showing a method of updating an HPI 411 using image query projections according to one embodiment of the present invention. The method begins with receiving 1003 a set of document pages for which image queries are projected to be received during a selected next interval. The time interval varies according to different documents, but may be selected according to time to update the HPI 411, in conjunction accuracy of searching and number of updates required.

The data for the image query projections may be determined by the image registration unit 408 and/or may be based on data received from third-party content providers, e.g. publisher 108 according to the embodiment shown in FIG. 1B. For example, tomorrow's newspaper may be projected to be a likely subject of image queries for the interval tomorrow. The image query projections may be based and other data is well, e.g., document pages belonging to the same document as document pages matching received image queries, similarity to recently matched document pages, specificity of a document page to a selected future time interval. For example, assuming a real-time update of the HPI 411, an image query recently received may be more likely to be received again in the near future, and thus in one embodiment real-time updates to the HPI 411 consistently cycle through image queries recently received. In addition, additional data received from the dynamic load balancer 418 may be used to establish the image group rejections.

Once the projected document pages are received, i the image registration unit 408 queries 1004 whether the received document page exists in the current HPI 411. If the image exists in the current HPI 411, the image registration unit 408 updates 1006 the timestamp, count, and weight associated with the predicted image query. The process then ends for the yes branch. If the image does not exist in the current HPI 411, the image registration unit 408 queues 1010 the image for addition to the HPI 411. The remainder of the method proceeds according to FIG. 11.

The method of FIG. 10B thus is based on projected document pages for which matching image queries are expected to be received during an upcoming time interval. Building the HPI 411 according to the method of FIG. 10B may be based on individual user image query projections, or image query projections for a larger population. Typically, the process of FIG. 10B occurs on a batch update basis, e.g., once a day.

Figure 11:
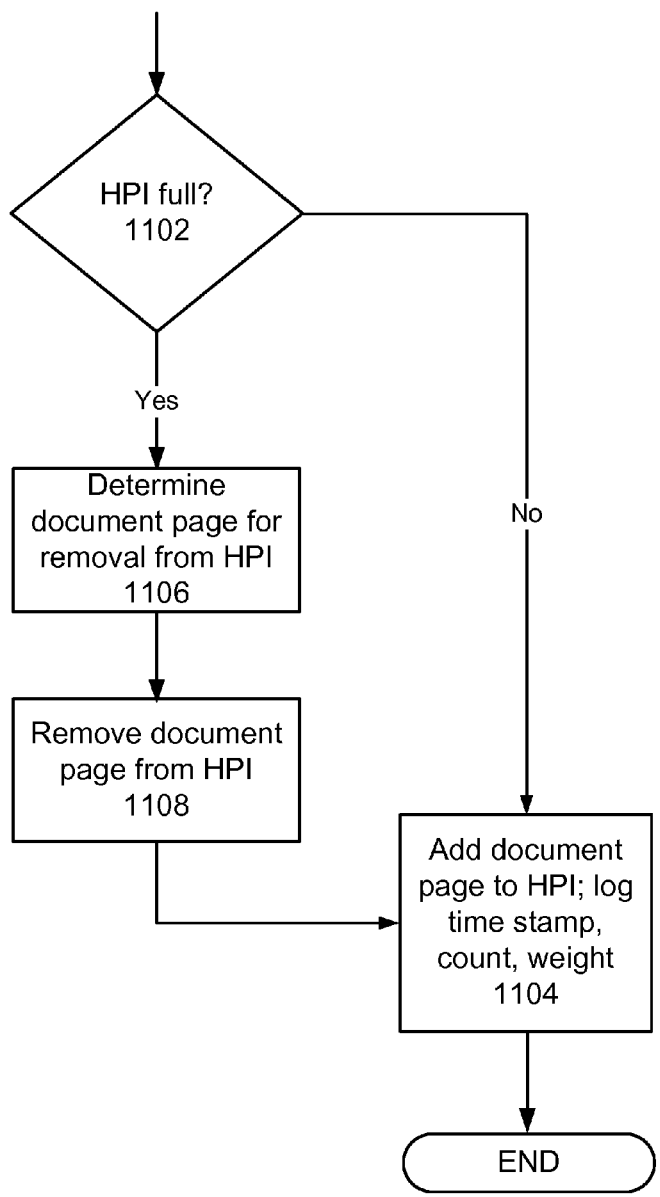
FIG. 11 is a flowchart of a method for updating a high priority index in accordance with an embodiment of the present invention.

FIG. 11 is a flowchart depicting a method for updating a HPI 411, using received or projected document pages, according to one embodiment of the present invention. The method considers image queries corresponding to document pages selected for inclusion in the HPI 411, and implements a removal policy for document pages in the HPI, e.g., when the HPI 411 is too full to receive the image queries selected for inclusion. The method begins by receiving a document page selected for inclusion in step 1010 of FIG. 10A or 10B. The image registration unit 408 determines 1102 whether the HPI 411 is full. This step is similar to the process described in conjunction with the description of indexing unit 414 and master index table 416 in conjunction with FIG. 4A. As discussed in conjunction with FIG. 10A, the method may be implemented using various HPIs 411. If the HPI 411 is not full, the document page is added 1104 to the HPI 411, and a timestamp, count, and weight is logged. According to one embodiment, features extracted from the image associated with the image query received are added to the HPI 411. In other embodiments, features extracted from the entire document page that matched the received image query are stored, or features extracted from all the pages belonging to the same document that matched the image query are stored in the HPI 411. Storing data in addition to the specific image queried can be advantageous in the context of a popularity based HPI 411, e.g., because if one portion of a document is popular, other parts of the document may be popular as well. In addition, adding 1104 the document page to the HPI 411 may include sending the document page to an HPI 411 remote from the image registration unit 408, e.g., a device HPI 411', as described in conjunction with FIG. 6F. This ends the process for the no branch.

If the HPI 411 is full, the image registration unit 408 determines 1106 a document page for removal from the HPI 411. Document pages may be selected for removal according to various methods, e.g., using the oldest timestamp, lowest count, lowest weight, and/or some combination thereof. In one embodiment, the number of document pages selected for removal from the HPI 411 is equal to the number selected/queued 1010 to be added to the HPI 411. Once selected, the document page(s) is removed 1108 from the HPI. The process then can proceed to step 1104, as described above, to allow the document page to be added to the HPI 411, now that the HPI 411 has space available. As discussed above for FIGS. 10A and 10B, adding document pages to the HPI 411 may occur on a real-time or batch update basis. For example, if the updates occur a real-time, document pages may be selected for addition, and document pages selected for removal, from the HPI 411 as each image query is received. Alternatively, document pages may be removed, and added, to the HPI 411 as a group at the end of the time interval, e.g., a day. This ends the process for the yes branch. In one embodiment, the dynamic load balancer 418 operates in conjunction with the image registration unit 408 for propagating updates to the master indexed table 416 and/or the index tables 411, 412, 413.

Figure 12:
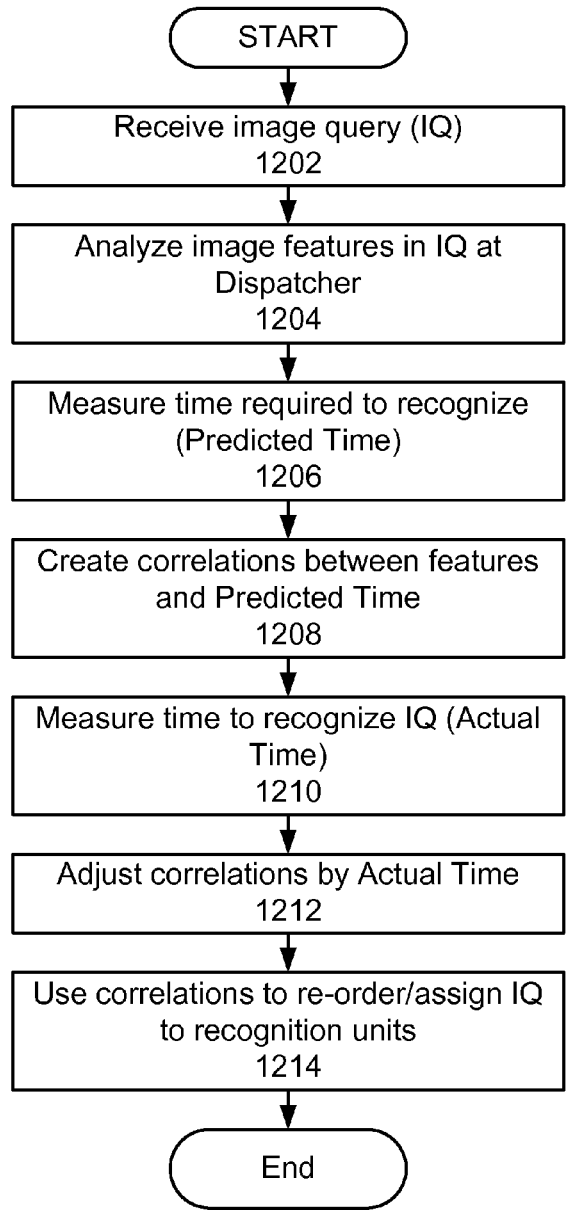
FIG. 12 is a flowchart of a method for image-feature-based ordering in accordance with an embodiment of the present invention.

Referring now to FIG. 12, one embodiment of a method for performing image feature-based ordering will be described. This functionality of this method is generally implemented by the image feature order unit 504 of the dispatcher 402. Feature-based ordering is a mechanism for organizing the priorities of the image queries waiting to be recognized. The default is FIFO (First-In, First-Out), that is, servicing the image queries in the order they were received. In the case of feature-based ordering, image queries instead are processed based on an estimate on the speed of recognition, e.g., wherein image queries expected to be recognized in a short amount of time being processed earlier, with the goal of maximizing the response time for the largest number of users. The speed of recognition would be estimated in one embodiment by counting the number of features in each received image query; image queries with fewer features would be processed first.

Figure 13:
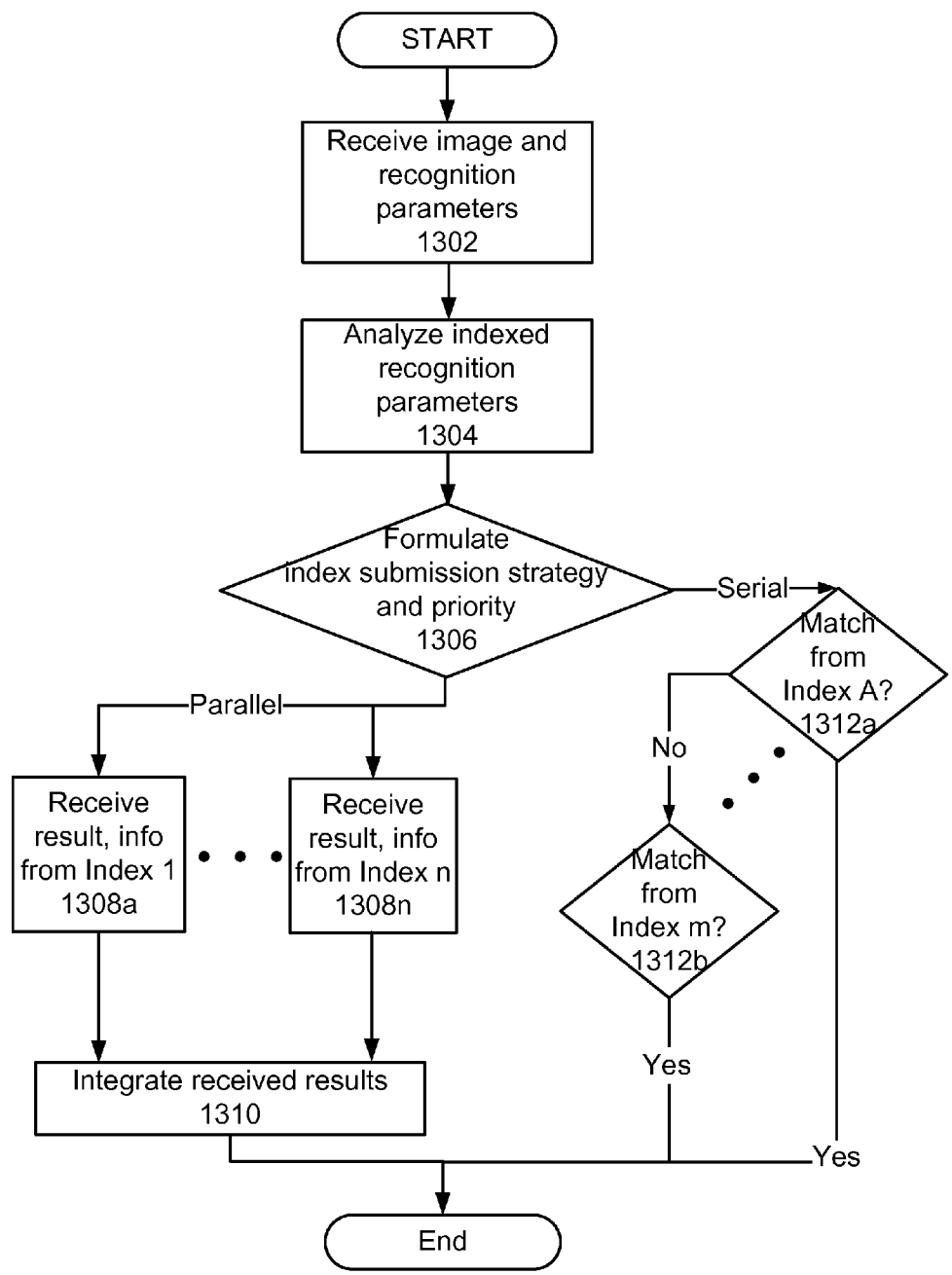
FIG. 13 is a flowchart of a method for processing image queries across multiple index tables in accordance with an embodiment of the present invention.

The method begins by receiving 1202 an image query. Next, the image feature order unit 504 of the dispatcher 402 analyzes 1204 the image features in the image query. It should be noted that the image features used in the analysis of step 1204 need not be the same image features used by the recognition units 410. It is only necessary to correlate the image features to recognition. In yet another embodiment, several different feature sets are used and correlations are measured over time. Eventually, the feature set that provides the best predictor and has the lowest computational cost is determined and the other feature sets are discarded. The image feature order unit 504 measures 1206 the time required to recognize the image features and thereby generates a predicted time. Next, the method creates 1208 correlations between features and predicted times. Next method measures 1210 the time actually required by the acquisition unit 406 to recognize the image query. This time required by the acquisition unit 406 is referred to as an actual time. Then the image feature order unit 504 adjusts 1212 the correlations generated in step 1208 by the actual time. The adjusted correlations are then used 1214 to reorder and assign image queries to recognition units. For example, simple images with few features are assigned to lightly loaded servers (recognition units 410 and index table 412 pairs) so that they will be recognize quickly and the user will see receive the answer quickly. While the method shown in FIG. 12 illustrates the process for an image or a small set of images, those skilled in the art will recognize that once many images have been processed with the above method, a number of correlations will be created and the image feature order unit 504 essentially learns the distribution of image features against processing time and then the controller 501 of the distributor 506 can use the distribution to load balance and redirect image queries with particular image features accordingly FIG. 13 is a flowchart showing a method for processing image queries across multiple index tables 412 according to one embodiment of the present invention. The image queries are processed according to different image processing techniques and recognition parameters. For example, the method may be used for the embodiment described in conjunction with FIG. 6B in which the same image or page is placed in multiple index tables 412 having been processed according to different image processing techniques using various recognition parameters, e.g., such as being blurred by different amounts, before computing features of the image to be indexed. In one embodiment, quality feature vectors may be calculated by the vector calculator 804 as described in conjunction with the quality predictor 502 of FIG. 8. This embodiment is advantageous because more accurate results are produced and recognition is faster using index tables 412 that are tailored to specific recognition parameters.

The method begins with the dispatcher 402 receiving 1302 an image along with recognition parameters corresponding to the image. Continuing the example from above, the image query may be received with recognition parameters corresponding to the level of blur for the received image. In one embodiment, the dispatcher 402 also may receive computation drivers with the image query. Computation drivers include expected recognition speed, maximum recognition accuracy, or perceived recognition speed, and are received from dynamic load balancer 418 according to one embodiment, and may be used e.g., according to the method discussed in conjunction with FIG. 12. Next, recognition parameters are analyzed as associated with the respective index tables 412. In one embodiment, this information may be received from the dynamic load balancer 418. Based on the received information, the dispatcher 402 formulates 1306 an index table 412 submission strategy and index priority. In one embodiment, the output of step 1306 includes a recognition unit identification number (RUID) as discussed in conjunction with the dispatcher 402 of FIG. 5.

One exemplary submission strategy is parallel submission to multiple index tables 412. In this example, the index queries are sent in parallel, and results are received 1308 from each of the index tables 412, e.g. Index 1-n, as shown in FIG. 13. The results from the multiple index tables 412 are then integrated 1310, and the process ends. According to one embodiment, the integration is performed by the integrator 509 of dispatcher 402. According to another embodiment, steps 1308 and 1310 are equivalent to those discussed in FIG. 6B, and the integration is performed by other units, such as the result combiner 610 shown in FIG. 6B. According to yet another embodiment, the dispatcher 402 merely receives and retransmits the data to the pre-processing server 103 or MMR gateway 104, for integration therein.

A second exemplary submission strategy is serial submission to multiple index tables 412. In this example, the index queries are sent to multiple index tables 412 according to the priority established in step 1306. E.g., a query is first submit 1312a to Index A, and if a result is found, the process ends. If the result is not found, the query is next submit 1312b to each index table 412 in turn, through index m, until a result is found and the process ends. The final result is provided via signal line 134 to the pre-processing server 103 or MMR gateway 104.

FIG. 14 is a flowchart showing a method for segmenting received image queries and processing the segmented queries according to one embodiment present invention. In this embodiment, the multiple index tables 412 correspond to different content types. This embodiment is advantageous because more accurate results are produced and recognition is faster using index tables 412 that are tailored to specific image content types. The method begins with the dispatcher 402 receiving 1402 an image query, and other receipt information, for processing. The dispatcher 402 segments 1404 the image query into image segments corresponding to various content types contained with an image. In one embodiment, the segmenter 505 detects content of various types within the received image query and segments the content accordingly. In another embodiment, this function is performed by the quality predictor 502, e.g., using vector calculator 804. Content types may include, among others, black text on white background, black and white natural images, color natural images, tables, black and white bar charts, color bar charts, black and white pie charts, color pie charts, black and white diagrams, color diagrams, headings, and color text. This list of content types is exemplary and not meant to be limiting; other content types may be used. In an alternative embodiment, the dispatcher 402 receives a pre-segmented image query, e.g., the segmenting may be performed by the pre-processing server 103 or MMR gateway 104. Next, the dispatcher 402 submits 1406 the segmented queries to one or more corresponding content type index tables 412. In one embodiment, the step includes analysis of the indexed content types, similar to the analysis of step 1304 of FIG. 13. In one embodiment, the output of step 1406 includes an RUID along with the appropriate image query. The dispatcher 402 then receives 1408 results and image associated metrics from each of the index tables 412. In its metrics may include, among others, a competence factor associated with the results, context information such as date, time, location, personal profile, retrieval history, and surface area of the image segment. This information, along with prior probability of correctness for the index tables 412 and level of agreement between results from various index tables, along with other factors, can be used by the dispatcher 402, e.g., at integrator 509, to integrate 1410 the received results. For example, given four index tables 412 corresponding to image types header, black and white text, image, and color text, integrating the results may include ascertaining whether the same result image was produced by each of the index tables 412, at what level of confidence for each, and the probability of correctness associated with each of the index tables 412. In an alternative embodiment, the result integration is performed outside of the dispatcher 402, e.g., by a result combiner 610 as discussed in conjunction with FIG. 6B. The final result is provided via signal line 134 to the pre-processing server 103 or MMR gateway 104.

Hierarchical Shared Content Index (HSCI)

Figure 15A:
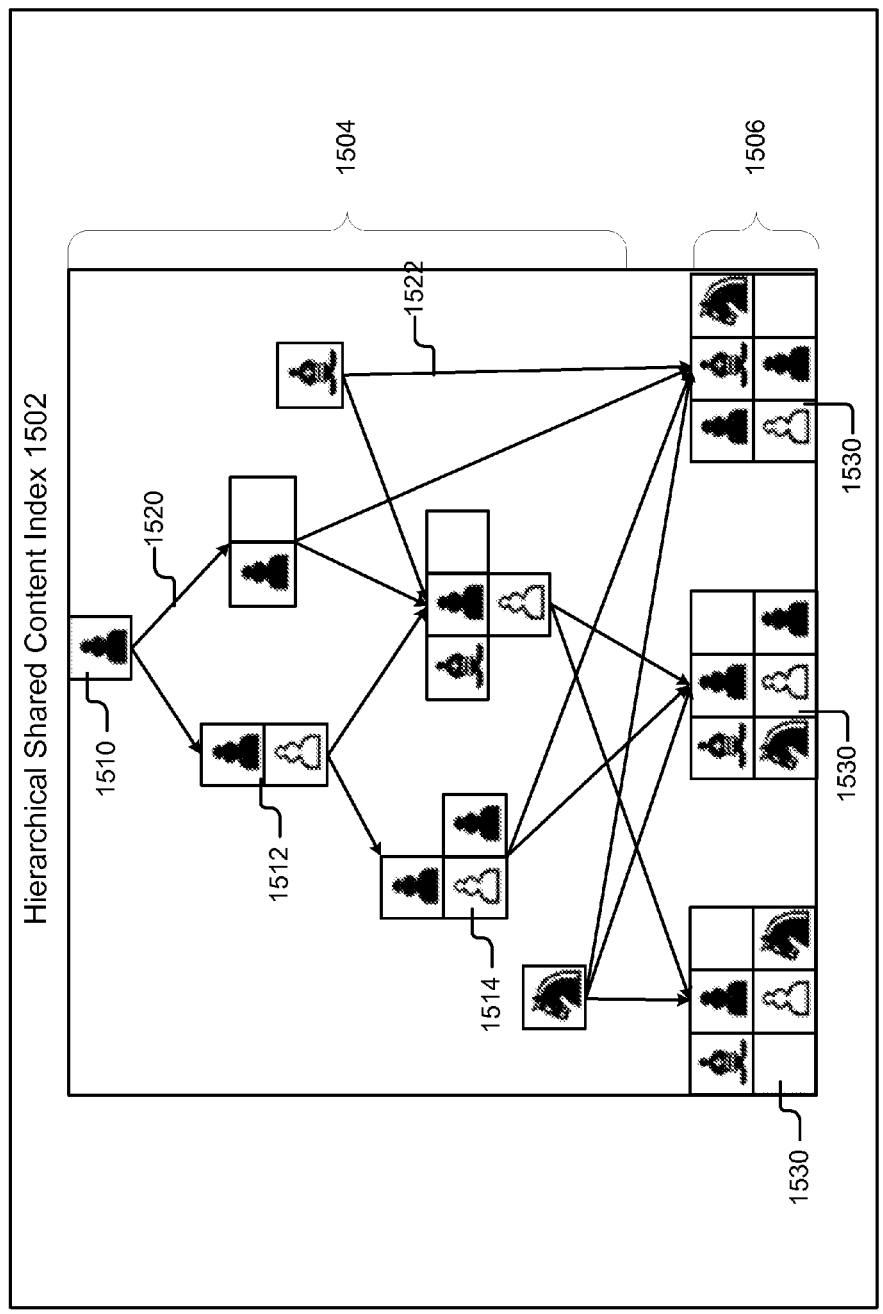
FIG. 15A is a block diagram of an embodiment of a hierarchical shared content index.
Figure 15B:
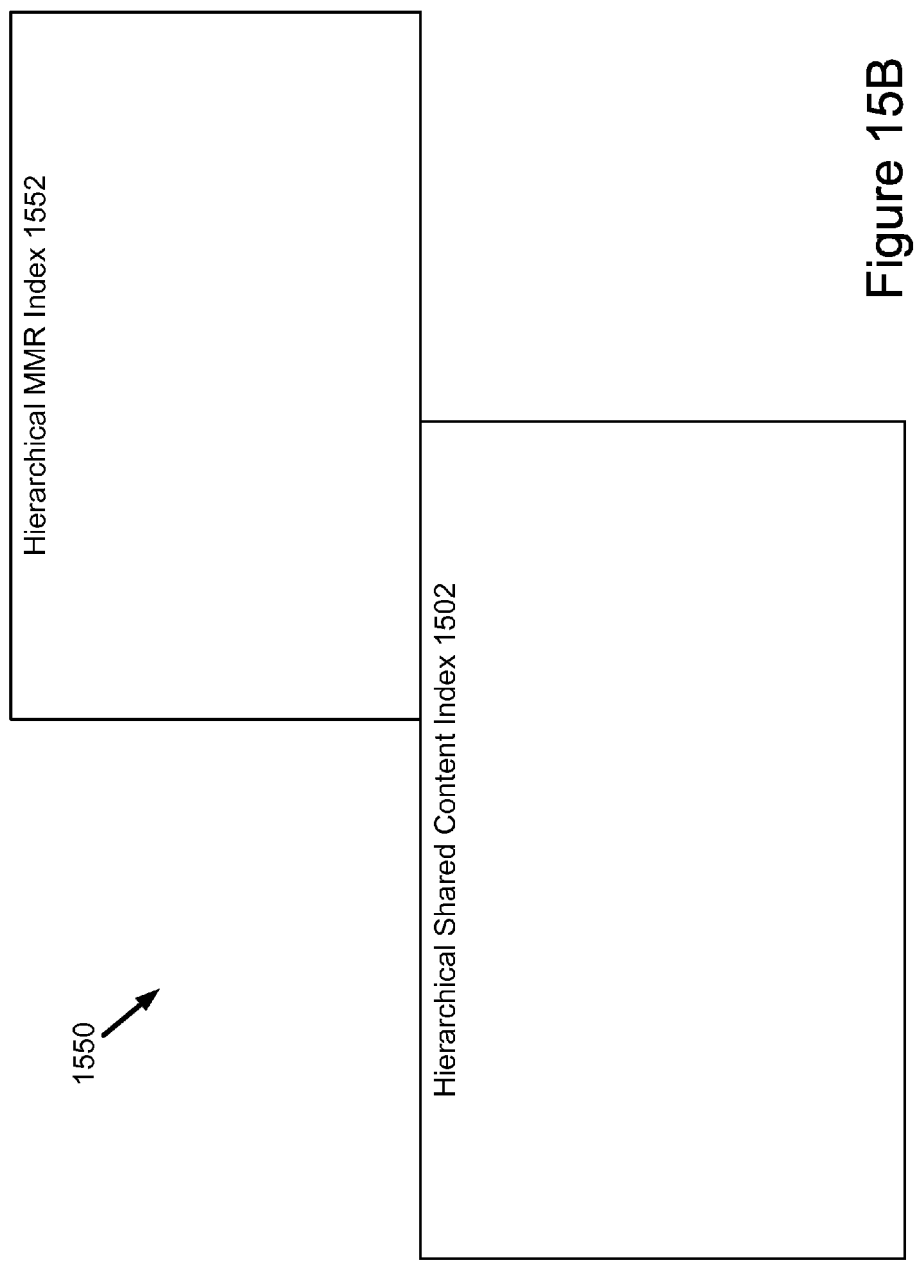
FIG. 15B is a block diagram of an embodiment of a combined hierarchical index.
Figure 15C:
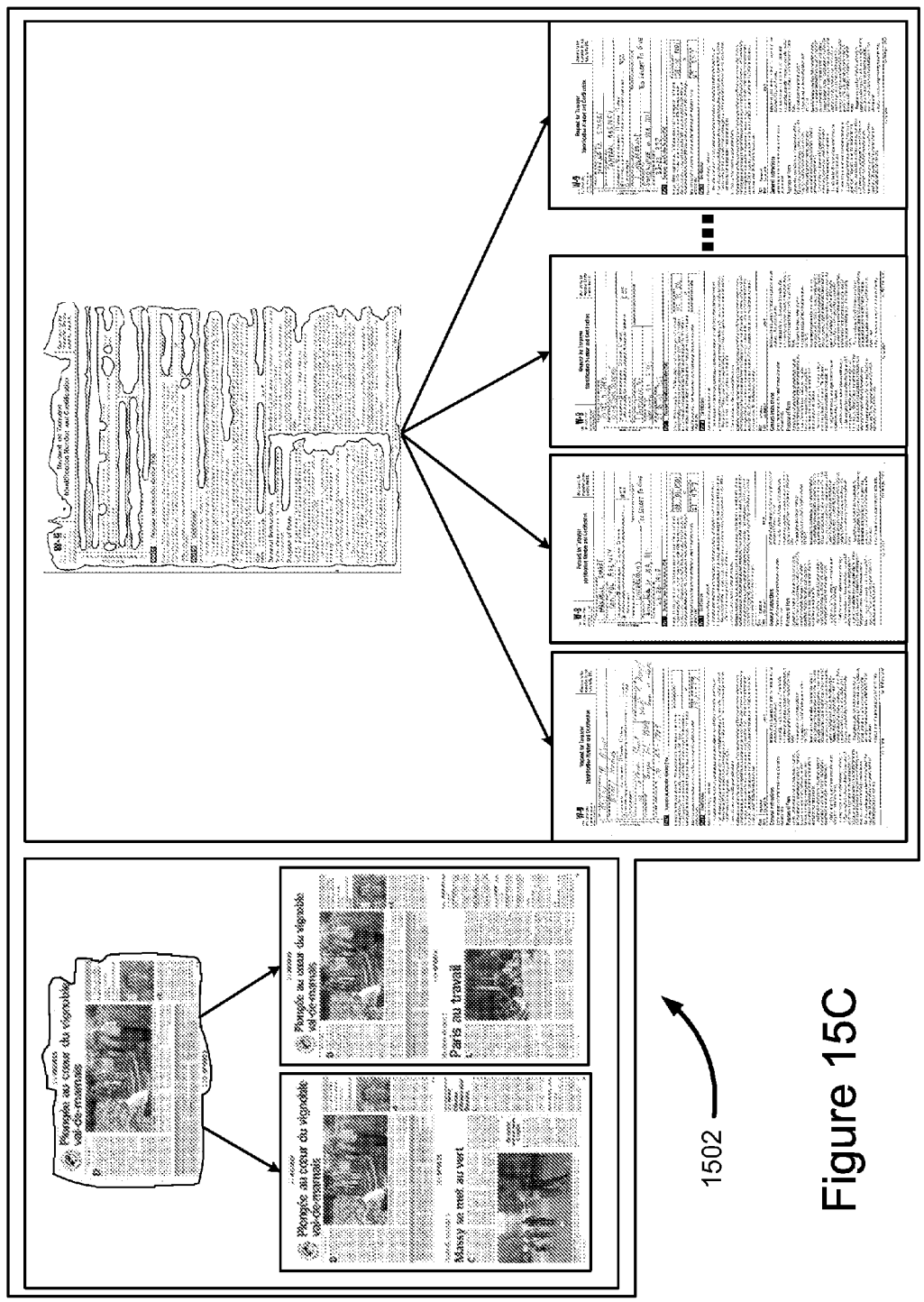

Referring now to FIGS. 15A-15D, embodiments of a hierarchical shared content index will be described. FIG. 15A show a first and preferred embodiment for the hierarchical shared content index 1502. The hierarchical shared content index 1502 represents the content that is shared among document images. In particular, the hierarchical shared content index 1502 provides a semantic link between documents that have identical or similar parts and exist in the MMR system 100. Those skilled in the art will recognize that FIGS. 15A and 15C are only examples of an hierarchical shared content index 1502 and that the images and component are representative of one example, and that different hierarchical shared content indices have a variety of different structures and organization depending the image content that is indexed and the repetition in the images. The hierarchical shared content index 1502 is a hierarchical description of document pages, by which a document page is constituted of parts that are shared among multiple pages, plus a part that is unique to each page. Some pages may contain no shared parts, while some pages may contain only shared parts and do not have a unique part. The hierarchical shared content index 1502 represents what content is repeated and in which document page. Furthermore, those skilled in art will recognize that in another embodiment the master index table 416 has a plurality of hierarchical shared content indices 1502, each of the hierarchical shared contact the index 1502 for a different group of documents that have repeated content among them. For example, each index might include a particular form and various different document images with portions of that form completed.

As shown in FIG. 15A, the hierarchical shared content index 1502 comprises a hierarchical index 1504 and one or more entire document pages 1506. The hierarchical index 1504 includes a plurality of nodes 1510, 1512 and 1514, associated by a plurality of edges 1520 and 1522. As shown in the example of FIG. 15A, the hierarchical shared content index 1502 has seven nodes and three document pages. The hierarchical index 1504 is used to represent image content repeated among indexed images. In one embodiment, this hierarchical index 1504 is represented as a directed acyclic graph. Leaf nodes represent the actual pages that are indexed while internal nodes represent shared content. The pages that share some content are descended from a common node, which can thus be represented by the content that is shared by all its descendants. The edges in this graph include the positional information (x,y, rotation and scale) of the parent shared content in the child image. It should be understood that a particular hierarchical shared content index 1502 may include a plurality of directed acyclic graphs (also known in the literature as a graph with a plurality of connected components) depending on the repetition of content among the plurality of document pages 1506.

To illustrate the hierarchical index 1504 used to describe the repeated content in document images; FIG. 15A has an example three document pages 1530. Each of these document pages 1530 contains 6 parts. Each part in the document pages 1530 is shown as a symbol such as a chess piece on a corresponding block (dark or white) of color. A block of the same color and chess piece represents the same figure in all the document pages 1530. Each symbol and color block represents a distinct figure. Thus in this example there are six different figures being used repeatedly in the document pages 1530: 1) black bishop on dark block, 2) black pawn on white block, 3) dark block, 4) white block, 5) white pawn on a dark block, 6) black night on white block. Those skilled in the art will recognize that the use of symbols and lots of colors is merely by way example so that the repeated content can be easily identified within the hierarchical index 1504. For most document pages, the parts of the document page could be in any form and the parts could be of any size.

This example is particularly elaborate in one respect: We would hardly expect in general the same figure to appear twice in the same slide, and if it did, we would not expect this to happen in multiple slides, with the figures in different locations relative to each other. This complexity has been chosen to illustrate better the properties of the hierarchical representation of the images. In other respects, however, this example is artificially simple for illustrative purposes: In particular, the figures that are repeated are square in shape, of the same size and perfectly aligned with each other. In general, the areas that are repeated among document images, will not represent complete semantical blocks (such as the figures shown here), but will incorporate parts of multiple semantic elements in a document page, such as figures, headings and paragraphs. Moreover repeated areas will be of arbitrary shape, and repeated areas may appear with different sizes in various document images. The hierarchical index 1504 is used to represent the shared content among the three document images 1530. The positional information stored in every edge 1520, 1522 is not shown explicitly for simplicity and ease of understanding.

Figure 15D:
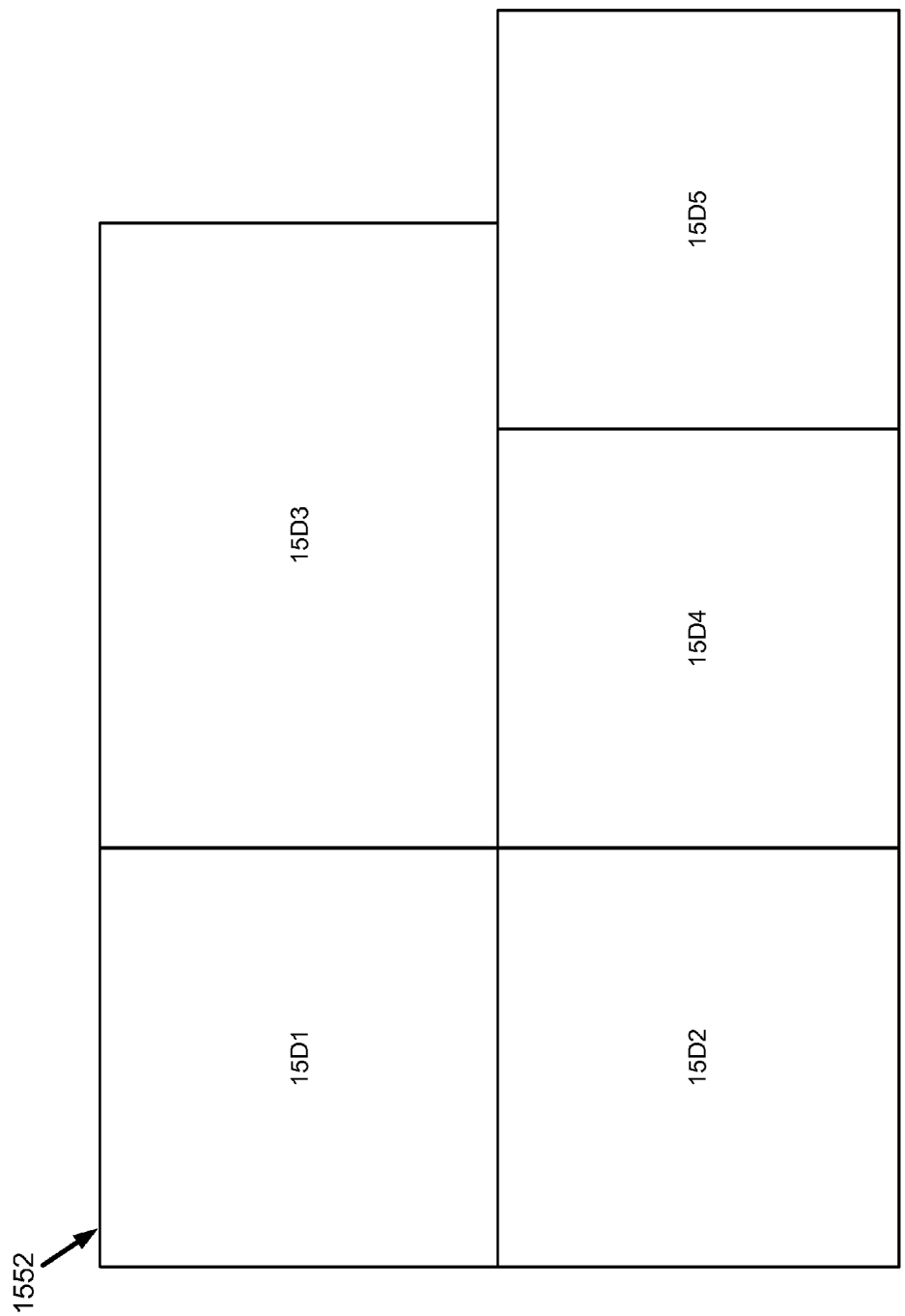

FIG. 15B is a block diagram of an embodiment of a combined hierarchical index 1550. The combined hierarchical index 1550 includes a hierarchical shared content index (HSCI) 1502 and a hierarchical MMR index (HMI) 1552. Examples of the hierarchical shared content index (HSCI) 1502 and a hierarchical MMR index (HMI) 1552 are depicted in FIGS. 15C and 15D, respectively. The combined hierarchical index 1550 is particularly advantageous because it combines the broad search capabilities of an MMR index 1552 with the increase accuracy of the hierarchical shared context index 1502. More specifically, a traditional flat MMR index is constructed and utilized alone in situations where there are not many images that share the same content. However, in situations where there is a significant amount of the same or repeated content, the structure shown in FIG. 15B is employed. The use of a hierarchical structure for the MMR index instead of the traditional flat MMR index when used in combination with the hierarchical shared content index 1502 improves the speed and accuracy of recognition. In one embodiment, the hierarchical MMR index 1552 includes a tree, where each node is a traditional flat MMR index that indexes images (or image regions) with little shared content. In the example of the hierarchical index 1552 in FIG. 15D, the lower flat MMR index 1556 indexes the parts of the forms that have little shared content. In particular, it indexes the form images after the common boiler plate area has been blanked out from them. Notice that the common area of these images is indexed as a single image in the upper flat MMR index 1554. The link 1558 between the upper and lower MMR indexes 1554, 1556 in the hierarchical index 1552 maintains the information that all the images in the lower index 1556 are associated with the common boiler plate image 1560 in the upper index 1554. Thus when indexing images into the lower index 1556, the blanking out happens implicitly by not considering part of the images that belong to the parent (boiler plate) image 1560 already present in the upper index 1554.

Figure 16:
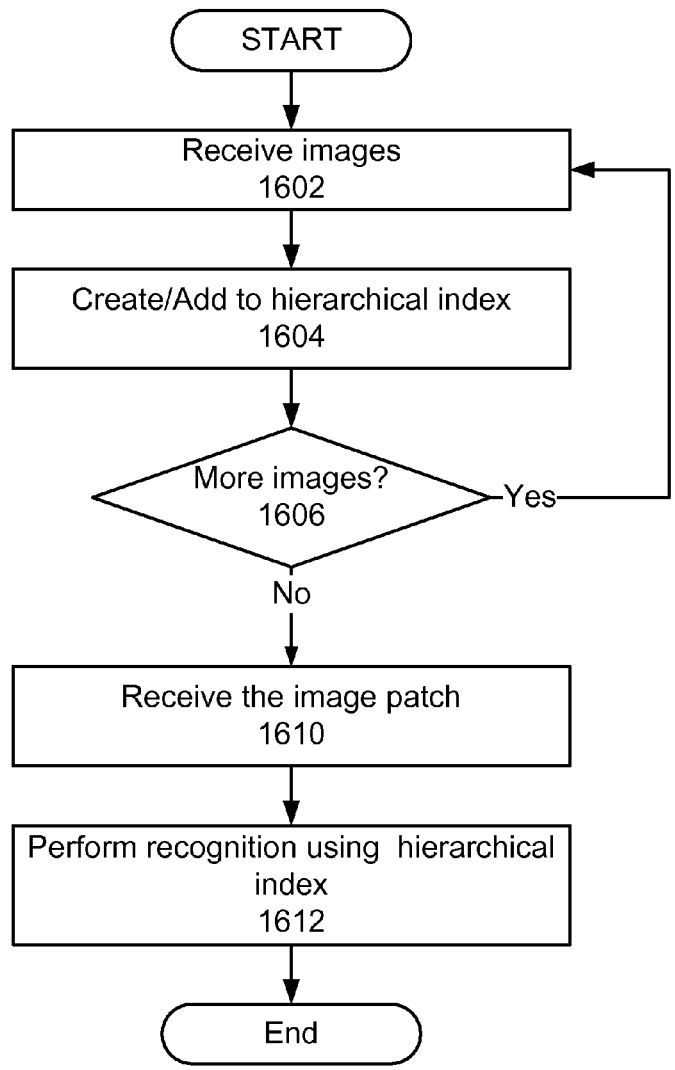
FIG. 16 is a flowchart of an embodiment of a method for creating and using the hierarchical shared content index in combination with a hierarchical MMR index.

FIG. 16 is a flowchart of an embodiment of a method for creating and using the hierarchical MMR index 1552 and hierarchical shared content index 1502 in accordance with the present invention. The method begins by receiving 1602 images. These images are input as has been described above and are received by the image registration unit 408. More specifically, in one embodiment the indexing unit 414 receives the images and the hierarchical MMR index 1552 and hierarchical shared content index 1502 are part of the master index table 416. Next, the method creates or adds 1604 the image received in step 1602 to hierarchical MMR index 1552 and to the hierarchical shared content index 1502. One embodiment for this step is described below in more detail with reference to FIG. 17. Initially, if the hierarchical MMR index 1552 or the hierarchical shared content index 1502 do not exist, the hierarchical MMR index 1552 and the hierarchical shared content index 1502 are initialized and created 1604. Next, the method determines 1606 whether there are additional images that need to be indexed. If so, the method returns to step 1602 to receive the images and adds 1604 the additional images to the hierarchical shared content index 1502 and the hierarchical MMR index 1552. On the other hand, if there are no additional images, the creation of the hierarchical MMR index 1552 and the hierarchical shared continent index 1502 is complete.

The general method next receives 1610 an image patch for recognition of the corresponding document. The image patch is provided to a recognition unit 410 and the corresponding hierarchical MMR index 1552 and hierarchical shared content index 1502. The recognition unit 410 uses the image patch and the hierarchical MMR index 1552 and hierarchical shared content index 1502 to perform 1612 document recognition. One embodiment for using the hierarchical MMR index 1552 and hierarchical shared content index 1502 is described in more detail below with reference to FIG. 19 and Appendix B. Those skilled in the art will recognize that the process described above with reference to FIG. 16 includes a variety of steps and processes which can be performed independently of each other except when the results of prior stepper specifically required for a subsequent step.

Figure 17A:
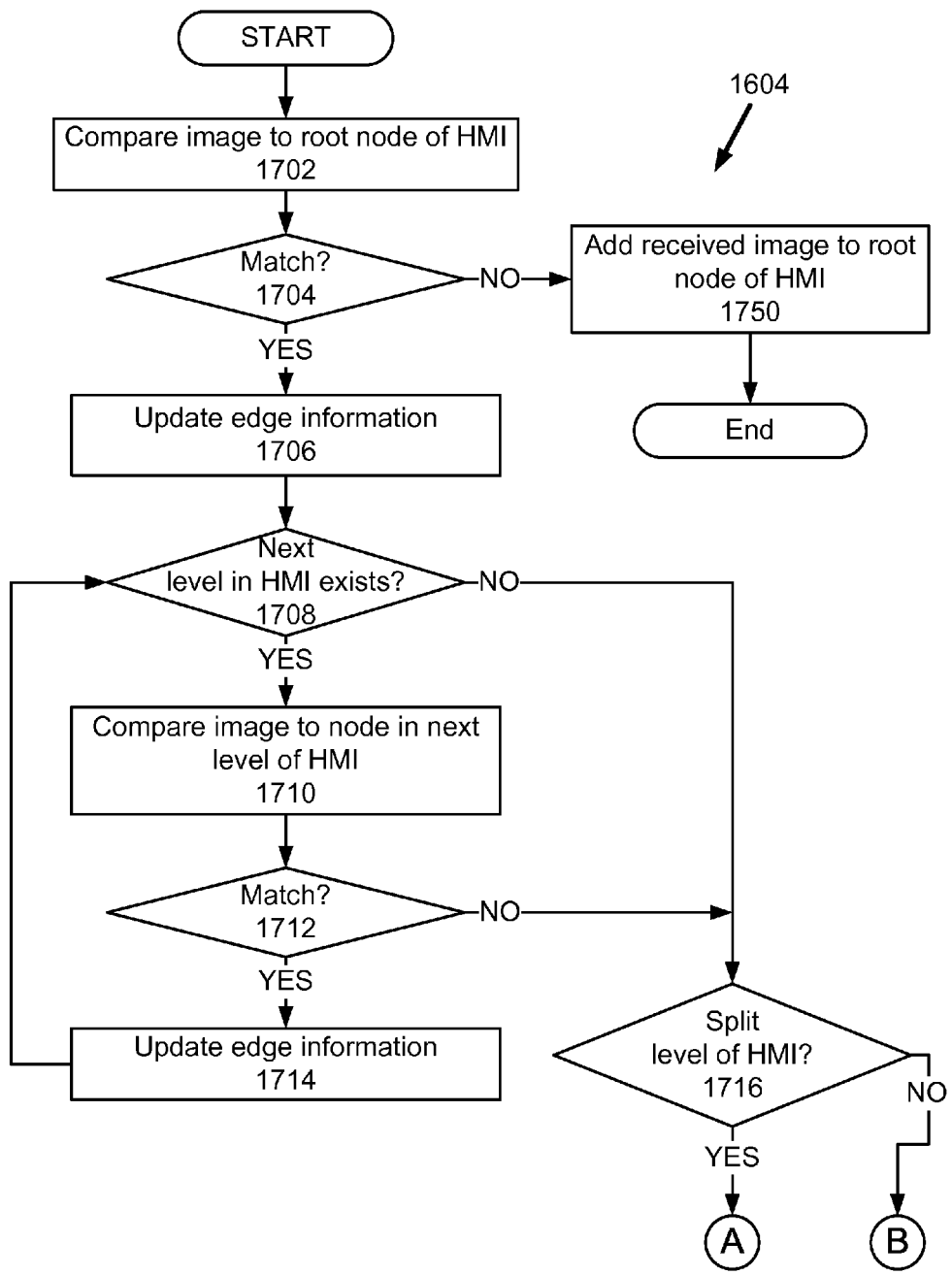
FIGS. 17A and 17B are flowcharts of an embodiment of a method for adding an image to the hierarchical shared content index and associated hierarchical MMR index.
Figure 17B:
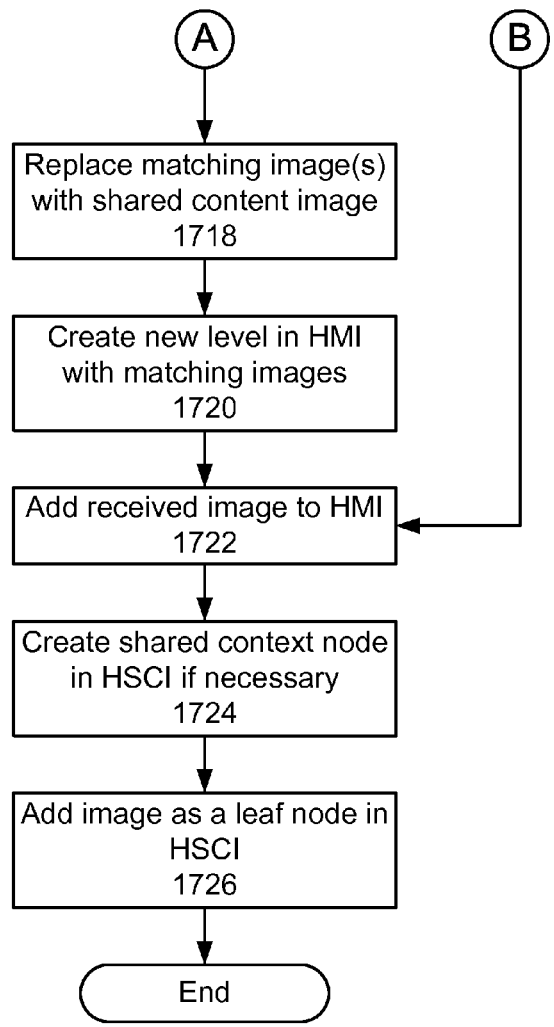

Referring now to FIGS. 17A and 17B, an embodiment of a method 1604 for adding an image to the hierarchical MMR index 1552 and hierarchical shared content index 1502 will be described. The first time it is executed, the method 1604 of FIG. 17 is performed initially on a plurality of images to create the hierarchical MMR index 1552 and the hierarchical shared content index 1502. In subsequent executions, the method 1604 of FIG. 17 is performed to add images to a preexisting hierarchical MMR index 1552 and hierarchical shared content index 1502. The method of FIG. 17 is performed after an image has been received, for example see step 1602 of FIG. 16.

The method 1604 for adding an image to the hierarchical MMR index 1552 and hierarchical shared content index 1502 begins selecting or identifying a hierarchical shared content index 1502 and by performing a traditional MMR search 1702 of the received image in the traditional flat MMR index corresponding to the root node of the hierarchical MMR index 1552. Next, the method determines 1704 whether any portions of the received image are present in the traditional flat MMR index corresponding to the root node of the hierarchical MMR index 1552. If not, the method adds 1750 the received image to the flat MMR index corresponding to the root node of the hierarchal MMR index (HMI) 1552 and terminates. If so, the method updates 1706 the edge information to reflect that the received image has one or more portions that match a node and continues to traverse the hierarchal MMR index 1552 in step 1708. In step 1710, the method performs a traditional MMR search of the received image in the traditional flat MMR index corresponding to the matched child node if such an index exists. Then the method determines 1712 whether the received image matches any of the image portions stored in the traditional flat MMR index corresponding to the child node. If not, or there is no child node in the hierarchical MMR index, there is no repeated content in the received image (or the repeated content appears only in a few images, which means a separate flat MMR index has not yet been created for those images) and the method proceeds to step 1716. On the other hand, if there is a match in step 1712, the method proceeds to step 1714 to update the edge information to reflect that the received image has one or more portions that match a node. After step 1714, the process returns to step 1708 to traversal the next level of nodes in the hierarchal MMR index 1552. The steps are 1708, 1710 and 1712 are repeated for each level in the hierarchal MMR index 1552 until there are no matches in step 1712, or there is no next level. At that point the method transitions from step 1708 to step 1716.

Until this point only the hierarchical MMR index (HMI) 1552 has been read (but not modified) while the hierarchical shared content index (HSCI) 1502 has not been read or modified. In step 1716, the method decides if the flat MMR index that was last matched needs to be split. In one embodiment, this decision is based on the number of documents that matched; and in another embodiment, this decision is based on the surface area of the matching area. Referring now to FIG. 17B, if the index needs to be split, the images that matched the current image are removed 1718 from the MMR index that was last matched and a new synthetic image is added 1718 to this index representing the repeated content among the deleted images. The deleted images are then added to their own flat MMR index after masking out the regions that they share 1720. This new flat index is added 1720 to the hierarchical MMR index 1552 as a child node of the MMR index that was last matched and associated to the synthetic image created in 1718. Regardless of whether the flat MMR index is split or not, the current image is added to the hierarchical MMR index 1552 (to the new level if one was created, or the matching level if not) in step 1722. Then the input image is added to the hierarchical shared content index (HSCI) 1502 in two steps. In step 1724, new intermediate nodes representing shared content between the new image and previous images are added to the HSCI 1502 if necessary. In step 1726 a leaf node in the hierarchical shared content index 1502 and edges from that leaf node to other nodes are created. Steps 1724 and 1726 are accomplished very efficiently as the new image only needs to be compared with the images that were matched in steps 1702 or 1710. After the input image is then added as a leaf node, the method is complete and ends.

Figure 18:
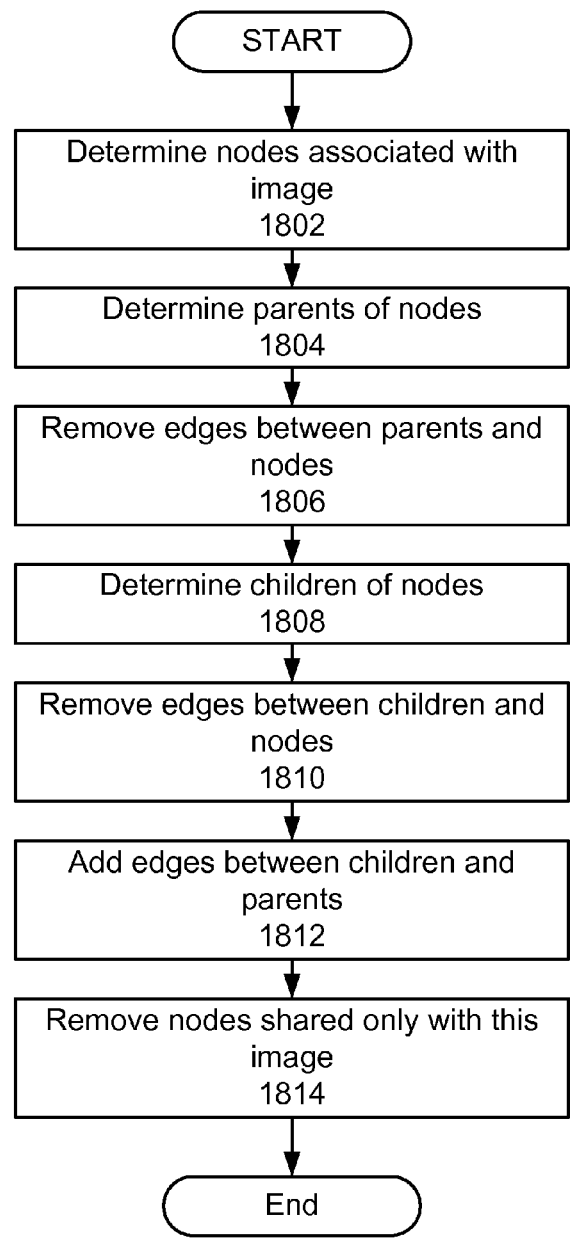
FIG. 18 is a flowchart of an embodiment of a method for deleting an image from the hierarchical shared content index and associated hierarchical MMR index.

Referring now to FIG. 18, is a flowchart of an embodiment of a method for deleting an image from the hierarchical shared content index 1502 will be described. In some cases, it is desirable to remove a document image from the hierarchical shared content index 1502, for example if the image was added to the index in step 1604 by mistake, or if the image becomes obsolete, or confidential. The method of FIG. 18 deletes a document page, d, from the associated hierarchical shared content index 1502. The method is based on removing nodes that have only one child after removal of the node n associated to the document page, as that means they no longer represent shared content. The method of FIG. 18 is performed after an image has been received, for example see step 1602 of FIG. 16. The method begins by determining 1802 one or more nodes, if any, of the hierarchical shared content index 1502 associated with the input image. Next the method determines 1804 the parent nodes for the nodes identified in step 1802. The method then removes 1806 edges between the parent nodes and the nodes identified in step 1802. Then the method determines 1808 the child nodes for the nodes identified in step 1802. The edges between the child nodes and the nodes identified in step 1802 are removed 1810 from the hierarchical shared content index 1502. These steps effectively removed any nodes and edges created due to repeated content between the input image and the images of the hierarchical shared content index 1502. Next, the method adds 1812 edges between the child nodes and parent nodes as appropriate to reconnect these nodes due to removal of any nodes created by the image been removed. Finally, deletion of the input image from the hierarchical shared content index 1502 is completed by removing 1814 node shared only with this image. This embodiment is also described by the pseudo code provided in Appendix A.

The image also needs to be deleted from the hierarchical MMR index 1552. In one embodiment, this is done in process similar to that described above for the hierarchical shared content index 1502. In another embodiment, this is done by removing the image from the flat MMR index where it is stored within the hierarchical MMR index 1552. That index may need to be merged with its parent index in the hierarchical MMR index 1552 after removing the image. In one embodiment of the present invention, this is triggered by the index size shrinking below a given a constant. To merge a first flat MMR index into a second flat MMR index, all images are removed from the first flat MMR index and this index is subsequently deleted and all removed images are added to the second flat MMR index.

Figure 19:
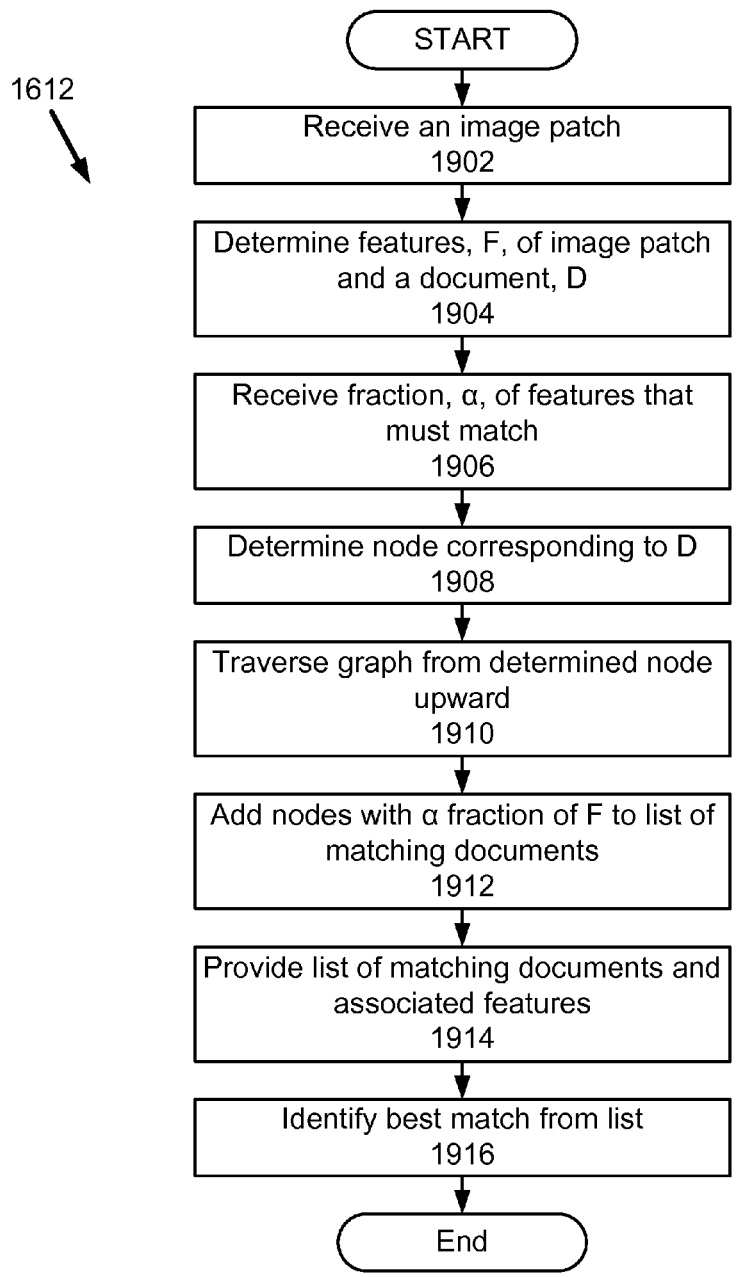
FIG. 19 is a flowchart of an embodiment of a method for using the hierarchical shared content index and associated hierarchical MMR index for recognition.

FIG. 19 is a flowchart of an embodiment of a method 1612 for using the hierarchical shared content index 1502 in combination with the hierarchical MMR index 1552 for recognition of documents. The recognition methods described above with reference to FIGS. 4A and 4B (classical or traditional recognition using a flat MMR index) when presented with a patch that appears in multiple indexed documents returns one of these documents at random, or no document at all. In contrast, this embodiment of the recognition method retrieves a complete set of document pages that match a given patch using the hierarchical shared content index 1502. The method begins by receiving 1902 an image patch. The method then determines 1904 the features, F, of the image patch. These features are used to search for a suitable document, d, using the hierarchical MMR index 1552. This method uses an existing MMR index 412 to obtain the document, d, in the set of all matching documents. This is done by first searching in the root node of the hierarchical MMR index 1552. If a document matching the image patch is found there, it is returned, if not, the hierarchical MMR index 1552 is searched in a breadth first fashion, until the image patch is found in the flat MMR index corresponding to a node, or it is not found in any of the nodes. Notice that in one embodiment of this invention at most only one document will be found as the MMR indexes in each of the nodes of the hierarchical MMR index 1552 do not contain documents with shared content. In next, the method receives a fraction, α, of features that must match in the following comparison of the features to the hierarchical shared content index 1502. The use of this fractional value, α, is particularly advantageous because it allows the recognition method to be optimized according to the needs of the users. The use of the fractional value can be thought of as creating a mask constraint correlation between two images. More specifically, the fractional value allows the comparison of the features to the hierarchical shared content index 1502 to be optimized using factors such as how much area of the patch is used, how many features of the patch must match, and how unique the match is. Those skilled in the art will recognize that the optimization provided by the fractional value is dependent on the coding algorithms employed. Next the method determines 1908 a node corresponding to the document identified in step 1904. Then the method traverses the graph or hierarchical index 1504 of the hierarchical shared content index 1502 upward from the node that represents the document, d, to obtain a complete collection or more precisely all documents that match at least the received fraction from step 1906 of the number of features that match document, d. The nodes that have the received fraction of features are added 1912 to list of matching documents. The list of matching documents is given as a set of nodes in the graph such that all their descendants match the query patch. Finally, the list of matching documents and their associated features are provided 1914 as output.

The method uses the locations in the document page of the MMR features F that match the patch query to count efficiently the number of matching features that belong to a shared content region. The features F that match the patch query are also returned by the MMR system. In one embodiment, the method is performed by a recursive function that maintains a list of visited nodes V as well as a list of all nodes that form part of the list of matching documents. A node forms part of the list of matching documents if all its descendant document pages match the patch, but not all the descendants of any of its ancestors match. For each node in the list of matching documents, the set of features that match that node are also given. This is particularly advantageous because it matches the output format of the other recognition units 410 of the MMR system 100. This set includes at least a fraction a of the features that match d. More specifically, one implementation of this method is described in more detail below in Appendix C.

In one embodiment, the recognition unit 410 uses the hierarchical shared content index 1502 to detect cases of copyright infringement. In another embodiment, the recognition unit 410 uses the hierarchical shared content index 1502 in combination with an index table 412 to identify the set of documents matching a given patch.

The method of the present invention also includes finding 1914 the correct matching document page in the presence of multiple closely matching document pages in the hierarchical shared content index 1502. Since the method described above with reference to FIG. 19 returns a list of documents that are similar by definition, a problem occurs in the presence of large amounts of repeated content, namely, that the features that make a document unique are small compared to the amount of content that is shared, thus possibly confusing other traditional or classic MMR recognition methods described above. This is for example the case when recognizing a given form instance among many form instances that use the same form template.

In one embodiment, the step of identifying 1916 a best match from the list of documents begins with the document, d, that is obtained from a search into the root node of the hierarchical MMR index 1552. If the hierarchical MMR index 1552 has a child node associated with the retrieved document, d, the method makes a second search into the flat MMR index associated to this child node that searches only within the set of the pages in the list of matching documents and only for the features F of the patch not in the shared region represented by the child node. Constructing hierarchical MMR indexes can be implemented by the flat MMR systems described above, by associating flat MMR indexes with the nodes of a graph. More specifically, one implementation of this method is described in more detail below in Appendix C.

In yet another embodiment, the classical MMR systems are modified to improve their accuracy in certain cases when used in the manner described here would add a second geometric verification step during the scoring phase in addition to the usual one, to ensure that the shared content and the content unique to the page are aligned as in the patch. The location of the shared content for a given page can easily be obtained from the hierarchical shared content index 1502.

The hierarchical shared content index 1502 also enables adding hotspot content to a region shared by multiple documents, such that the content can be sent to any user that takes a picture of that patch, even if it impossible to determine uniquely which document they took a picture of.

Figure 20A:
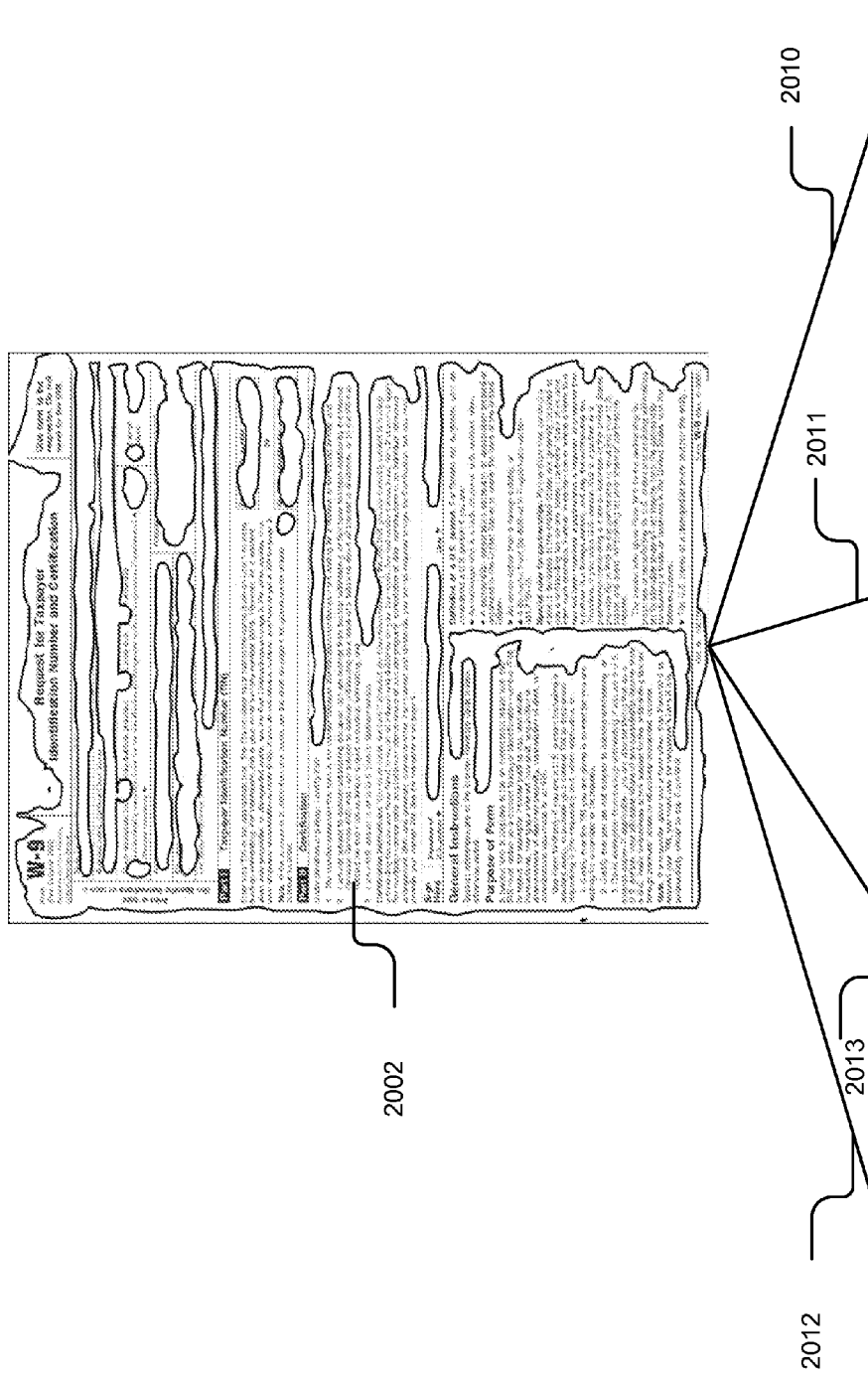
Figure 20B:
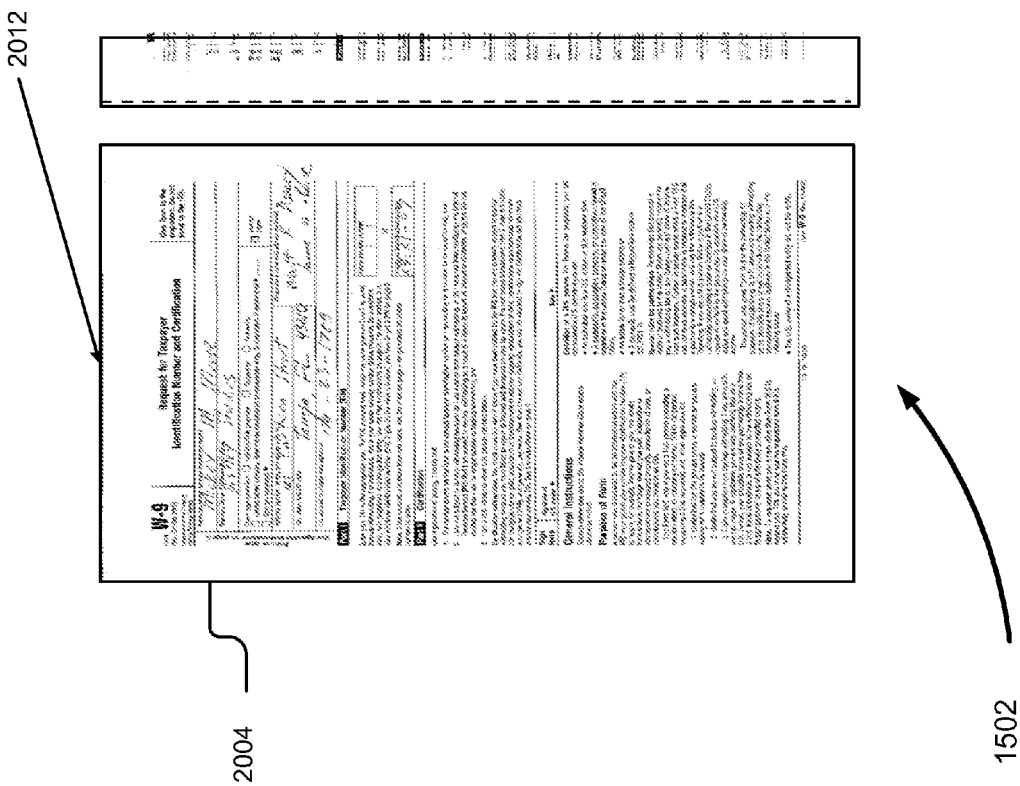
Figure 20C:
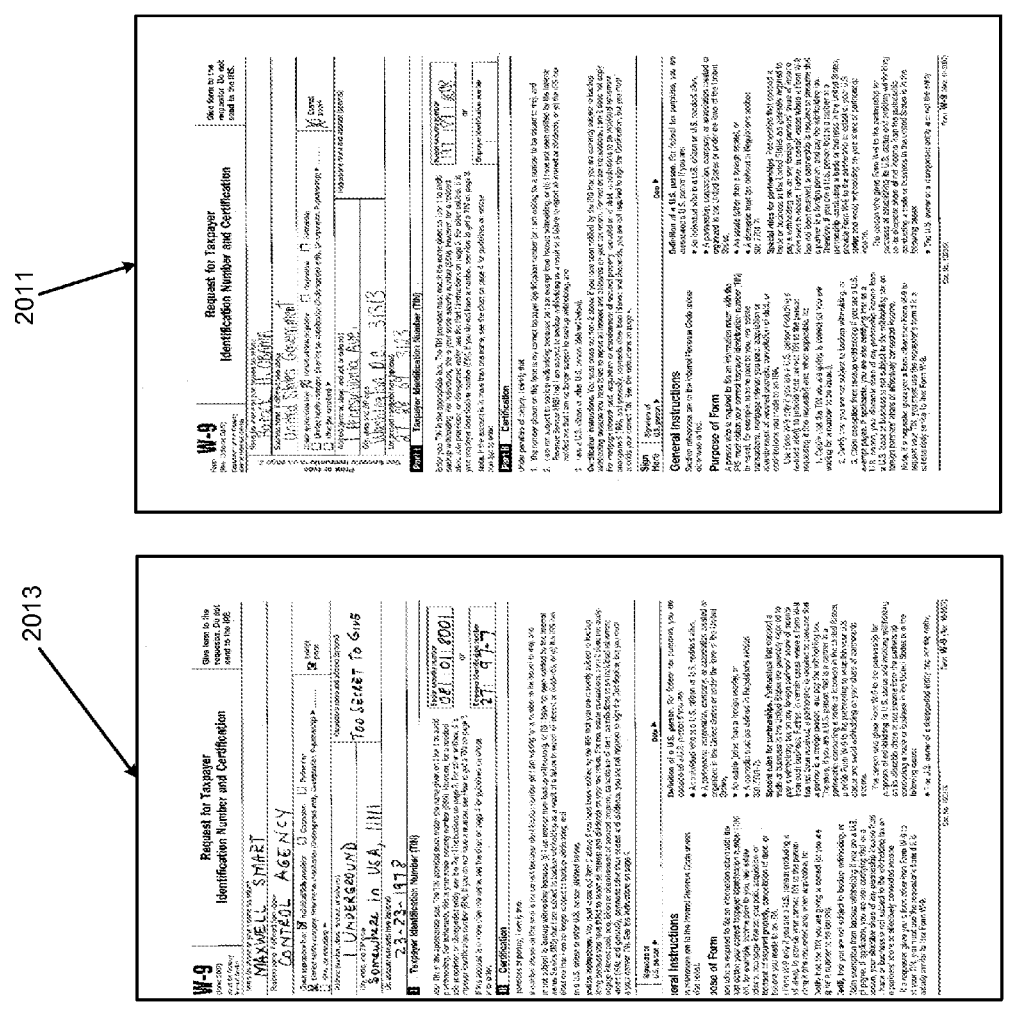
Figure 20D:
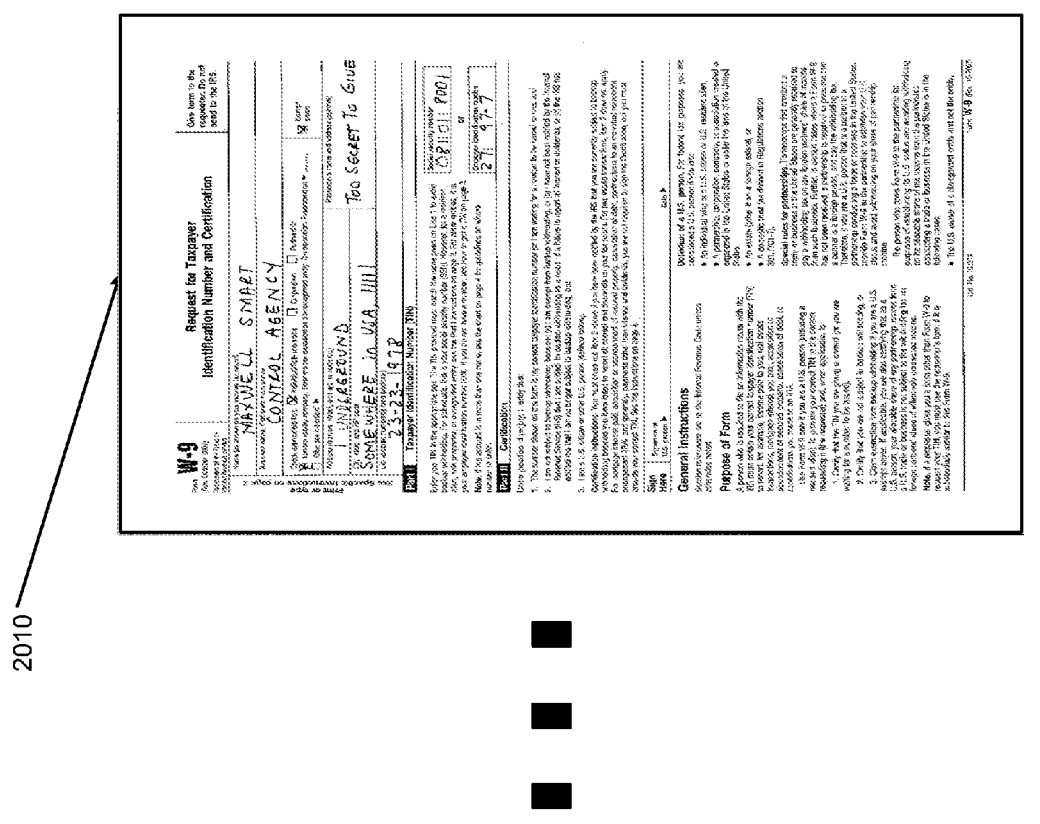

FIG. 20 is a graphic representation of an example hierarchical shared content index 2000 for a set of forms. FIG. 20 shows the node 2002 with shared content. As a plurality of edges 2010, 2012 couple the node to a plurality of form instances 2004.

Figure 21:
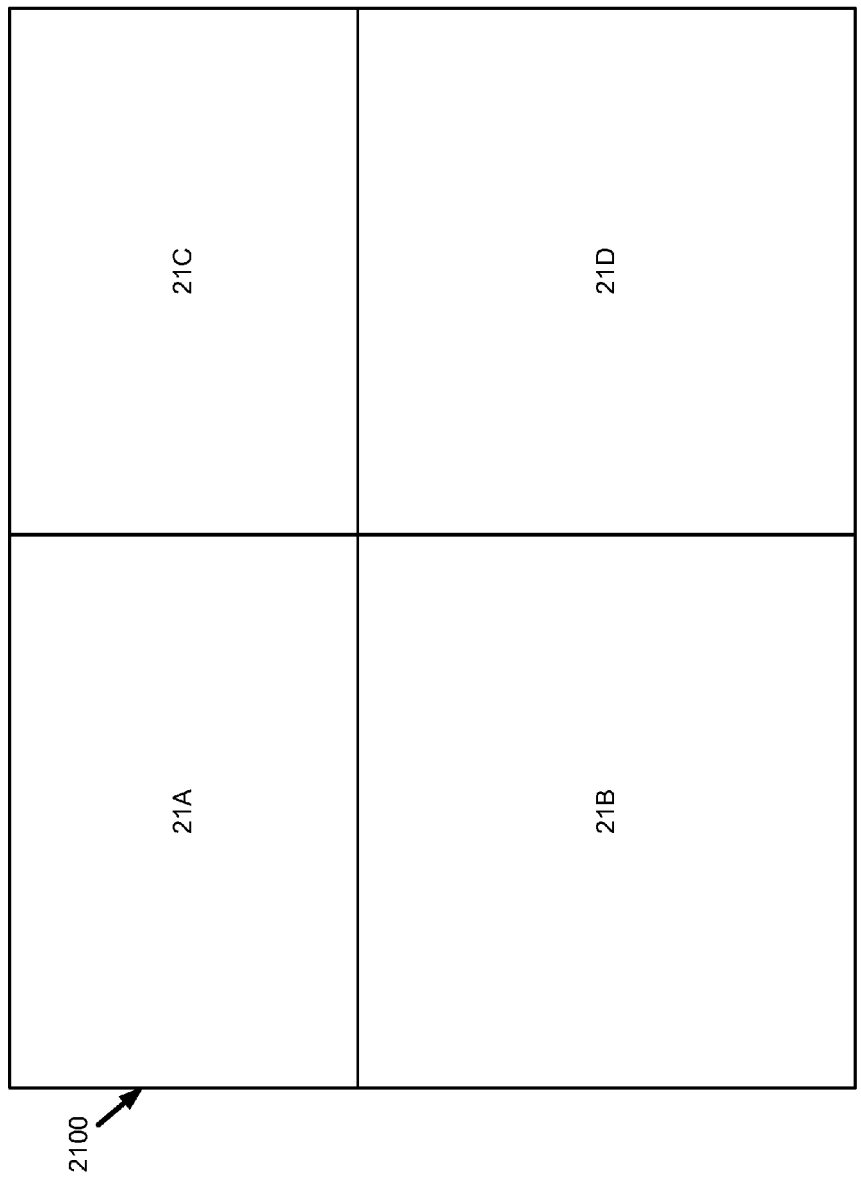
Figure 21B:
Figure 21D:

FIG. 21 is a graphic representation of an example hierarchical shared content index 2100 for shared content used in a newspaper. The example hierarchical shared content index 2100 includes a node 2102 and shows the repeated content. A plurality of edges 2110, 2112 couple the node to respective newspaper pages/documents 2104 and 2106.

From the examples shown in FIGS. 20 and 21, those skilled in the art will recognize that any number of hierarchical shared content indices 1502 can be created within the MMR system 100. Those skilled in the art will further understand that each of the hierarchical shared content indices 1502 may have various different internal configurations of notes, edges and document/pages.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

Image deletion algorithm

```
ALGORITHM: DeleteDocument(d)
1: n ← Node(d) /* node of the graph associated with document d */
2: P ← Parents(n) is
3: FORALL p ∈ P
4:    RemoveEdge(p,n) /* remove n as a child of p */
5:    C ← Children(p) and
```

APPENDIX A-continued

Image deletion algorithm

```
6:    IF Cardinality(C) = 1 /* if p has only one in an child left then
it no longer represents a shared region*/
7:       c ← C[0] /* c is the only child of p */
8:       G ← Parents(p) and
9:       FORALL g ∈ G /* Connect parents of p to c directly and remove p*/
10:         RemoveEdge(g,p)
11:         AddEdge(g,c)
12:      RemoveEdge(p,c)
13:      RemoveNode(p)
14:      RemoveNode(n)
```

APPENDIX B

Image recognition algorithm

```
ALGORITHM: A ← RecognizeAllDocuments(d, F, α)
1: n node ← of the graph associated with d
2: β ← ⌈ α·Cardinality(F) ⌉ /* Number of features that need to match */
3: A ← RecognizeAll(n,F,β,∅,∅) /* Retrieves all nodes for which all
descendant documents match the query. To enumerate all matching
documents, simply list all leaves rooted at nodes in A */
4: RETURN A
FUNCTION: A ← RecognizeAll(n,F,β,A,V) in an
1: P ← Parents(n)
2: t ← TRUE
3: FORALL p ∈ P
4:    IF p ∉ V /* If we haven't visited p before */
5:       V ← V ∪ {p} /* Now we have visited p */
6:       G ← ∅/* G: features in shared region */
7:       S ← SharedRegion(p→n) /* S is the location in n of the
shared region represented by p */
8:       FORALL f ∈ F /* For all features that match */
9:          IF Inside(f,S) /* If feature is inside shared region */
10:            G ← G ∪ {f}
11:         IF Cardinality(G) ≧ β /* Most matching features appear
inside a region shared by n and its siblings */
12:            t ← FALSE /* Thus n is not part of the answer because
an ancestor is */
13:         FORALL g ∈ G
14:            CoordinateChange(g,S) /* Transform the locations of the
features to the coordinate system of the shared region */
15:            A ← A ∪RecognizeAll(p,G,β,A,V)
16:      IF t = TRUE /* If n is part of the answer */
17:         A ← A ∪ {[n,F]} /* Then add the pair [n,F] to the
answer set */
18: RETURN A
```

APPENDIX C

Enhanced image recognition algorithm

```
ALGORITHM: A ← RecognizeCorrectDocument(d,F,α)
1: T ← RecognizeAllDocuments(d,F,α) /* T: set of maximal
shared regions of d */
2: A ← ∅/* A: set of correct documents (1 for each maximal
shared region) */
3: FORALL t ∈ T
4:    S ← ∅/* S: set of documents sharing a region*/
5:    FORALL v ∈ Leaves(t[0])
6:       S ← S ∪ {Document(v)} /* Document: retrieves
document page associated with a node in the graph */
7:    G ← F \ t[1] /* G: features not in shared region */
8:    A ← A ∪ { MMRSearch(G,S) } /* Use MMR to
search for features G among documents in S*/
9: RETURN ArgMaxSCORE(A) /* Return the document with the
highest score */
```

The invention claimed is:

1. An apparatus for use in recognizing documents from an image patch, the apparatus comprising:
an image recognition unit having an input and an output, the input of the image recognition unit coupled to receive the image patch, the image recognition unit extracting features from the image patch;

a hierarchical mixed media reality (MMR) index coupled to and communicating with the image recognition unit, the hierarchical MMR index being a tree with a first set of nodes, wherein each node is a flat MMR index, the hierarchical MMR index used to determine document corresponding to the extracted features from a database of documents; and a hierarchical shared content index coupled to the image recognition unit, the hierarchical shared content index having a hierarchical description of document pages, the hierarchical shared content index used to produce matching documents from the database of documents by traversing the hierarchical shared content index.

2. The apparatus of claim 1, wherein the hierarchical description of document pages includes at least one document page having a first part that is shared among a plurality of document pages and a second part that is unique to the at least one document page.

3. The apparatus of claim 2, wherein the at least one document page in the hierarchical description of document pages contains no shared parts.

4. The apparatus of claim 1, wherein the hierarchical shared content index is a part of a master index table.

5. The apparatus of claim 1, wherein the hierarchical shared content index comprises:

a hierarchical index having a second set of nodes associated by a plurality of edges; and one or more entire document pages.

6. The apparatus of claim 5, wherein each of the second set of nodes includes a representation of shared content and the plurality of edges include positional information of a parent shared content in a child image.

7. The apparatus of claim 1, wherein the hierarchical shared content index is a directed acyclic graph in which leaf nodes represent actual pages that are indexed while internal nodes represent shared content.

8. A computer implemented method for recognizing documents from an image patch, the method comprising:

receiving, with one or more processors, the image patch;

determining, with the one or more processors, one or more features of the image patch;

determining, with the one or more processors, the document from a database of documents corresponding to the one or more features;

determining, with the one or more processors, an internal node in a hierarchical index corresponding to the document, the hierarchical index being a directed acyclic graph in which leaf nodes represent actual document pages that are indexed while internal nodes represent shared content among the actual document pages; and producing, with the one or more processors, one or more matching documents from the database of documents by traversing the hierarchical index.

9. The method of claim 8 wherein the hierarchical index is one from the group of a hierarchical shared content index and a hierarchical mixed media reality (MMR) index.

10. The method of claim 8 wherein determining the document further comprises determining the document using a hierarchical mixed media reality (MMR) index, the hierarchical MMR index being a tree with a plurality of nodes, wherein each node is a flat MMR index.

11. The method of claim 8 further comprising receiving a fraction of the one or more features of the image patch, and using the the fraction of the one or more features of the image patch in producing the one or more matching documents.

12. The method of claim 8 further comprising determining a best match document from the one or more matching documents.

13. The method of claim 8 further comprising comparing the one or more features of the image patch to the hierarchical index and using the comparison in determining the internal node.

14. A computer program product comprising a computer usable medium including a non-transitory computer readable program, wherein the computer readable program when executed on a computer causes the computer to:

receive an image patch;

determine one or more features of the image patch;

determine a document from a database of documents corresponding to the one or more features;

determine an internal node in a hierarchical index corresponding to the document, the hierarchical index being a directed acyclic graph in which leaf nodes represent actual document pages that are indexed while internal nodes represent shared content among the actual document pages; and produce one or more matching documents from the database of documents by traversing the hierarchical index.

15. The computer program product of claim 14 wherein the hierarchical index is one from the group of a hierarchical shared content index and a hierarchical mixed media reality (MMR) index.

16. The computer program product of claim 14 wherein determining the document further comprises determining the document using a hierarchical mixed media reality (MMR) index, the hierarchical MMR index being a tree with a plurality of nodes, wherein each node is a flat MMR index.

17. The computer program product of claim 14 wherein the computer readable program when executed on the computer further causes the computer to compare the one or more features of the image patch to the hierarchical index and use the comparison in determining the internal node.

18. The computer program product of claim 14 wherein the computer readable program when executed on the computer further causes the computer to receive a fraction of the one or more features of the image patch and use the fraction of the one or more features of the image patch in producing the one or more matching documents.

19. The computer program product of claim 14 wherein the computer readable program when executed on the computer further causes the computer to determine a best match document from the one or more matching documents.

20. The computer program product of claim 14 wherein producing the one or more matching documents further comprises determining a set of internal nodes in the hierarchical index such that descendants of the set of internal nodes match the image patch.

* * * * *